US012360430B2

(12) United States Patent
Fang et al.

(10) Patent No.: US 12,360,430 B2
(45) Date of Patent: Jul. 15, 2025

(54) DISPLAY MODULE HAVING ADJUSTABLE INTEGRATED BLACK EFFECT AND DRIVING METHOD THEREOF, AND DISPLAY APPARATUS

(71) Applicant: Xiamen Tianma Micro-Electronics Co., Ltd., Xiamen (CN)

(72) Inventors: Liting Fang, Xiamen (CN); Peiqin Deng, Xiamen (CN); Ling Wu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/627,125

(22) Filed: Apr. 4, 2024

(65) Prior Publication Data

US 2025/0116909 A1    Apr. 10, 2025

(30) Foreign Application Priority Data

Oct. 10, 2023   (CN) .......................... 202311307743.9

(51) Int. Cl.
*G02F 1/16757*    (2019.01)
*G02F 1/1345*    (2006.01)
(Continued)

(52) U.S. Cl.
CPC ...... *G02F 1/16757* (2019.01); *G02F 1/13452* (2013.01); *G02F 1/167* (2013.01);
(Continued)

(58) Field of Classification Search
CPC .... G02B 26/005; G02B 26/026; G09G 3/344; G09G 3/3446; G09G 3/3453;
(Continued)

(56) References Cited

U.S. PATENT DOCUMENTS

2008/0239459 A1* 10/2008 Kang ................... G02F 1/1345
                                              257/E21.598
2012/0044229 A1*  2/2012 Kim ...................... G02F 1/167
                                              345/107

(Continued)

FOREIGN PATENT DOCUMENTS

| CN | 110007541 A | 7/2019 |
| CN | 215643443 U | 1/2022 |
| CN | 114003142 A | 2/2022 |

*Primary Examiner* — Rodney Amadiz
(74) *Attorney, Agent, or Firm* — Anova Law Group, PLLC

(57) ABSTRACT

The present disclosure provides a display module, a driving method, and a display apparatus. The display module includes a display panel, a cover, and a color-changing assembly. The color-changing assembly is at least in the first region of the cover extended outside of the display panel; the color-changing assembly includes a first substrate, a second substrate, and a plurality of microcapsule structures; the plurality of microcapsule structures includes a plurality of first charged particles and a plurality of second charged particles; the first charged particle and the second charged particles have different colors and opposite charges; a first electrode layer including a plurality of first electrode is on a side of the first substrate facing the plurality of microcapsule structures; and an orthographic projection of one first electrode on the first substrate is overlapped with an orthographic projection of at least one microcapsule structure on the first substrate.

20 Claims, 33 Drawing Sheets

(51) Int. Cl.
  *G02F 1/167*    (2019.01)
  *G02F 1/1676*   (2019.01)
  *G09G 3/36*     (2006.01)

(52) U.S. Cl.
  CPC ......... *G02F 1/1676* (2019.01); *G09G 3/3607* (2013.01); *G02F 2201/44* (2013.01); *G09G 2320/0238* (2013.01); *G09G 2320/0666* (2013.01)

(58) Field of Classification Search
  CPC ........... G09G 2310/068; G09G 3/3607; G09G 2320/0238; G09G 2320/0666; G02F 1/16757; G02F 1/13452; G02F 1/167; G02F 1/1676; G02F 1/133388; G02F 1/1681; G02F 2201/44
  See application file for complete search history.

(56) References Cited

U.S. PATENT DOCUMENTS

| | | | | |
|---|---|---|---|---|
| 2012/0243072 A1* | 9/2012 | Cho | ................... | H01J 9/00 |
| | | | | 445/24 |
| 2016/0154260 A1* | 6/2016 | Chen | ................... | G02F 1/1337 |
| | | | | 349/110 |
| 2017/0053607 A1* | 2/2017 | Lin | ................... | G09G 3/344 |
| 2018/0158419 A1* | 6/2018 | Hsu | ................... | G02F 1/1685 |
| 2020/0073190 A1* | 3/2020 | Zhang | ................... | G02F 1/1516 |

* cited by examiner

DISPLAY MODULE HAVING ADJUSTABLE INTEGRATED BLACK EFFECT AND DRIVING METHOD THEREOF, AND DISPLAY APPARATUS

CROSS-REFERENCE TO RELATED APPLICATION

The present disclosure claims the priority of Chinese Patent Application No. 202311307743.9, filed on Oct. 10, 2023, the content of which is incorporated herein by reference in its entirety.

TECHNICAL FIELD

The present disclosure generally relates to the field of display technology and, more particularly, relates to a display module and a driving method thereof, and a display apparatus.

BACKGROUND

In the display module of existing electronic device, when a display screen is in a screen-off state, the visible region of the display screen is not completely black but appears grayish. As a result, a significant difference is between the visible region and the frame region of the display screen when the screen is in the screen-off state, such that the display screen still has an obvious boarder line from overall visual effect, and the integrated black visual effect is poor, which may affect user experience. Moreover, existing method of improving the integrated black effect cannot be desirably matched with display panels of different designs. If the design of the display panel design is changed, the integrated black effect of the visible region and the frame region may need to be re-adjusted when the display screen is in the screen-off state, which may be a challenging adjustment with long period.

Therefore, there is a need to provide a display module and its driving method, and a display apparatus which may not only achieve the integrated black effect, but also be matched with the designs of different panels without need to re-develop covers with different chromaticity values, which may be beneficial for reducing adjustment difficulty and period.

SUMMARY

One aspect of the present disclosure provides a display module. The display module includes a display panel; a cover on a light-emitting side of the display panel, where a region of the cover extended outside of the display panel is a first region; and a color-changing assembly on a side of the cover facing the display panel. The color-changing assembly is at least in the first region; along a direction perpendicular to a plane of the display panel, the color-changing assembly includes a first substrate and a second substrate which are disposed oppositely with each other; a plurality of microcapsule structures is between the first substrate and the second substrate; the plurality of microcapsule structures includes a plurality of first charged particles and a plurality of second charged particles; a color of a first charged particle is different from a color of a second charged particles, and a charge of the first charged particle is opposite to a charge of the second charged particle; and a first electrode layer is on a side of the first substrate facing the plurality of microcapsule structures; the first electrode layer includes a plurality of first electrodes; and an orthographic projection of one first electrode on the first substrate is overlapped with an orthographic projection of at least one microcapsule structure on the first substrate.

Another aspect of the present disclosure provides a driving method of a display module. The display module includes a display panel; a cover on a light-emitting side of the display panel, where a region of the cover extended outside of the display panel is a first region; and a color-changing assembly on a side of the cover facing the display panel, where the color-changing assembly is at least in the first region; along a direction perpendicular to a plane of the display panel, the color-changing assembly includes a first substrate and a second substrate which are disposed oppositely with each other; a plurality of microcapsule structures is between the first substrate and the second substrate; the plurality of microcapsule structures includes a plurality of first charged particles and a plurality of second charged particles; a color of a first charged particle is different from a color of a second charged particles, and a charge of the first charged particle is opposite to a charge of the second charged particle; and a first electrode layer is on a side of the first substrate facing the plurality of microcapsule structures; the first electrode layer includes a plurality of first electrodes; an orthographic projection of one first electrode on the first substrate is overlapped with an orthographic projection of at least one microcapsule structure on the first substrate; and the display module includes a display mode and a non-display mode. The method includes, in the display mode, performing display using the display panel of the display module; and in the non-display mode, setting the display panel to be in a screen-off state, adjusting a voltage value of a first electrode in the color-changing assembly according to a grayscale of the display module in a region of the display panel; and changing positions of the plurality of first charged particles and the plurality of second charged particles in the plurality of microcapsule structures, such that a grayscale of the first region of the display module and a grayscale of the region of the display panel are consistent within a preset range.

Another aspect of the present disclosure provides a display apparatus including a display module. The display module includes a display panel; a cover on a light-emitting side of the display panel, where a region of the cover extended outside of the display panel is a first region; and a color-changing assembly on a side of the cover facing the display panel. The color-changing assembly is at least in the first region; along a direction perpendicular to a plane of the display panel, the color-changing assembly includes a first substrate and a second substrate which are disposed oppositely with each other; a plurality of microcapsule structures is between the first substrate and the second substrate; the plurality of microcapsule structures includes a plurality of first charged particles and a plurality of second charged particles; a color of a first charged particle is different from a color of a second charged particles, and a charge of the first charged particle is opposite to a charge of the second charged particle; and a first electrode layer is on a side of the first substrate facing the plurality of microcapsule structures; the first electrode layer includes a plurality of first electrodes; and an orthographic projection of one first electrode on the first substrate is overlapped with an orthographic projection of at least one microcapsule structure on the first substrate.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

Figure 1:
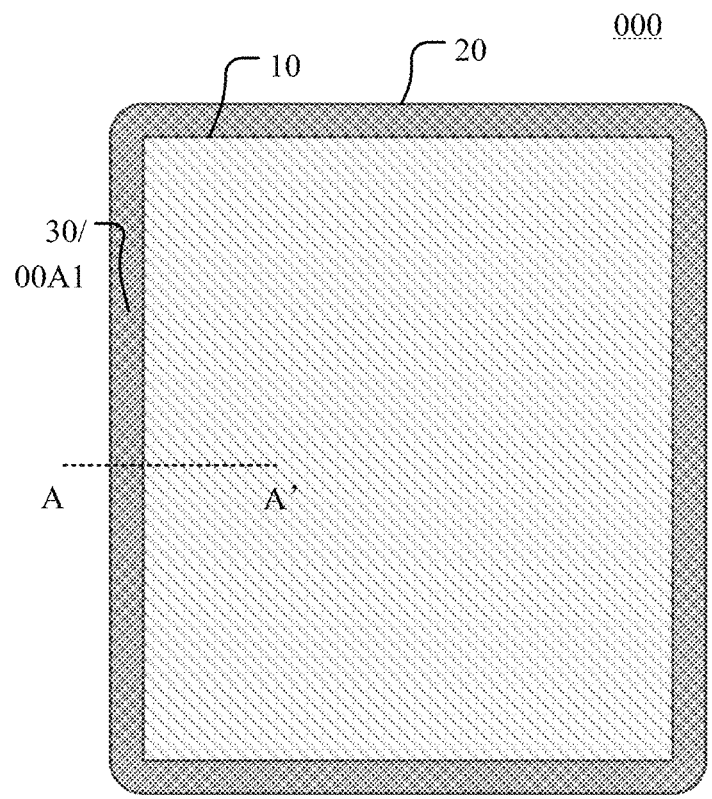
FIG. 1 illustrates a planar structural schematic of a display module according to various embodiments of the present disclosure.

Various exemplary embodiments of the present disclosure are described in detail with reference to accompanying drawings. It should be noted that unless stated otherwise, relative arrangement of assemblies and steps, numerical expressions and values described in those embodiments may not limit the scope of the present disclosure.

Following description of at least one exemplary embodiment may be merely illustrative and may not be configured to limit the present disclosure and its application or use.

The technologies, methods and apparatuses known to those skilled in the art may not be discussed in detail, but where appropriate, the technologies, methods and apparatuses should be considered as a part of the present disclosure.

In all examples shown and discussed herein, any specific value should be interpreted as merely exemplary, rather than as a limitation. Therefore, other examples in exemplary embodiment may have different values.

It is apparent to those skilled in the art that various modifications and variations may be made in the present disclosure without departing from the spirit or scope of the present disclosure. Therefore, the present disclosure is intended to cover modifications and variations of the present disclosure falling within the scope of corresponding claims (technical solutions to be protected) and their equivalents. It should be noted that, implementation manners provided in embodiment of the present disclosure may be combined with each other if there is no contradiction.

It should be noted that similar reference numerals and letters are configured to indicate similar items in following drawings. Therefore, once an item is defined in one drawing, it does not need to be further discussed in subsequent drawings.

Figure 2:
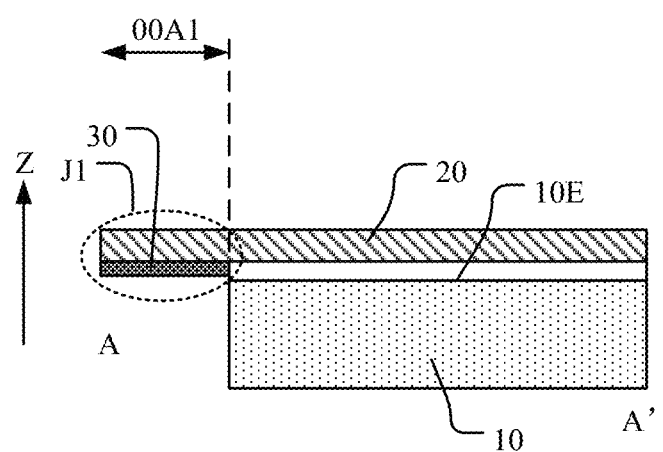
FIG. 2 illustrates a cross-sectional view along an A-A' direction in FIG. 1.
Figure 3:
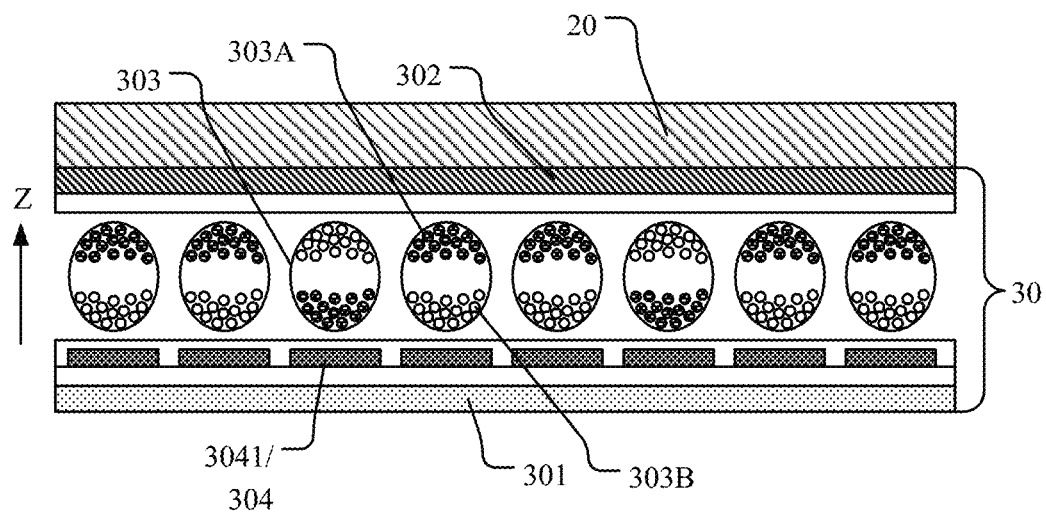
FIG. 3 illustrates a local enlarged schematic of a J1 region in FIG. 2.

Referring to FIGS. 1-3, FIG. 1 illustrates a planar structural schematic of a display module according to various embodiments of the present disclosure; FIG. 2 illustrates a cross-sectional view along an A-A' direction in FIG. 1; and FIG. 3 illustrates a local enlarged schematic of a J1 region in FIG. 2. It may be understood that, in order to clearly illustrate the structure of one embodiment, transparency filling is performed in FIG. 1. Embodiments of the present disclosure provide a display module 000. The display module 00 may include a display panel 10 and a cover 20 on a side of a light-emitting surface 10E of the display panel 10, where the region of the cover 20 extended outside of the display panel 10 is the first region 00A1; and further include a color-changing assembly 30 on a side of the cover 20 facing the display panel 10, where the color-changing assembly 30 is at least in the first region 00A1.

Along the direction Z perpendicular to the plane of the display panel 10, the color-changing assembly 30 may include the first substrate 301 and the second substrate 302 which are oppositely disposed. A plurality of microcapsule structures 303 may be included between the first substrate 301 and the second substrate 302. The microcapsule structure 303 may include a plurality of first charged particles 303A and a plurality of second charged particles 303B. The color of the first charged particle 303A may be different from the color of the second charged particle 303B. The charge of the first charged particle 303A may be opposite to the charge of the second charged particle 303B.

The first electrode layer 304 may be on the side of the first substrate 301 facing the microcapsule structure 303. The first electrode layer 304 may include a plurality of first electrodes 3041. The orthographic projection of one first electrode 3041 on the first substrate 301 may be overlapped with the orthographic projection of at least one microcapsule structure 303 on the first substrate 301.

For example, the display module 000 provided in one embodiment may at least include the display panel 10 and the cover 20 on the side of the light-emitting surface 10E of the display panel 10. The light-emitting surface 10E of the display panel 10 may be understood as one side surface of the display panel 10 that displays images. Optionally, the display module 000 in one embodiment may be a flexible display module; that is, the display panel 10 may be a curved display panel, and surrounding edges of the display module 000 may be curved shapes. Or the display module 000 of one embodiment may be a flat display module; that is, the display panel 10 may be a flat display panel, and all regions of the display module 000 may be flat and planar, which may not be limited in various embodiments of the present disclosure. In drawings of embodiments of the present disclosure, the display module 000 may be a flat display module as an example for schematic illustration. The cover 20 may be on the side of the light-emitting surface 10E of the display panel 10. The size of the cover 20 may be larger than the size of the display panel 10, such that the first region 00A1 of the cover 20 extended outside of the display panel 10 may be used to fully protect entire display panel 10 below the cover 20.

In the existing technology, black structures with light-blocking properties such as ink materials (such as spraying or screen-printing ink) may be disposed in the first region to block the frame wiring and attachment deviation of the display panel and prevent light leakage at the side edges of the display panel. Display modules of electronic products may need to have the integrated black effect. The so-called integrated black indicates that when the screen of the display module is in the screen-off state, the middle viewing region may be nearly black, and the color of surrounding black ink region and the visual color of the viewing region may remain substantially same, which may be like an entire region, rather than having an obvious boarder. Currently, with wide use of touch screens in cars (vehicle screens), consumers have increasingly higher requirements for visual experience of car screens and require superior integrated black effect. Currently, when the display panel is in the screen-off state, in order to achieve the integrated black effect of the visible region of the display panel (that is, the display region and the first region), it needs to adjust the chromaticity values (Lab values) of the cover in the visible region of the display panel and the first region of the ink material to match the structural design of the panel, which may be mainly based on the following integrated black calculation formula:

$$\Delta E = \sqrt{(L_{AA} - L_{ink})^2 + (a_{AA} - a_{ink})^2 + (b_{AA} - b_{ink})^2}$$

L denotes luminosity which is equivalent to brightness, where a positive value of luminosity indicates a white color, and a negative value of luminosity indicates a black color; a denotes a red-green value, where a positive red-green value indicates a reddish color, and a negative red-green value indicates a greenish color; b denotes a yellow-blue value, where a positive yellow-blue value indicates a yellowish color, and a negative yellow-blue value indicates a bluish color; $L_{AA}$ denotes an L value of the visible region of the display panel, and $L_{ink}$ denotes an L value of the first region where the ink is located; $a_{AA}$ denotes an a value of the visible region of the display panel, and $a_{ink}$ denotes an a value of the first region where the ink is located; $b_{AA}$ denotes a b value of the visible region of the display panel, and $b_{ink}$ denotes a b value of the first region where the ink is located; and $\Delta E$ denotes a characteristic parameter of integrated black. In principle, the smaller the value is, the better the integrated black effect is. That is, the AR (Anti-reflection, which may be understood as a low-reflective coating) of the cover and the brightness and hue of the ink region may be mainly adjusted to reduce the value of $\Delta E$ as possible. The purpose of adjusting the AR of the cover is to reduce the reflectivity. However, after adjusting the low-reflective coating of the module cover for hue, the change in the array film layer of the display panel or the materials in the liquid crystal cell of the display panel may cause the hue of the display panel region of the cover to change, resulting in a mismatch with original cover; and the reflectivity of RGB three primary colors of the display panel may change to affect final reflectivity, thereby further affecting the display brightness and display effect. Moreover, common goal of integrated black is to maintain same chromaticity of L, a, and b in the first region where the ink is located and the region where the display panel is located if the screen is in the screen-off state, which may achieve high-quality integrated black performance and improve visual effect. When ΔE is less than 1.0, the visible region of the display panel and the first region where the ink is located may appear to have almost same color, which may greatly improve the user's viewing experience. However, current ink-jet design has not reached the industry's integrated black level. The AR of the cover at the ink region may only be adjusted to meet the requirement that ΔE is less than 3, which may be actually 2.5-2.8 and may not meet the customer's requirement of ΔE being less than 2 or even less than 1. Moreover, when the display panel design changes, it needs to recalculate and adjust the chromaticity values of the visible region of the cover and the first region of the ink material, and then re-develop the cover, which may be not only difficult for calibration, but also time-consuming. Moreover, adjusting the chromaticity value of the visible region of the cover may easily affect final reflectivity, thereby affecting the display brightness and display effect during use.

In order to solve above problem, the display module 000 in one embodiment may further include the color-changing assembly 30. Along the direction Z perpendicular to the plane of the display panel 10, the color-changing assembly 30 may be on the side of the cover 20 facing the display panel 10; and the color-changing assembly 30 may be at least in the first region 00A1. As shown in FIGS. 1-2, in one embodiment, the color-changing assembly 30 may be disposed at least in the first region 00A1 of the cover 20 extended outside of the display panel 10. In some other embodiments, the color-changing assembly 30 may also be disposed in other regions other than the first region 00A1, which may refer to subsequent embodiments for understanding. In drawings of one embodiment, the color-changing assembly 30 may be in the first region 00A1 as an example for illustration.

The structure of the color-changing assembly 30 at least disposed in the first region 00A1 may be that along the direction Z perpendicular to the plane of the display panel 10, the color-changing assembly 30 may include the first substrate 301 and the second substrate 302 that are oppositely disposed The first substrate 301 may be understood as a carrier substrate, and the second substrate 302 may be understood as a base substrate for protecting the color-changing assembly 30. It may be understood that in the drawings of one embodiment, the first substrate 301 may be on the side of the second substrate 302 away from the cover 20, that is, the second substrate 302 may be closer to the cover 20 than the first substrate 301, which may be taken as an example for illustration. During implementation, the first substrate 301 may also be on the side of the second substrate 302 facing the cover 20, that is, the first substrate 301 may be closer to the cover 20 than the second substrate 302, which may not be limited in various embodiments of the present disclosure and may only need to satisfy that the color-changing assembly 30 includes the first substrate 301 and the second substrate 302 that are oppositely disposed.

The first substrate 301 and the second substrate 302 may be made of transparent materials such as glass, which may not be limited in various embodiments of the present disclosure.

In the color-changing assembly 30 of one embodiment, the plurality of microcapsule structures 303 may be included between the first substrate 301 and the second substrate 302. The shape of the microcapsule structure 303 in FIG. 3 may be only exemplary and may be designed according to actual need during implementation. Each microcapsule structure 303 may include the plurality of first charged particles 303A and the plurality of second charged particles 303B. The color of the first charged particle 303A may be different from the color of the second charged particle 303B, and the charge of the first charged particle 303A may be opposite to the charge of the second charged particle 303B. That is, each microcapsule structure 303 may at least include two types of charged particles with different colors and opposite charges. If the color of the first charged particle 303A is black, the color of the second charged particle 303B may be white; if the color of the first charged particle 303A is white, the color of the second charged particle 303B may be black; if the first charged particle 303A has a positive charge, the second charged particle 303B may have a negative charge; and if the first charged particle 303A has a negative charge, the second charged particle 303B may have a positive charge, which may not be limited in various embodiments of the present disclosure and may only need to satisfy that the microcapsule structure 303 may at least include two types of charged particles with different colors and opposite charges. In the color-changing assembly 30 of one embodiment, the side of the first substrate 301 facing the microcapsule structure 303 may include the first electrode layer 304. The first electrode layer 304 may be patterned to form the plurality of first electrodes 3041. The orthographic projection of one first electrode 3041 on the first substrate 301 may be overlapped with the orthographic projection of at least one microcapsule structure 303 on the first substrate 301. That is, the orthographic projection of one first electrode 3041 on the first substrate 301 may only be overlapped with the orthographic projection of one microcapsule structure 303 on the first substrate 301; and the orthographic projection of one first electrode 3041 on the first substrate 301 may also be overlapped with the orthographic projection of two or more microcapsule structures 303 on the first substrate 301. In drawings of one embodiment, the orthographic projection of one first electrode 3041 on the first substrate 301 may be overlapped with the orthographic projection of one microcapsule structure 303 on the first substrate 301; that is, the orthographic projection region of one first electrode 3041 on the first substrate 301 may be substantially same as the orthographic projection region of one microcapsule structure 303 on the first substrate 301 and one first electrode 3041 may exactly correspond to one microcapsule structure 303, which may be taken as an example for illustration.

In one embodiment, by disposing the color-changing assembly 30, the voltage value on the first electrodes 3041 corresponding to the microcapsule structures 303 at different positions may be changed. For example, when the voltage on the first electrode 3041 corresponding to the microcapsule structure 303 at a certain position is positive, negatively charged particles in the microcapsule structure 303 may aggregate toward the surface adjacent to the first electrode 3041, and positively charged particles in the microcapsule structure 303 may aggregate toward the surface away from the first electrode 3041. As a result, positively charged particles may be accumulated on the side of the second substrate 302 side at such position, that is, the visible color of such position may be the color of positively charged particles.

Figure 4:
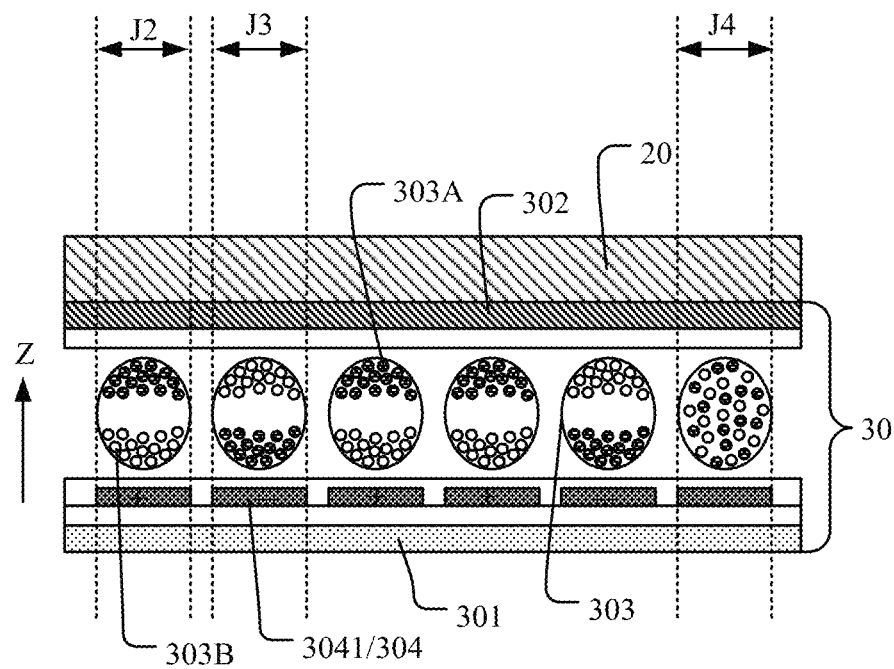
FIG. 4 illustrates a structural schematic of different movement states of charged particles with different microcapsule structures in FIG. 3.

As shown in FIG. 4, FIG. 4 illustrates a structural schematic of different movement states of charged particles with different microcapsule structures in FIG. 3. It is assumed that in one embodiment, the first charged particles 303A may be black positively charged particles, and the second charged particles 303B may be white negatively charged particles. It may be understood that in some other embodiments, the first charged particles 303A may be black negatively charged particles, and the second charged particles 303B may be white positively charged particles; or the first charged particles 303A may be white positively charged particles, the second charged particles 303B may be black negatively charged particles and the like, which may not be limited in one embodiment and may be taken as an example for illustration. When the voltage on the first electrode 3041 corresponding to the microcapsule structure 303 at a certain position is positive, the second charged particles 303B in the microcapsule structure 303 may aggregate toward the direction adjacent to the first electrode 3041 due to the attraction of opposite charges, that is, the white second charged particles 303B may aggregate toward the side adjacent to the first substrate 301; and the first charged particles 303A in the microcapsule structure 303 may aggregate toward the side away from the first electrode 3041 due to the repulsion of same charges, that is, the black first charged particles 303A may aggregate toward the side adjacent to the second substrate 302. Exemplarily, since the second substrate 302 is closer to the cover 20 than the first substrate 301 in the drawings, the visible color at such position (J2 region in FIG. 4) may be black. When the voltage on the first electrode 3041 corresponding to the microcapsule structure 303 at another position is negative, the first charged particles 303A in the microcapsule structure 303 may aggregate toward the side adjacent to the first electrode 3041 due to the attraction of opposite charges, that is, the black first charged particles 303A may aggregate toward the side adjacent to the first substrate 301; and the second charged particles 303B in the microcapsule structure 303 may aggregate toward the side away from the first electrode 3041 due to the repulsion of same charges, that is, the white second charged particles 303B may aggregate toward the side adjacent to the second substrate 302. Exemplarily, since the second substrate 302 is closer to the cover 20 than the first substrate 301 in the drawings, the visible color at this position (J3 region in FIG. 4) may be white. When no voltage is applied to the first electrode 3041 corresponding to the microcapsule structure 303 at a certain position, the first charged particles 303A and the second charged particles 303B in the microcapsule structure 303 may be in a mixed state. If one of the first charged particles 303A and the second charged particles 303B is black and another one of the first charged particles 303A and the second charged particles 303B is white, when the first charged particles 303A and the second charged particles 303B are mixed, the visible color of corresponding position (J4 region in FIG. 4) of the microcapsule structure 303 may be gray. It may be seen that in one embodiment, the values of the positive and negative voltages on the first electrode 3041 at different positions may be controlled to cause charged particles of different colors to move in the microcapsule structure 303. Furthermore, the visible grayscale of the first region 00A1 on the side of the cover 20 may be at least changed, such that the grayscale of the first region 00A1 of the display module 000 may be substantially consistent with the grayscale of the region where the display panel 10 is located, thereby achieving desirable integrated black.

Figure 5:
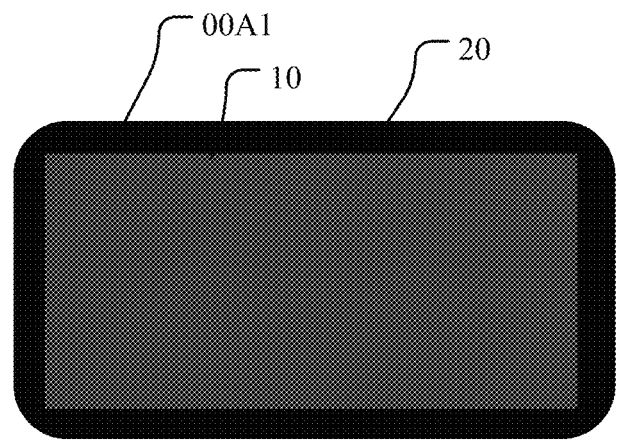
FIG. 5 illustrates a rendering schematic of an integrated black module implemented by adjusting AR (anti-reflection) or ink chromaticity of a cover in an existing technology.
Figure 6:
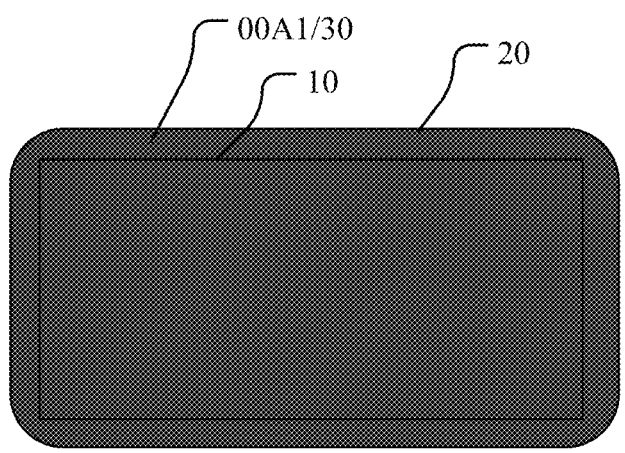
FIG. 6 illustrates a rendering schematic of an integrated black module implemented by using a structure of a color-changing assembly according to various embodiments of the present disclosure.

When the display module 000 of one embodiment is used, the display module 000 may at least include a display mode and a non-display mode. In the display mode, the display panel 10 of the display module 000 may perform normal display without considering integrated color. In the non-display mode, that is, when the display panel 10 is not working, the grayscale of the display module 000 in the region of the display panel 10 may be adjusted. At this point, in the region where the display panel 10 is located, the grayscale of the display module 000 may be not completely black, but rather grayish. Therefore, in order to achieve the integrated black effect in all regions of entire module under the screen of the display panel 10, it only needs to adjust the voltage value of the first electrode 3041 in the color-changing assembly 30, such that the positions of the first charged particles 303A and the second charged particles 303B of different colors and opposite charges in the microcapsule structure 303 may change. In addition, according to the grayscale of the display module 000 in the region where the display panel 10 is located, the voltage values on the first electrodes 3041 of the microcapsule structures 303 at different positions may be adjusted to be different, such that the grayscale of the first region 00A1 of the display module 000 may be consistent with the grayscale of the region where the display panel 10 is located within the preset range, and ΔE in above integrated black formula may be as small as possible to satisfy industry requirement. The preset range may be understood as allowable error range. Due to parameter errors in process and the like, complete consistency cannot be guaranteed. Referring to FIGS. 5-6, FIG. 5 illustrates a rendering schematic of the integrated black module implemented by adjusting AR (anti-reflection) or ink chromaticity of the cover in the existing technology; and FIG. 6 illustrates a rendering schematic of the integrated black module implemented by using the structure of the color-changing assembly according to various embodiments of the present disclosure. It may be seen from the comparison between FIGS. 5-6 that the design of embodiments of the present disclosure may desirably improve the integrated black effect of the display module 000.

In the color-changing assembly 30 of one embodiment, charged particles of different colors with positive and negative charges in the microcapsule structure 303 may be used, by changing the voltage value on the first electrode 3041, charged particles of different colors may be arranged in order in the microcapsule structure 303 along the direction Z perpendicular to the plane of the display panel 10, thereby displaying needed grayscale. The grayscale of the display module 000 in the region where the color-changing assembly 30 is disposed may be substantially consistent with the grayscale of other regions, which may have advantages of low power consumption, low cost, flexibility and high stability for formation materials. When forming the display module 000 of one embodiment, the display module 000 including the display panel 10 and the cover 20 may be formed using a conventional process. Subsequently, the color-changing assembly 30 may be directly assembled in the region where ink spraying or screen printing is originally needed, that is, the first region 00A1 of the cover 20 extended outside of the display panel 10, which may have simple structure, convenient assembly, and save process steps of ink spraying, thereby being beneficial for improving process efficiency.

In one embodiment, by disposing the color-changing assembly 30 including the microcapsule structure 303 in the first region 00A1, the integrated black effect may be desirable. Compared with existing solution of disposing ink in the first region 00A1, in one embodiment, even if the design structure of the display panel 10 is changed, there is no need to develop a new cover, and only the voltage value on the first electrode 3041 may need to be adjusted, such that the grayscale of the first region 00A1 may be adjusted by changing the distribution of charged particles of different colors. Therefore, teal-time adjustment may improve the integrated black effect; the adjustment may be convenient and fast; the operation may be simple; the adjustment cycle and difficulty of adjustment may be greatly reduced; such configuration may be matched with display panels 10 with different design to form the integrated black effect; and the display panels 10 may be formed in batch production manner.

It may be understood that in FIG. 3 of one embodiment, the first charged particles 303A and the second charged particles 303B may be distinguished by different filling patterns. The numbers and shapes of the first charged particles 303A and the second charged particles 303B in the drawings may be only exemplary and may not represent actual numbers; and during implementation, above numbers and shapes may be configured according to the space size of the microcapsule structure 303.

It should be noted that the display panel 10 in one embodiment may be any one of a liquid crystal display panel, an organic light-emitting diode display panel, a micro-light-emitting diode display panel, and a sub-millimeter light-emitting diode display panel, which may not be limited in various embodiments of the present disclosure. In addition, the display panel 10 may have a rigid panel structure or a flexible panel structure capable of being bent. In one embodiment, the display panel 10 may be a rigid flat panel, which may be taken as an example for illustration. During implementation, the display panel may also be other types of display panels, which may only need to satisfy that the color-changing assembly 30 is at least disposed at the first region 00A1 of the cover 20 extended outside of the display panel 10.

Optionally, referring to FIG. 3, the first electrode layer 304 in one embodiment may be made of a transparent conductive material, such as ITO (indium tin oxide), IZO (indium zinc oxide) or the like, which may avoid that the arrangement of the first electrode layer 304 affects visible grayscale at different microcapsule structures 303. In the color-changing assembly 30 of one embodiment, the first electrode layer 304 may only need to be disposed on the side of the first substrate 301, that is, there is no need to provide the electrode structure on the side of the second substrate 302. The movement of charged particles in the microcapsule structure of one embodiment is based on the principle that like charges repel and opposite charges attract. Therefore, as long as the positive and negative voltage values on the first electrode 3041 on the side of the first substrate 301 change, the charged particles with opposite voltage values to the first electrode 3041 may naturally attract to be adjacent to each other; and the charged particles with same voltage value as the first electrode 3041 may naturally repel to move away from each other and move toward the second substrate 302. Therefore, in the color-changing assembly 30 of one embodiment, only one side of one of above two substrates may need to be disposed with the electrode layer, which may save at least one formation process and be beneficial for improving the formation efficiency of the color-changing assembly 30, thereby ensuring the process efficiency of overall module.

It should be noted that the structure of the color-changing assembly 30 in the display module 000 may include, but may not be limited to, above-mentioned structures; and may further include other structures including insulating layers, protective layers, support layers and the like, which may not be described in detail herein. In the drawings of embodiments of the present disclosure, a block diagram is only used to illustrate the structure of the display panel 10. During implementation, the structure of the display panel 10 may be configured according to corresponding types. If the display panel is a liquid crystal display panel, the side of the display panel 10 away from the cover 20 may further include other structures including a backlight module and the like, and the liquid crystal display panel may further include other structures including a polarizer and the like, which may not be described in detail in various embodiments of the present disclosure and may refer to the structures of the display panels in the existing technology.

It may be understood that in one embodiment and subsequent embodiments, the first charged particles 303A included in the microcapsule structure 303 may be black charged particles, the second charged particles 303B included in the microcapsule structure 303 may be white charged particles, the first charged particles 303A may be positively charged, and the second charged particles 303B may be negatively charged, which may be taken as an example to describe the principle of each embodiment.

Figure 7:
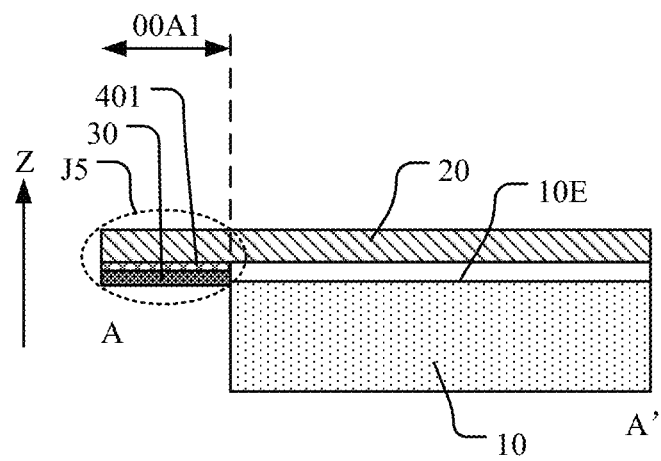
FIG. 7 illustrates another cross-sectional view along an A-A' direction in FIG. 1.
Figure 8:
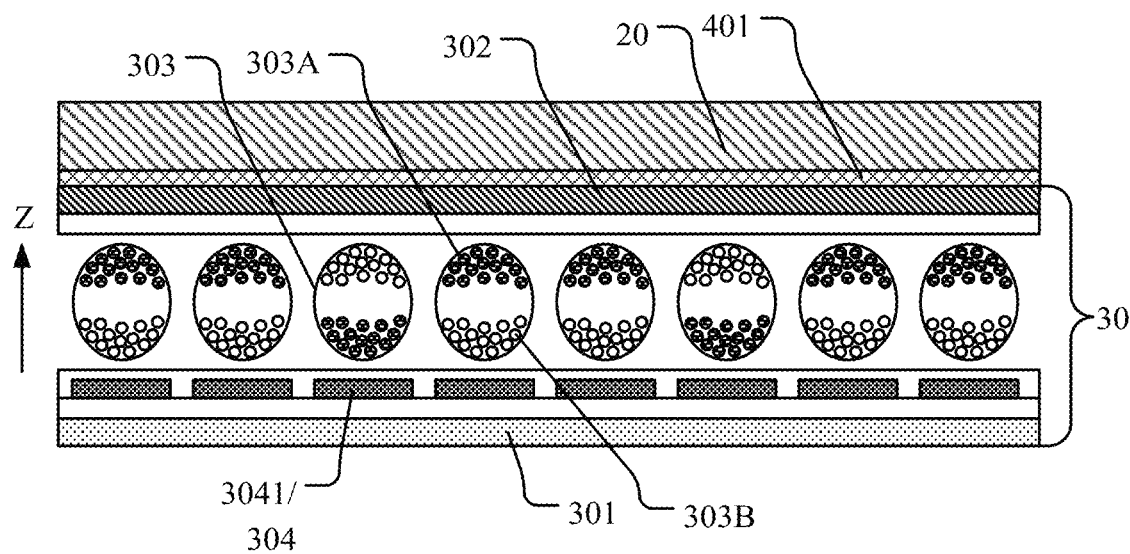
FIG. 8 illustrates a local enlarged schematic of a J5 region in FIG. 7.

In some optional embodiments, referring to FIGS. 1, 7 and 8, FIG. 7 illustrates another cross-sectional view along an A-A' direction in FIG. 1; and FIG. 8 illustrates a local enlarged schematic of a J5 region in FIG. 7. In one embodiment, the side of the cover 20 facing the display panel 20 may include the first optical adhesive layer 401, and the color-changing assembly 30 may be fixed to the cover 20 through the first optical adhesive layer 401.

In one embodiment, it describes that when the display module 000 is formed and the color-changing assembly 30 is only in the first region 00A1, after the display panel 10 and the cover 20 are formed, the cover 20 and the color-changing assembly 30 may be bonded and fixed with each other through the first optical adhesive layer 401. The first optical adhesive layer 401 may be made of optical clear adhesive (OCA). The optical adhesive may be coated on the side of the color-changing assembly 30 facing the cover 20 (such as the surface of the second substrate 302 facing the cover 20) and may be attached to the region of the cover 20 extended outside of the display panel 10 within the first region 00A1. Furthermore, the first optical adhesive layer 401 between the color-changing assembly 30 and the cover 20 may be formed by UV or thermal solidification, thereby realizing the assembly of the color-changing assembly 30 and the cover 20 using simple formation process and convenient packaging.

Figure 9:
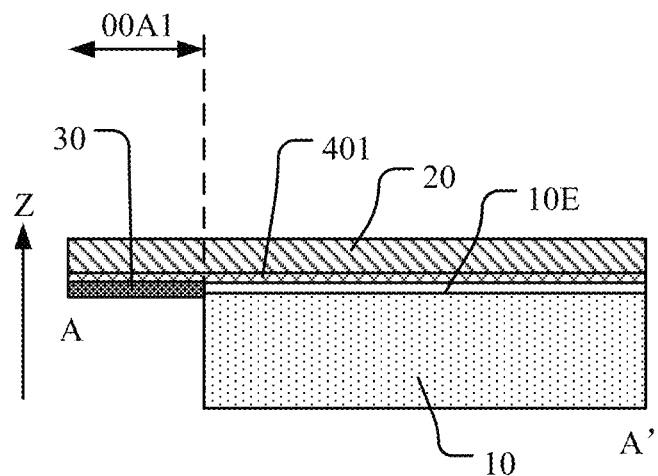
FIG. 9 illustrates another cross-sectional view along an A-A' direction in FIG. 1.

In some optional embodiments, referring to FIGS. 1 and 9, FIG. 9 illustrates another cross-sectional view along the A-A' direction in FIG. 1. In one embodiment, the side of the cover 20 facing the display panel 20 may include the first optical adhesive layer 401; and the color-changing assembly 30 may be fixed to the cover 20 through the first optical adhesive layer 401.

In one embodiment, it describes that when the display module 000 is formed and the color-changing assembly 30 is only in the first region 00A1, the cover 20 and the color-changing assembly 30 may be bonded and fixed to each other through the first optical adhesive layer 401 when the display panel 10 and the cover 20 are assembled and formed. In addition, the first optical adhesive layer 401 may also be used as a fixing material between the display panel 10 and the cover 20. The first optical adhesive layer 401 may be made of optical clear adhesive (OCA). For example, when the cover 20, the color-changing assembly 30, and the display panel 10 are assembled, the optical adhesive may be coated on one side of the cover 20. Next, the color-changing assembly 30 may be attached to the first region 00A1, and the display panel 10 may be attached to other regions. Furthermore, through UV or thermal solidification, entire-surface first optical adhesive layer 401 may be formed between the color-changing assembly 30 and the cover 20, thereby realizing the assembly of the color-changing assembly 30, the display panel 10 and the cover 20 using simple formation process and convenient packaging.

It may be understood that an upper polarizer may also be included between the cover 20 and the light-emitting surface 10E of the display panel 10 in various embodiments of the present disclosure, which may not be illustrated in the drawings of embodiments of the present disclosure. During implementation, the structures of the display panel 10 and the cover 20 and other needed structures may be configured according to actual type of the display panel, which may not be described in detail herein.

Figure 10:
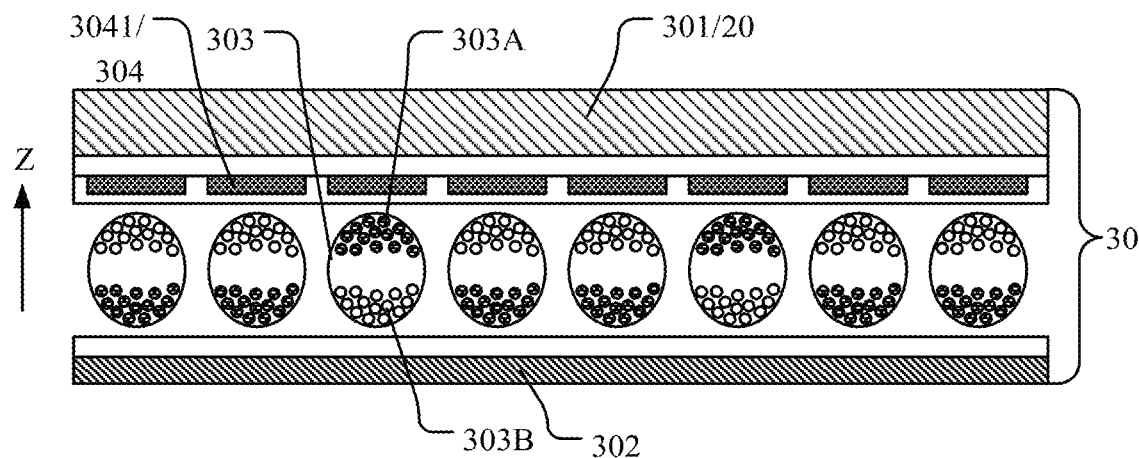
FIG. 10 illustrates another local enlarged schematic of a J1 region in FIG. 2.

In some optional embodiments, referring to FIGS. 1, 2 and 10, FIG. 10 illustrates another local enlarged schematic of the J1 region in FIG. 2. In one embodiment, the first substrate 301 of the color-changing assembly 30 may be on the side of the second substrate 302 away from the display panel 10, and at least a part of the cover 20 may be reused as the first substrate 301.

In one embodiment, it describes that when the color-changing assembly 30 is disposed in at least the first region 00A1, along the direction Z perpendicular to the plane of the display panel 10, the first substrate 301 of the color-changing assembly 30 may be on the side of the second substrate 302 away from the display panel 10, which may be taken as an example for illustration. At this point, at least a part of the cover 20 may be reused as the first substrate 301. That is, the cover 20 within the first region 00A1 may be reused as the first substrate 301 of the color-changing assembly 30. The cover 20 made of tempered glass may be reused as the first substrate 301, which may be beneficial for reducing the thickness of entire module in the first region 00A1 and removing the step of coating and fixing the first optical adhesive layer between the color-changing assembly 30 and the cover 20, thereby being beneficial for improving process efficiency.

Figure 11:
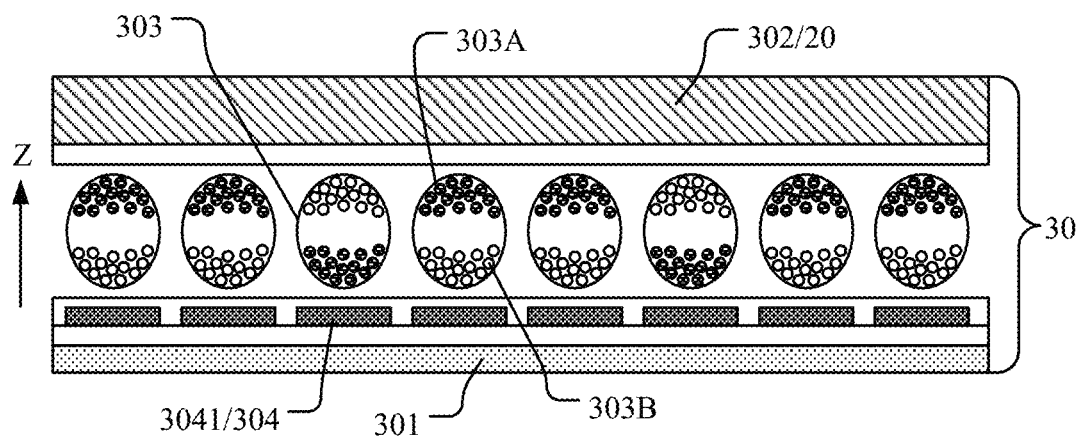
FIG. 11 illustrates another local enlarged schematic of a J1 region in FIG. 2.

Optionally, referring to FIGS. 1, 2 and 11, FIG. 11 illustrates another local enlarged schematic of the J1 region in FIG. 2. If along the direction Z perpendicular to the plane of the display panel 10, the second substrate 302 of the color-changing assembly 30 is on the side of the first substrate 301 away from the display panel 10, at least a part of the cover 20 may be reused as the second substrate 302.

Figure 12:
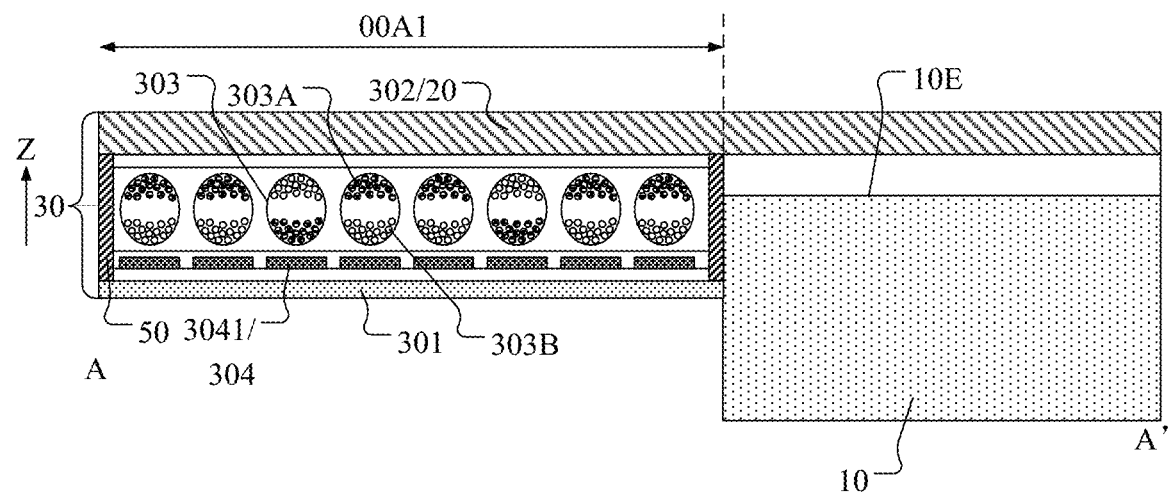
FIG. 12 illustrates another cross-sectional view along an A-A' direction in FIG. 1.

Referring to FIGS. 1 and 12, FIG. 12 illustrates another cross-sectional view along the A-A' direction in FIG. 1. In one embodiment, it describes that the structure of the cover 20 may be reused as the substrate on the side of the color-changing assembly 30 adjacent to the cover 20, which may reduce the thickness of entire module in the first region 00A1 and remove the step of coating and fixing the optical adhesive between the color-changing assembly 30 and the cover 20, thereby being beneficial for improving process efficiency. An encapsulation structure 50 may also be disposed on the periphery of the color-changing assembly 30 to seal the microcapsule structure 30 in the space formed between the first substrate 301 and the second substrate 302.

Figure 13:
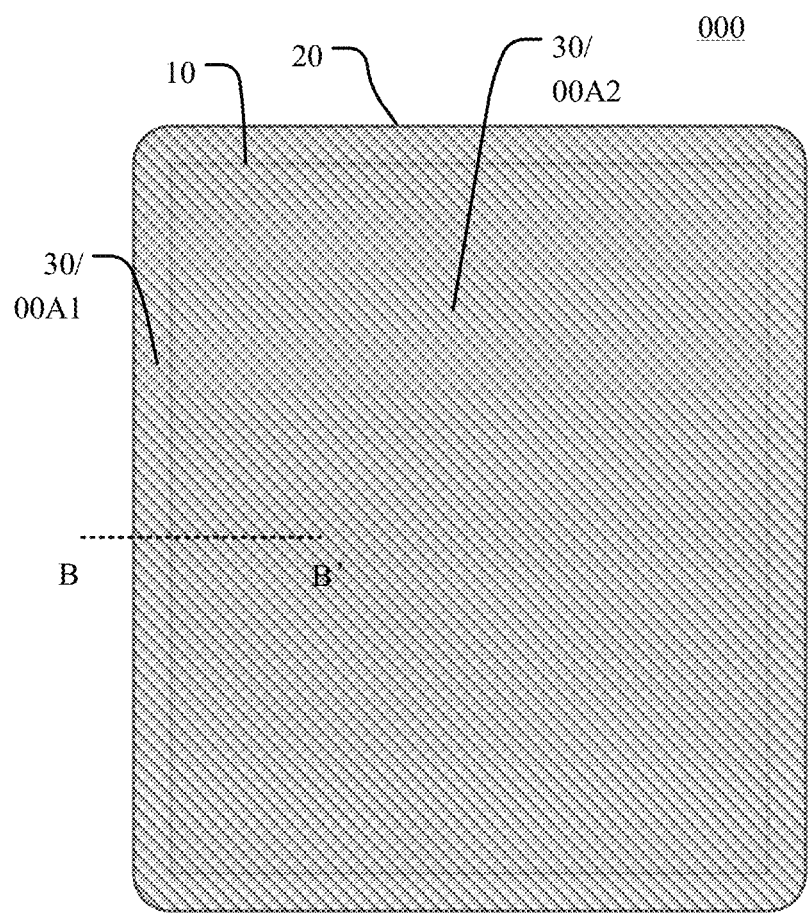
FIG. 13 illustrates another planar structural schematic of a display module according to various embodiments of the present disclosure.
Figure 14:
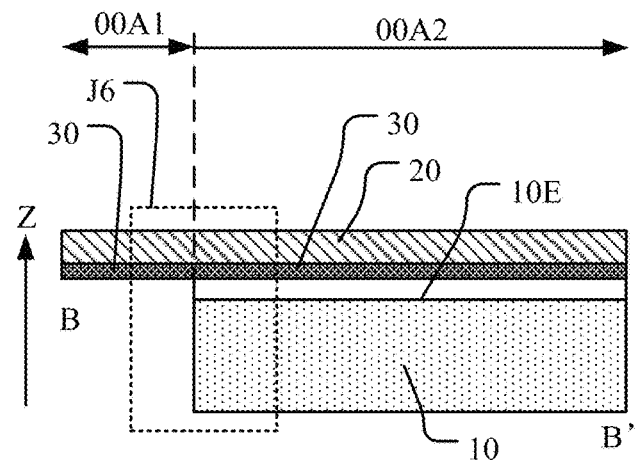
FIG. 14 illustrates a cross-sectional view along a B-B' direction in FIG. 13.
Figure 15:
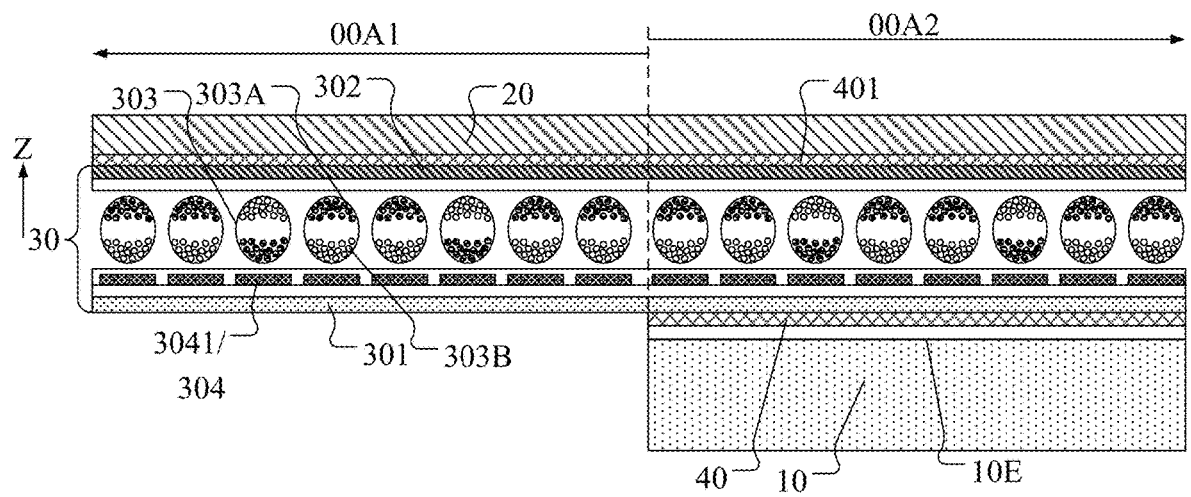
FIG. 15 illustrates a local enlarged schematic of a J6 region in FIG. 14.

In some optional embodiments, referring to FIGS. 13-15, FIG. 13 illustrates another planar structural schematic of a display module according to various embodiments of the present disclosure; FIG. 14 illustrates a cross-sectional view along a B-B' direction in FIG. 13; and FIG. 15 illustrates a local enlarged schematic of a J6 region in FIG. 14. It may be understood that, in order to clearly illustrate the structure of one embodiment, transparency filling is performed in FIG. 13. In one embodiment, the cover 20 may further include the second region 00A2, and the orthographic projection of the display panel 10 on the cover 20 may be in the second region 00A2.

The color-changing assembly 30 may be also in the second region 00A2. In the second region 00A2, the color-changing assembly 30 may be between the cover 20 and the display panel 10.

In one embodiment, it describes that the structure of the color-changing assembly 30 in above-mentioned embodiment may not only be disposed in the range of the first region 00A1 of the cover 20 extended outside of the display panel 10 but may also be further disposed in the region where the display panel 10 and the cover 20 are overlapped with each other. For example, the orthographic projection of the display panel 10 on the cover 20 may be in the second region 00A2. The second region 00A2 may also be understood as a region other than the first region 00A1. The color-changing assembly 30 may be not only in the first region 00A1, but also in the second region 00A2. In addition, in the second region 00A2, the color-changing assembly 30 may be disposed between the cover 20 and the display panel 10, that is, the color-changing assembly 30 may be on the side of the light-emitting surface 10E of the display panel 10 facing the cover 20. It may be understood that in one embodiment, the structure of the color-changing assembly 30 in the second region 00A2 and the structure of the color-changing assembly 30 in the first region 00A1 may be same; that is, the structure of the color-changing assembly 30 in the second region 00A2 and the structure of the color-changing assembly 30 in the first region 00A1 may be formed into one single piece. In a formation process, after the display panel 10 is formed and before the display panel 10 is attached to the cover 20, the first optical adhesive layer 401 may be coated on the side of the cover 20 facing the display panel 10; assembled color-changing assembly 30 may be attached to the first region 00A1 and the second region 00A2 of the cover 20; next, the second optical adhesive layer 402 may be coated on the side of the display panel 10 facing the cover 20 (when the side of the display panel 10 facing the cover 20 includes a polarizer, the second optical adhesive layer 402 may be coated on the side of the polarizer facing the cover 20); and the display panel 10 may be assembled with the cover 20 with the color-changing assembly 30 (as shown in FIG. 14), which may be a convenient and quick process.

In one embodiment, the color-changing assembly 30 may be also disposed in the second region 00A2 of the cover 20 where the display panel 10 is located. The color-changing assembly 30 may be configured to adjust the hue of the region where the display panel 10 is located in the screen-off state. For example, the voltage value on the first electrode 3041 of the color-changing assembly 30 within the range of the second region 00A2 may be adjusted when the display panel 10 is in the screen-off state. Furthermore, the integrated black visual effect of the first region 00A1 and the second region 00A2 may be further improved by adjusting the hue of the second region 00A2.

Or in some other optional embodiments, the color type of the second region 00A2 in the screen-off state may also be changed by changing the color of the charged particles in the microcapsule structure 303. Furthermore, the color of the second region 00A2 may be consistent with surrounding environment, thereby integrating the display module 000 in the screen-off state into surrounding environment, such that the display module 000 may have integrated display effect that is not obtrusive compared to surrounding environment, which may refer to the description in subsequent embodiments. In one embodiment, it only illustrates that the second region 00A2 of the cover 20 where the display panel 10 is located may also be disposed with the color-changing assembly 30 that has substantially same color as the first region 00A1, thereby achieving desirable integrated black effect of the display module 000.

Figure 16:
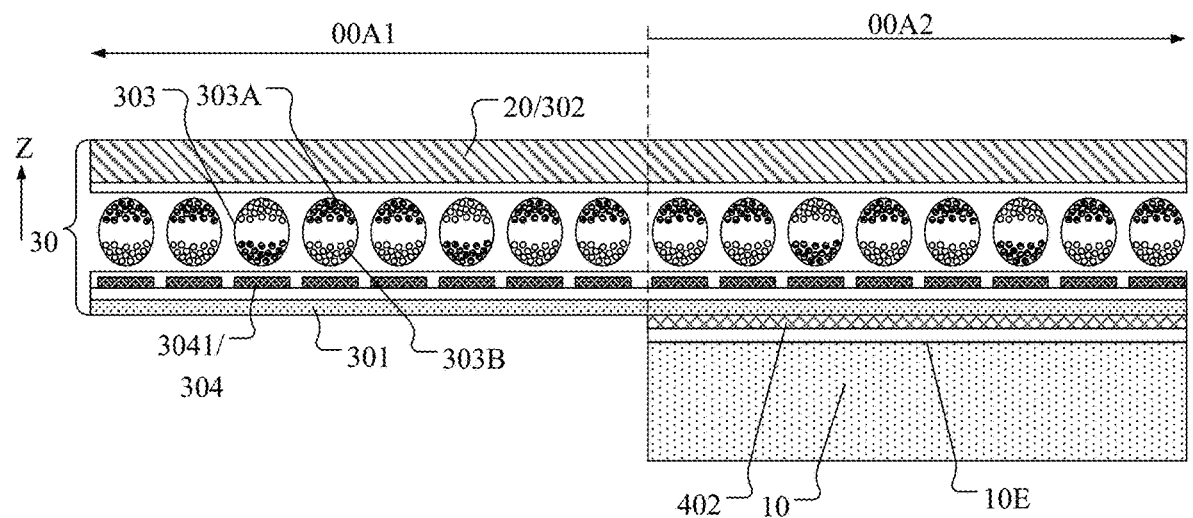
FIG. 16 illustrates another local enlarged schematic of a J6 region in FIG. 14.
Figure 17:
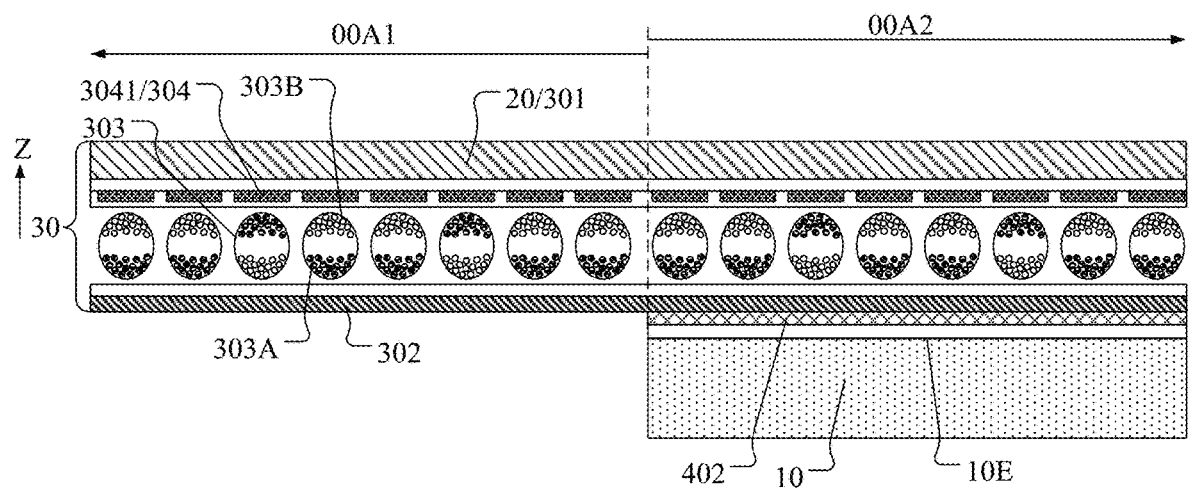
FIG. 17 illustrates another local enlarged schematic of a J6 region in FIG. 14.

Optionally, in one embodiment, when the color-changing assembly 30 is still in the second region 00A2, entire cover 20 may be reused as one of the substrates of the color-changing assembly 30. Referring to FIGS. 13, 14 and 16, FIG. 16 illustrates another local enlarged schematic of the J6 region in FIG. 14. When the first substrate 301 is on the side of the microcapsule structure 303 away from the cover 20, entire cover 20 of the first region 00A1 and the second region 00A2 may be reused as the second substrate 302 of the color-changing assembly 30. Referring to FIGS. 13, 14 and 17, FIG. 17 illustrates another local enlarged schematic of the J6 region in FIG. 14. When the second substrate 302 is on the side of the microcapsule structure 303 away from the cover 20, entire cover 20 of the first region 00A1 and the second region 00A2 may be reused as the first substrate 301 of the color-changing assembly 30, which may not only reduce the coating step of the optical adhesive layer and improve process efficiency, but also be beneficial for reducing the thickness of entire module.

Figure 18:
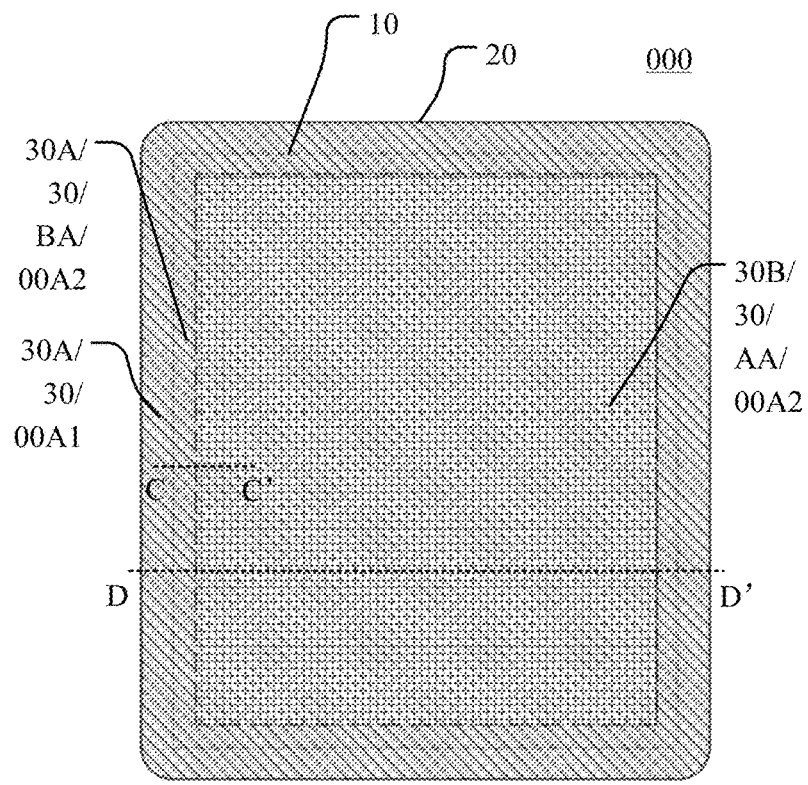
FIG. 18 illustrates another planar structural schematic of a display module according to various embodiments of the present disclosure.
Figure 19:
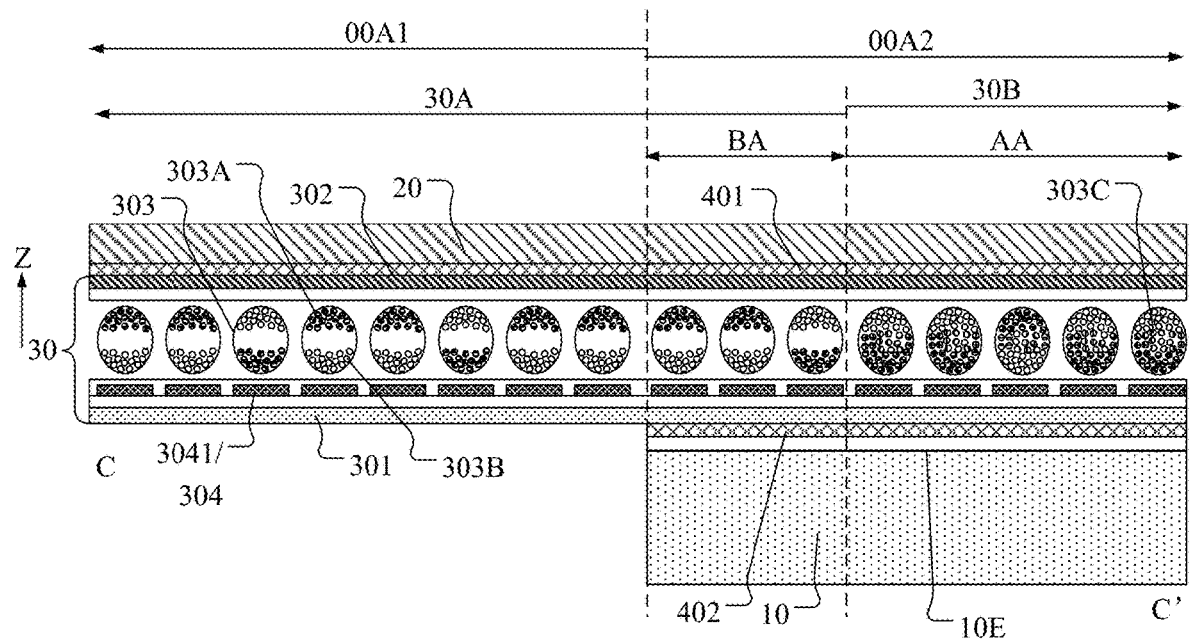
FIG. 19 illustrates a cross-sectional view along a C-C' direction in FIG. 18.

In some optional embodiments, referring to FIGS. 18-19, FIG. 18 illustrates another planar structural schematic of a display module according to various embodiments of the present disclosure; and FIG. 19 illustrates a cross-sectional view along a C-C' direction in FIG. 18. It may be understood that, in order to clearly illustrate the structure of one embodiment, transparency filling is performed in FIG. 18. In one embodiment, the display panel 10 of the second region 00A2 may include a display region AA and a frame region BA.

The color-changing assembly 30 may include the first color-changing assembly 30A and the second color-changing assembly 30B. The first color-changing assembly 30A may be in the first region 00A1 and the frame region BA, and the second color-changing assembly 30B may be in the display region AA.

In the first color-changing assembly 30A, the first charged particles 303A in the microcapsule structure 303 may be black charged particles, and the second charged particles 303B may be white charged particles. In one embodiment and subsequent embodiments, the first charged particles 303A may be black positively charged particles, and the second charged particles 303B may be white negatively charged particles, which may be taken as an example for illustration.

In the second color-changing assembly 30B, the microcapsule structure 303 may further include a plurality of third charged particles 303C which are color charged particles.

In one embodiment, it describes that the region of the display module 000 may be divided into the first region 00A1 of the cover 20 extended outside of the display panel 10, the frame region BA of the display panel 10 (the peripheral region of the display panel 10 for not displaying images), and the display region AA of the display panel 10 (the region for displaying images). In addition, the color-changing assembly 30 both in the first region 00A1 and the second region 00A2 may include the first color-changing assembly 30A and the second color-changing assembly 30B. The color-changing assembly in the first region 00A1 and the frame region BA may be named as the first color-changing assembly 30A (it may be understood that the first color-changing assembly 30A may be in all non-display-image regions of entire display module 000); and the color-changing assembly in the display region AA may be named the second color-changing assembly 30B. In one embodiment, the type of charged particles included in the microcapsule structure 303 of the first color-changing assembly 30A may be configured to be different from the type of charged particles included in the microcapsule structure 303 of the second color-changing assembly 30B. For example, in the first color-changing assembly 30A, the first charged particles 303A in the microcapsule structure 303 may be black positively charged particles, and the second charged particles 303B may be white negatively charged particles. In the second color-changing assembly 30B, in addition to the first charged particles 303A (black positively charged) and the second charged particles 303B (white negatively charged), the microcapsule structure 303 may further include a plurality of colored third charged particles 303C, where different color charged particles may have different charge amounts. Therefore, when the display panel 10 of the display module 000 is in the screen-off state, by adjusting the voltage value on the first electrode 3041 in the second color-changing assembly 30B of the display region AA, the movement positions of the first charged particles 303A, the second charged particles 303B, and the third charged particles 303C along the direction Z perpendicular to the plane of the display panel 10 may be changed. In such way, the visible color of the display region AA of the display module 000 may be consistent with the color of the environment around the display module 000. That is, the black charged particles, the white charged particles, and other color charged particles (red, green, blue and the like) may be used to prepare hues other than gray, thereby being close to the reflective hue of the display panel. For example, the integrated display effect may be improved by adjusting the voltage on the first electrode 3041 in the second color-changing assembly 30B within the display region AA. For example, when the display module 000 is a vehicle-mounted display module, by applying above-mentioned solution, when the display module is in the screen-off state, that is, when the display region AA of the display panel 10 does not display images, the visible color of the display module 000 in the display region AA may be adjusted through the second color-changing assembly 30B, such that the color of entire display module 000 may be consistent with the color of the car interior. If the car interior is yellowish, the voltage value on the first electrode 3041 in the second color-changing assembly 30B may be adjusted to cause the colored third charged particles 303C to move, such that the visible color of the display region AA may be adjusted to yellowish to be integrated with the interior color of the car as possible, thereby forming the integrated display effect and being beneficial for improving the user experience.

For example, in one embodiment, the color charged particles (i.e., the third charged particles 303C) of the second color-changing assembly 30B may include at least one of red particles 303C1, green particles 303C2, and blue particles 303C3. Therefore, the third charged particle 303C may be at least charged particle of one color in three primary colors. In such way, when the first electrode 3041 controls the positions of the third charged particles 303C in the microcapsule structure 303 to be different, corresponding visible colors at the positions of the microcapsule structure 303 may be different, thereby changing the visible color of the display region AA in the screen-off state.

Figure 20:
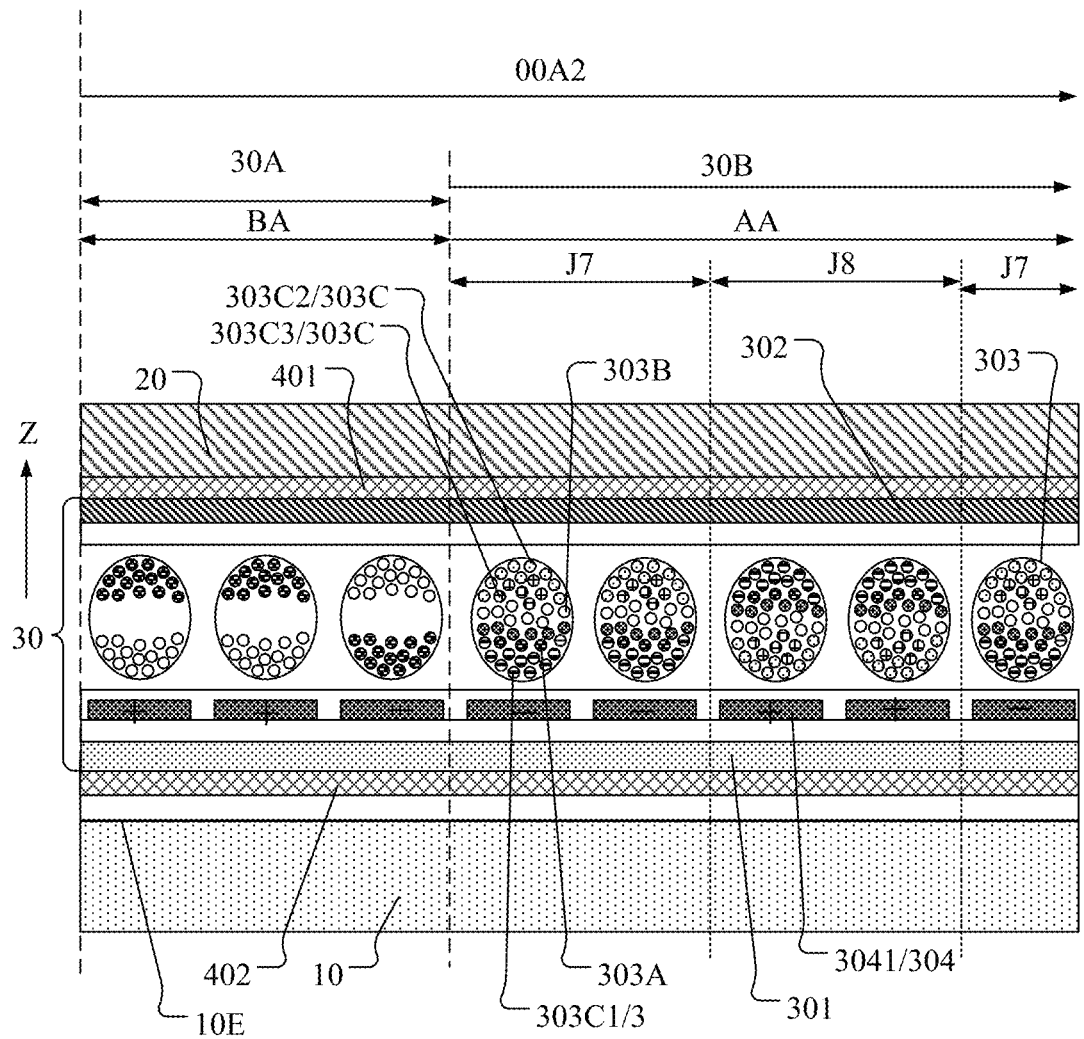
FIG. 20 illustrates a structural schematic of different movement states of charged particles with different microcapsule structures.

Optionally, referring to FIGS. 18-20, FIG. 20 illustrates a structural schematic of different movement states of charged particles with different microcapsule structures according to various embodiments of the present disclosure. In the second color-changing assembly 30B, the plurality of third charged particles 303C in one microcapsule structure 303 may include at least one of the red particles 303C1, the green particles 303C2, and the blue particles 303C3. For example, one microcapsule structure 303 may include the red particles 303C1, the green particles 303C2 and the blue particles 303C3 (illustrated with different filling patterns in FIG. 20). In such way, corresponding position of one single microcapsule structure 303 may directly display various colors. In a same microcapsule structure 303, the charge amounts of the third charged particles 303C of different colors may be configured to be different. Different voltages on the first electrode 3041 may be used to cause the third charged particles 303C of different colors to move at different speeds in a same microcapsule structure 303, thereby achieving the display of different colors.

It is assumed that in FIG. 20, the first charged particles 303A in one microcapsule structure 303 are black positively charged particles, the red particles 303C1 in the third charged particles 303C are positively charged, and the amount of positive charges carried by the red particles 303C1 may be higher than the amount of positive charges carried by the black first charged particles 303A; and the green particles 303C2 and the blue particles 303C3 in the third charged particles 303C are all negatively charged, the second charged particles 303B are white negatively charged particles, the amount of positive charges carried by the green particles 303C2 may be lower than the amount of positive charges carried by the blue particles 303C3, and the amount of positive charges carried by the blue particles 303C3 may be lower than the amount of positive charges carried by the white second charged particles 303B.

The first substrate 301 on the side of the second substrate 302 away from the cover 20 may be taken as an example.

When a negative voltage is applied to the first electrode 3041 at the position J7 in FIG. 20, the positively charged red particles 303C1 and the black first charged particles 303A may move toward the first electrode 3041 due to the attraction of opposite charges. Since the amount of positive charges carried by the red particle 303C1 is higher than the amount of positive charges carried by the first charged particle 303A, the red particles 303C1 may move faster and reach the first electrode 3041 first, and the black first charged particles 303A may follow. The green particles 303C2, the blue particles 303C3, and the white second charged particles 303B which are negatively charged may move toward the direction away from the first electrode 3041 due to the repulsion of same charges, that is, may move toward the direction adjacent to the second substrate 302 (that is, adjacent to the cover 20). The amount of negative charges carried by the green particles 303C2 may be lower than the amount of negative charges carried by of the blue particles 303C3, and the amount of negative charges carried by the blue particles 303C3 may be lower than the amount of negative charges carried by of the second charged particles 303B; that is, the amount of negative charges carried by the green particles 303C2 may be the lowest. Therefore, the green particles 303C2 may move faster after being repelled and reach the second substrate 302 first, and the blue particles 303C3 may follow. The white second charged particles 303B may be the slowest to reach the second substrate 302, which may cause the visible color of the side of the microcapsule structure 303 adjacent to the cover 20 to be green.

When a positive voltage is connected to the first electrode 3041 at the position J8 in FIG. 20, the green particles 303C2, the blue particles 303C3, and the white second charged particles 303B which are negatively charged may move toward the direction adjacent to the first electrode 3041 due to the repulsive attraction of opposite charges, that is, may move toward the direction adjacent to the first substrate 301 (that is, away from the cover 20). The amount of negative charges carried by the green particles 303C2 may be lower than the amount of negative charges carried by the blue particles 303C3, and the amount of negative charges carried by the blue particles 303C3 may be lower than the amount of negative charges carried by of the second charged particles 303B; that is, the green particles 303C2 may have the lowest amount of negative charges. Therefore, the green particles 303C2 may move faster after being attracted and arrive at the first substrate 301 first; the blue particles 303C3 may follow; and the white second charged particles 303B may be the slowest to reach the first substrate 301. In addition, the positively charged red particles 303C1 and the black first charged particles 303A may move toward the direction away from the first electrode 3041 due to the repulsion of same charges, that is, move toward the direction adjacent to the second substrate 302 (i.e., adjacent to the cover 20). The amount of positive charges carried by the red particles 303C1 may be higher than the amount of positive charges carried by the first charged particles 303A. Therefore, the red particles 303C1 may move faster and reach the second substrate 302 first, and the black first charged particles 303A may follow, which may cause the visible color of the microcapsule structure 303 adjacent to the cover 20 to be red.

It may be understood that, in one embodiment, the movement states of above-mentioned color charged particles may be exemplary to illustrate how the second color-changing assembly 30B achieves the integrated display effect of visible color changes in the display region AA. During implementation, the charge amounts and charge types of the color charged particles may also be others. For example, the amount of positive charges carried by the black first charged particles 303A may be higher than the amount of positive charges carried by the red particles 303C1; the amount of negative charges carried by the white second charged particles 303B may be lower than the amount of negative charges carried by the green particles 303C2; and the amount of negative charges carried by the blue particles 303C3 may be lower than the amount of negative charges carried by the green particles 303C2. In such way, when the first electrode 3041 is negatively charged, the black first charged particles 303A may be attracted to the first electrode 3041 relatively quickly, and the white second charged particles 303B may be repelled relatively quickly and arrive the position adjacent to the cover 20, the visible color may be white and other settings, which may not be limited in various embodiments of the present disclosure.

In one embodiment, the microcapsule structures 303 of the second color-changing assembly 30B of the display region AA may be configured to include both black charged particles and white charged particles, which may achieve an integrated black effect; and the microcapsule structures 303 of the second color-changing assembly 30B in the display region AA may also be configured to include color charged particles. Color change at different positions of the microcapsule structures 303 may be implemented by adjusting the voltage applied on the first electrode 3041. Furthermore, the display module 000 may be matched with the color of surrounding environment to be integrated with each other when the screen is in the screen-off state, thereby providing users with desirable visual experience of integrated display. Moreover, one microcapsule structure 303 may include three types of third charged particles 303C of different colors, which may be beneficial for improving the display accuracy of visible colors.

Figure 21:
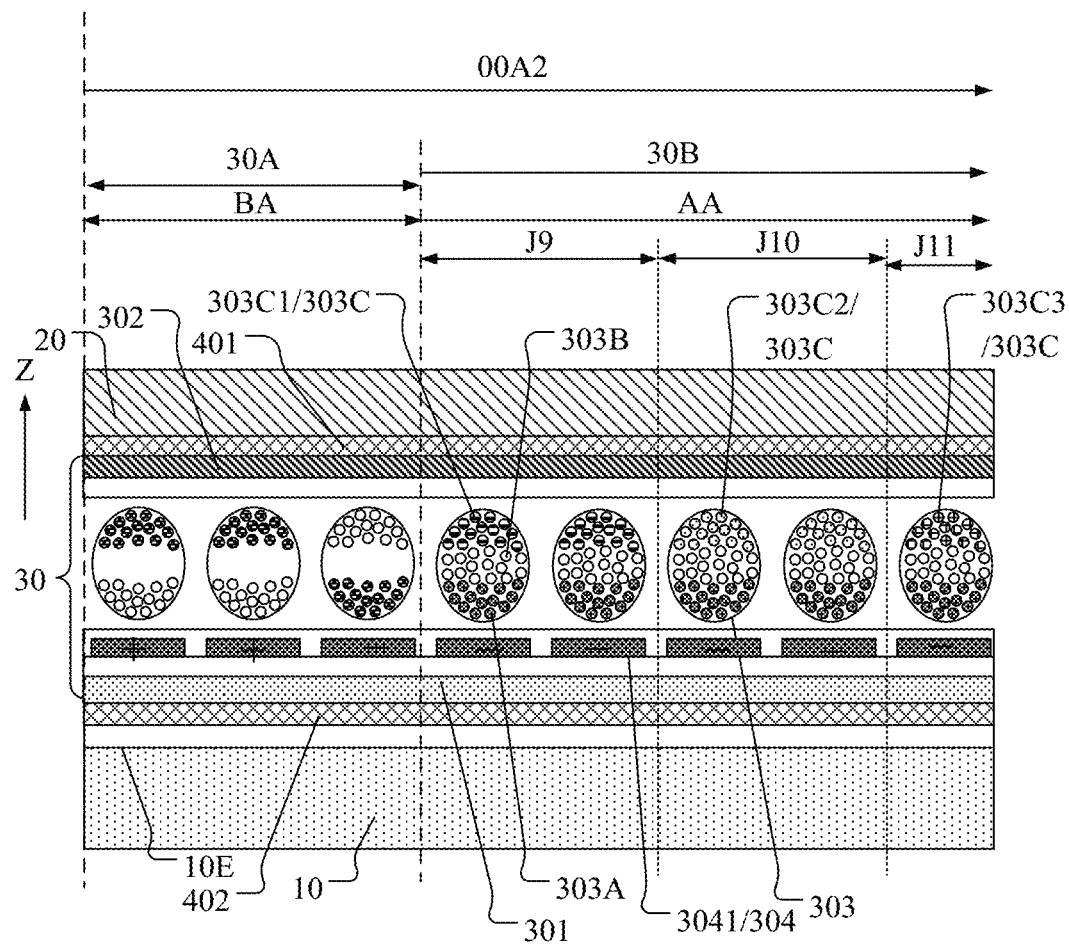
FIG. 21 illustrates another structural schematic of different movement states of charged particles with different microcapsule structures.

Optionally, referring to FIGS. 18, 19 and 21, FIG. 21 illustrates another structural schematic of different movement states of charged particles with different microcapsule structures. In the second color-changing assembly 30B, the plurality of third charged particles 303C in one microcapsule structure 303 may have same color; and the third charged particles 303C in two adjacent microcapsule structures 303 may have different colors. For example, the plurality of third charged particles 303C in three microcapsule structures 303 may be respectively red positively charged particles, green negatively charged particles, and blue negatively charged particles, such that corresponding positions of different microcapsule structures 303 may display different colors. In the microcapsule structures 303 at different positions, the charge amounts of the third charged particles 303C of different colors may be configured to be different. Different voltages on the first electrode 3041 may be configured to cause the third charged particles 303C of different colors to move at different speeds in same microcapsule structure 303 to achieve the display of different colors.

It is assumed that, in one microcapsule structure 303 in FIG. 21, the first charged particles 303A may be the black positively charged particles, the second charged particles 303B may be the white negatively charged particles, the red particles 303C1 of the third charged particles 303C may be negatively charged, and the amount of negative charges carried by the red particles 303C1 may be lower than the amount of negative charges carried by the white second charged particles 303B; in another microcapsule structure 303, the first charged particles 303A may be the black positively charged particles, the second charged particles 303B may be the white negatively charged particles, the green particles 303C2 of the third charged particles 303C may be negatively charged, and the amount of negative charges carried by the green particles 303C2 may be lower than the amount of negative charges carried by the white second charged particles 303B; and in another microcapsule structure 303, the first charged particles 303A may be the black positively charged particles, the second charged particles 303B may be the white negatively charged particles, the blue particles 303C3 of the third charged particles 303C may be negatively charged, and the amount of negative charges carried by the blue particles 303C3 may be lower than the amount of negative charges carried by the white second charged particles 303B.

The first substrate 301 on the side of the second substrate 302 away from the cover 20 may be taken as an example.

When a negative voltage is applied to the first electrode 3041 at the position J9 in FIG. 21, the black first charged particles 303A which are positively charged may move toward the first electrode 3041 due to the attraction of opposite charges; and the negatively charged red particles 303C1 and the white second charged particles 303B may move toward the direction away from the first electrode 3041 due to the repulsion of same charges, that is, may move toward the direction adjacent to the second substrate 302 (that is, adjacent to the cover 20). The amount of negative charges carried by the red particles 303C1 may be lower than the amount of negative charges carried by the white second charged particles 303B. Therefore, the red particles 303C1 may move faster after being repelled and reach the second substrate 302 first, which may cause the visible color of the side of the microcapsule structure 303 adjacent to the cover 20 to be red.

When a negative voltage is applied to the first electrode 3041 at the position J10 in FIG. 21, the black first charged particles 303A which are positively charged may move toward the direction adjacent to the first electrode 3041 due to the attraction of opposite charges; and the negatively charged green particles 303C2 and the white second charged particles 303B may move toward the direction away from the first electrode 3041 due to the repulsion of same charges, that is, may move toward the direction adjacent to the second substrate 302 (that is, adjacent to the cover 20). The amount of negative charges carried by the green particles 303C2 may be lower than the amount of negative charges carried by the white second charged particles 303B. Therefore, the green particles 303C2 may move faster after being repelled and reach the second substrate 302 first, which may make the visible color of the side of the microcapsule structure 303 adjacent to the cover 20 to be green.

When a negative voltage is applied to the first electrode 3041 at the position J11 in FIG. 21, the black first charged particles 303A which are positively charged may move toward the direction adjacent to the first electrode 3041 due to the attraction of opposite charges; and the negatively charged blue particles 303C3 and the white second charged particles 303B may move toward the direction away from the first electrode 3041 due to the repulsion of same charges, that is, may move toward the direction adjacent to the second substrate 302 (that is, adjacent to the cover 20). The amount of negative charges carried by the blue particles 303C3 may be lower than the amount of negative charges carried by the white second charged particles 303B. Therefore, the blue particles 303C3 may move faster after being repelled and reach the second substrate 302 first, which may make the visible color of the side of the microcapsule structure 303 adjacent to the cover 20 to be blue.

It may be understood that, in one embodiment, the movement states of above-mentioned color charged particles may be only exemplary to illustrate how the second color-changing assembly 30B achieves the integrated display effect of visible color changes in the display region AA. During implementation, the charge amounts and charge types of the color charged particles may also be others, which may not be limited in various embodiments of the present disclosure.

In one embodiment, the microcapsule structures 303 of the second color-changing assembly 30B of the display region AA may be configured to include both black charged particles and white charged particles, which may achieve the integrated black effect; and the microcapsule structures 303 of the second color-changing assembly 30B in the display region AA may also be configured to include color charged particles. Color changes at different positions of the microcapsule structures 303 may be implemented by adjusting the voltage applied on the first electrode 3041. Furthermore, the display module 000 may be matched with the color of surrounding environment to be integrated with each other when the screen is in the screen-off state, thereby providing users with desirable visual experience of integrated display. Moreover, the third charged particles 303C included in different microcapsule structures 303 may have different colors, which may be beneficial for reducing the quantity of charged particles in different microcapsule structures 303 and also reducing the difficulty of controlling charged particles of different colors in single microcapsule structure 303.

It may be understood that the materials for forming the first charged particles 303A, the second charged particles 303B, and the third charged particles 303C may not be limited in various embodiments of the present disclosure. During implementation, relevant materials may be used according to actual existing formation methods to meet the needs of different colors and charge types of charged particles. For example, when the first charged particles 303A are the black charged particles, the first charged particles 303A may be made of carbon black, iron-manganese black, copper chrome black (copper chromite, $CuCr_2O_4$), titanium black (TiO) and/or other materials; when the second charged particles 303B are the white charged particles, the second charged particles 303B may be made of titanium dioxide ($TiO_2$), zinc oxide (zinc white, ZnO), silicon dioxide ($SiO_2$), calcium carbonate ($CaCO_3$) and/or other materials; and when the third charged particles 303C are color charged particles and include at least one of the red charged particles, the green charged particles, and the blue charged particles, the red charged particles may be made of a material including iron oxide (iron red/ferric oxide, $Fe_2O_3$), cadmium red (CdS/CdSe) and/or the like, the green charged particles may be made of a material including cadmium green ($Cr_2O_3$), cobalt green (cobalt/nickel/zinc oxide) and/or the like, and the blue charged particles may be made of a material including cobalt blue (cobalt aluminate $Co(AlO_2)_2$), iron blue ($Fe_4[Fe(CN)_6]_3$) and/or the like. It may be understood that the material for forming the microcapsule structures 303 including above-mentioned charged particles may not be limited in various embodiments of the present disclosure. For example, the medium for forming the microcapsule structure 303 may be tetrachlorethylene and its mixed solvents, and the like. During implementation, the medium may be selected according to actual need.

Figure 22:
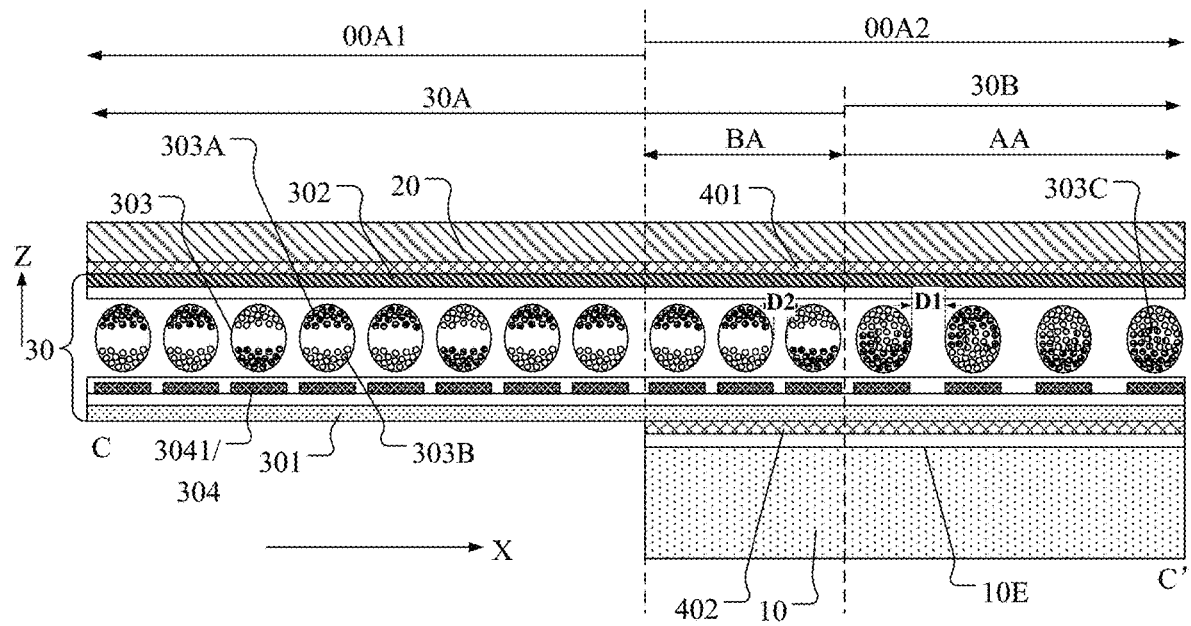
FIG. 22 illustrates another cross-sectional view along a C-C' direction in FIG. 18.

In some optional embodiments, referring to FIGS. 18 and 22, FIG. 22 illustrates another cross-sectional view along the C-C' direction in FIG. 18. In one embodiment, the quantity of microcapsule structures 303 included in the unit area of the first color-changing assembly 30A may be greater than the quantity of the microcapsule structures 303 included in the unit area of the second color-changing assembly 30B.

In one embodiment, it describes that when the display module 000 is disposed with the color-changing assembly 30 in both the display region AA of the display panel 10 and the non-display region outside of the display region (the first region 00A1 of the cover 20 extended outside of the display panel 10 and the frame region BA of the display panel 10), the structure of the color-changing assembly 30 in different regions may be designed differently. For example, the color-changing assembly 30 in the first region 00A1 and the frame region BA may be the first color-changing assembly 30A, and the color-changing assembly 30 in the display region AA may be the second color-changing assembly 30B. The quantity of microcapsule structures 303 included per unit area in the first color-changing assembly 30A may be configured to be greater than the quantity of microcapsule structures 303 included per unit area in the second color-changing assembly 30B. The unit area of the first color-changing assembly 30A may be understood as the unit area of the orthographic projection of the first color-changing assembly 30A along the direction Z perpendicular to the plane of the display panel 10. The unit area of the second color-changing assembly 30B may be understood as the unit area of the orthographic projection of the second color-changing assembly 30B along the direction Z perpendicular to the plane of the display panel 10. To compare above two color-changing assemblies with same unit area, it needs to configure that the quantity of microcapsule structures 303 included in the unit area in the first color-changing assembly 30A is greater than the quantity of microcapsule structures 303 included in the unit area in the second color-changing assembly 30B. That is, the distribution density of the microcapsule structures 303 of the second color-changing assembly 30B in the display region AA may be less than the distribution density of the microcapsule structures 303 of the first color-changing assembly 30A in the non-display region (the first region 00A1 and the frame region BA). The distribution density of the microcapsule structures 303 in the display region AA may be small, which may reduce the interference of disposed microcapsule structures 303 on the transmission brightness of the display region AA and prevent disposed microcapsule structures 303 from affecting the display brightness of the display region AA of the display module 000 when the display panel 10 is turned on for normal image display, thereby improving the display quality of the display module 000 during normal operation.

Optionally, in one embodiment, in order to configure that the distribution density of the microcapsule structures 303 of the second color-changing assembly 30B in the display region AA is than the distribution density of the microcapsule structures 303 of the first color-changing assembly 30A in the non-display region (the first region 00A1 and the frame region BA), the distance D1 between two adjacent microcapsule structures 303 of the second color-changing assembly 30B in the display region AA may be configured to be greater than the distance D2 between two adjacent microcapsule structures 303 of the first color-changing assembly 30A in the non-display region. As shown in FIG. 22, the distance referred to in one embodiment is the distance along the direction X in parallel with the plane where the cover 20 is located. Furthermore, it may implement that the quantity of microcapsule structures 303 included in the unit area of the first color-changing assembly 30A is greater than the quantity of the microcapsule structures 303 included in the unit area of the second color-changing assembly 30B.

It should be noted that when the distance D1 between two adjacent microcapsule structures 303 of the second color-changing assembly 30B in the display region AA is configured to be greater than the distance between two adjacent microcapsule structures 303 of the first color-changing assembly 30A in the non-display region At D2, the distances between all first electrodes 3041 corresponding to the first electrode layer 304 of the second color-changing assembly 30B in the display region AA may also be adjusted accordingly. For example, the distance between two adjacent first electrodes 3041 of the second color-changing assembly 30B in the display region AA may be greater than the distance between two adjacent first electrodes 3041 of the first color-changing assembly 30A in the non-display region. The distance referred to in one embodiment is the distance along the direction X in parallel with the plane where the cover 20 is located. Therefore, the movement of charged particles in at least one microcapsule structure 303 may be controlled through one first electrode 3041.

It may be understood that in some other optional embodiments, other configuration manners may also be used to make the distribution density of the microcapsule structures 303 of the second color-changing assembly 30B to be less than the distribution density of the microcapsule structures 303 of the first color-changing assembly 30A, which may not be limited in various embodiments of the present disclosure.

It may be understood that the quantities, shapes, and sizes of the microcapsule structures 303 in FIG. 22 of one embodiment may be only exemplary to illustrate that the distribution density of the microcapsule structures 303 of the second color-changing assembly 30B in the display region AA is less than the distribution density of the microcapsule structures 303 in the non-display region. During implementation, the design structure of the microcapsule structures 303 may be configured according to actual need.

Figure 23:
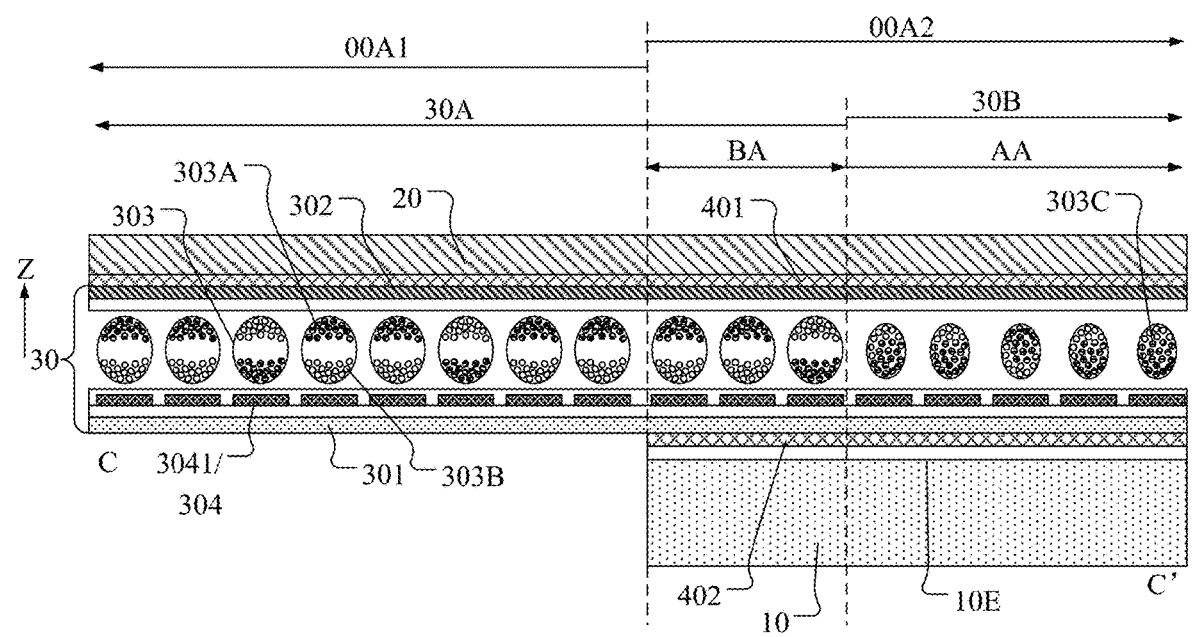
FIG. 23 illustrates another cross-sectional view along a C-C' direction in FIG. 18.

In some optional embodiments, referring to FIGS. 18 and 23, FIG. 23 illustrates another cross-sectional view along the C-C' direction in FIG. 18. In one embodiment, the volume of the microcapsule structure 303 in the first color-changing assembly 30A may be larger than the volume of the microcapsule structure 303 in the second color-changing assembly 30B.

In one embodiment, it describes that the volume of the microcapsule structure 303 in the first color-changing assembly 30A in the non-display region (the first region 00A1 and the frame region BA) may also be configured to be larger than the volume of the microcapsule structure 303 in the second color-changing assembly 30B in the display region AA. In such way, the volume of the microcapsule structure 303 in the second color-changing assembly 30B in the display region AA may be smaller, which may avoid affecting the transmission brightness of the display region AA, and prevent the microcapsule structures from affecting the display brightness of the display region AA of the display module 000 when the display panel 10 is turned on for normal image display, thereby improving the display quality of the display module 000 during normal operation.

Figure 24:
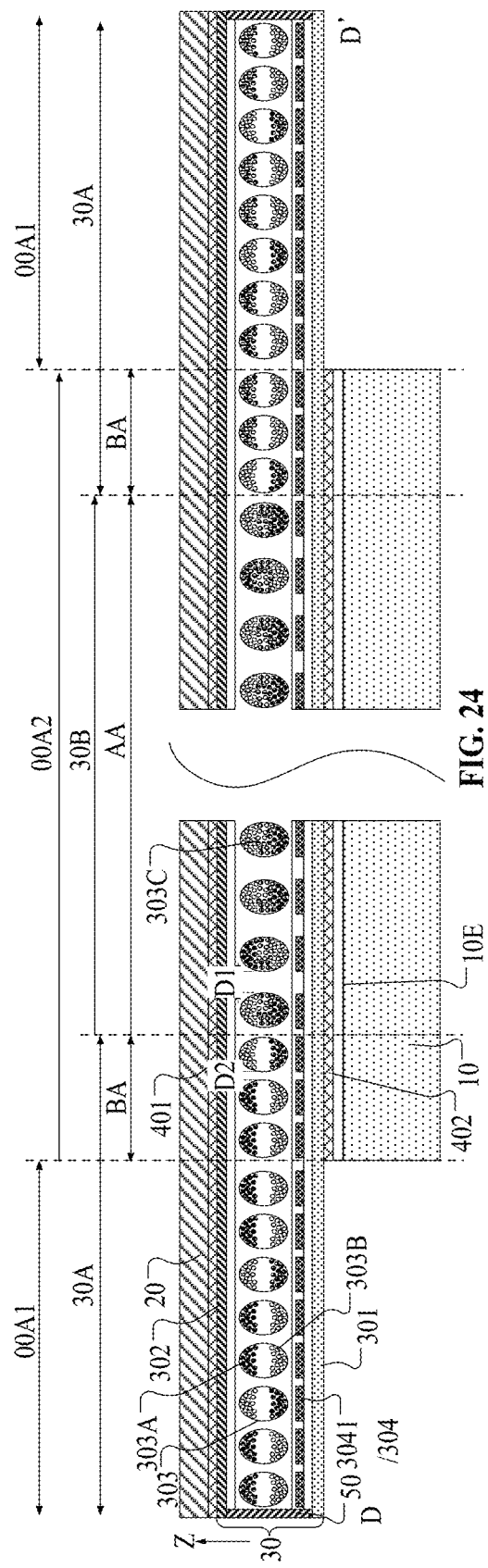
FIG. 24 illustrates a cross-sectional view along a D-D' direction in FIG. 18.

It may be understood that in above-mentioned embodiments corresponding to FIGS. 22 and 23, although the microcapsule structures 303 in the first color-changing assembly 30A and the microcapsule structures 303 in the second color-changing assembly 30B are differentially designed, the first color-changing assembly 30A and the second color-changing assembly 30B may still be formed together. Referring to FIGS. 18 and 24, FIG. 24 illustrates a cross-sectional view along a D-D' direction in FIG. 18. That is, for differentially designed microcapsule structures 303, the microcapsule structures 303 in the first color-changing assembly 30A and the microcapsule structures 303 in the second color-changing assembly 30B may be sealed in the space formed between on the first substrate 301 and the second substrate 302 through the encapsulation structure 50, which may be beneficial for improving overall formation efficiency of the color-changing assemblies 30.

Figure 25:
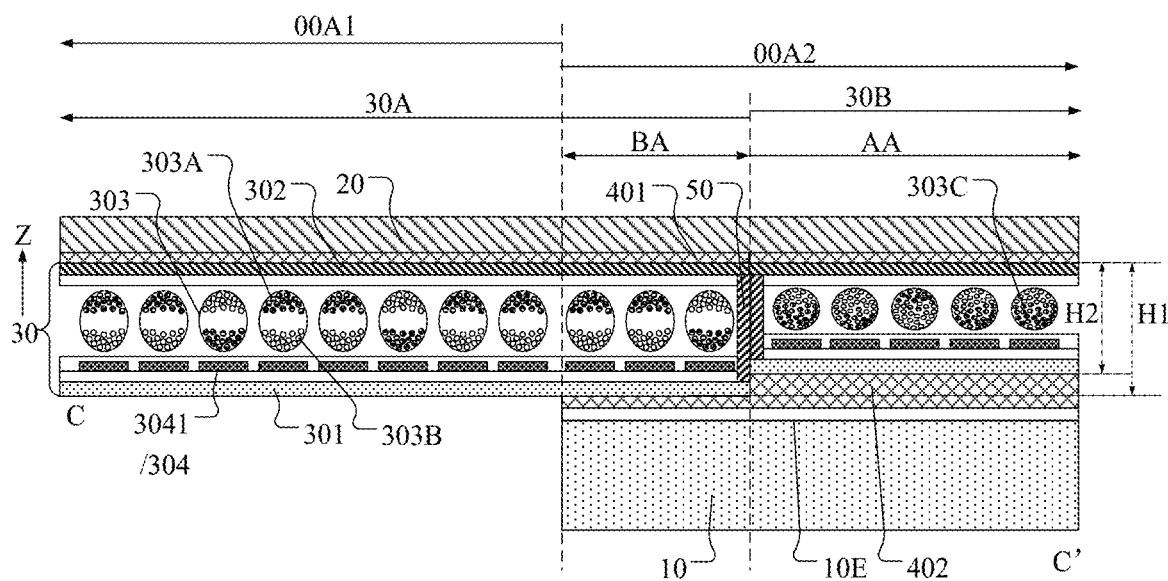
FIG. 25 illustrates another cross-sectional view along a C-C' direction in FIG. 18.

In some optional embodiments, referring to FIGS. 18 and 25, FIG. 25 illustrates another cross-sectional view along the C-C' direction in FIG. 18. In one embodiment, along the direction Z perpendicular to the plane of the display panel 10, the thickness H1 of the first color-changing assembly 30A may be greater than the thickness H2 of the second color-changing assembly 30B.

In one embodiment, it describes that the thickness of the first color-changing assembly 30A in the non-display region (the first region 00A1 and the frame region BA) may be configured to be different from the thickness of the second color-changing assembly 30B in the display region AA. The first color-changing assembly 30A and the second color-changing assembly 30B included in the color-changing assembly 30 may be two independent structures. Along the direction Z perpendicular to the plane of the display panel 10, the thickness H1 of the first color-changing assembly 30A may be greater than the thickness H2 of the second color-changing assembly 30B. Therefore, the thickness H2 of the second color-changing assembly 30B in the display region AA may be thinner to avoid interference on the transmission brightness of the display region AA, which may improve the display quality of the display module 000 when the display panel 10 is turned on for normal image display. In addition, the thickness H1 of the first color-changing assembly 30A in the non-display region (the first region 00A1 and the frame region BA) may be thicker, and the integrated black effect may be implemented by controlling the voltage value on the first electrode 3041 in the first color-changing assembly 30A.

Figure 26:
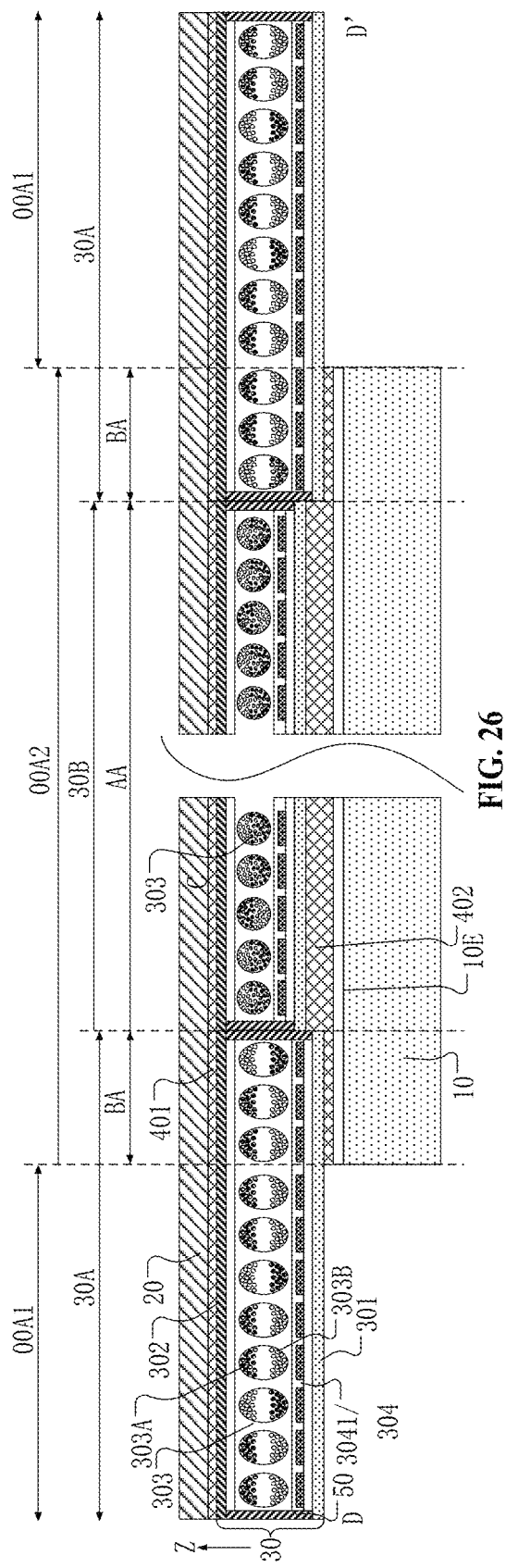
FIG. 26 illustrates another cross-sectional view along a D-D' direction in FIG. 18.

It may be understood that in above-mentioned embodiments corresponding to FIG. 25, the thickness of the first color-changing assembly 30A and the thickness of the second color-changing assembly 30B may be designed to be different. At this point, the first color-changing assembly 30A and the second color-changing assembly 30B may be two independent structures; that is, the first color-changing assembly 30A and the second color-changing assembly 30B may be formed separately. Referring to FIGS. 18 and 26, FIG. 26 illustrates another cross-sectional view along the D-D' direction in FIG. 18. That is, for the first color-changing assembly 30A and the second color-changing assembly 30B with differentially designed thicknesses, the microcapsule structure 303 in the first color-changing assembly 30A may be sealed in the space formed between the first substrate 301 and the second substrate 302; and the microcapsule structure 303 in the second color-changing assembly 30B may be sealed in the space formed between another first substrate 301 and another second substrate 302 through the encapsulation structure 50 respectively. Subsequently, the first color-changing assembly 30A and the second color-changing assembly 30B after encapsulation may be respectively fixed on the side of the cover 20 facing the display panel 10. The thicker first color-changing assembly 30A may be in the first region 00A1 and the frame region BA, and the thinner second color-changing assembly 30B may be in the display region AA, thereby achieving differentiated thickness design of two color-changing assemblies.

It may be understood that, the region where the display panel 10 is located is an entire-surface structure; therefore, when the thickness of the first color-changing assembly 30A of the frame region BA and the thickness of the second color-changing assembly 30B of the display region AA of the display panel 10 are different (as shown in FIGS. 25 and 26), the light-emitting surface 10E of the display panel 10 may be attached and fixed to the flat surface of the second optical adhesive layer 402 through the filling of the second optical adhesive layer 402.

Figure 27:
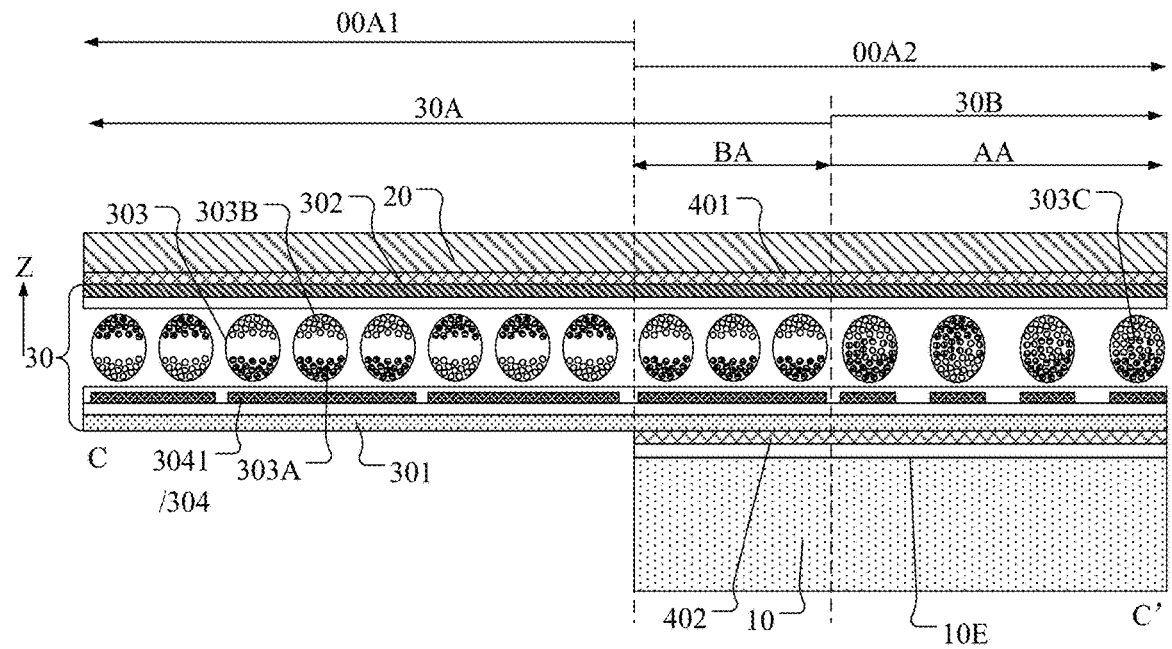
FIG. 27 illustrates another cross-sectional view along a C-C' direction in FIG. 18.

In some optional embodiments, referring to FIGS. 18 and 27, FIG. 27 illustrates another cross-sectional view along the C-C' direction in FIG. 18. In the first color-changing assembly 30A of one embodiment, the orthographic projection of one first electrode 3041 on the first substrate 301 may be overlapped with the orthographic projection of a plurality of microcapsule structures 303 on the first substrate 301.

In one embodiment, it describes that for the first color-changing assembly 30A in the first region 00A1 of the cover 20 extended outside of the display panel 10 and the frame region BA of the display panel 10, one first electrode 3041 may correspondingly control the charged particles in the plurality of microcapsule structures 303. That is, the orthographic projection of one first electrode 3041 on the first substrate 301 in the first color-changing assembly 30A may be overlapped with the orthographic projection of the plurality of microcapsule structures 303 on the first substrate 301. In FIG. 27, the orthographic projection of one first electrode 3041 on the first substrate 301 may be overlapped with the orthographic projection of 2-3 microcapsule structures 303 on the first substrate 301, which is taken as an example for illustration. Therefore, the quantity of first electrodes 3041 in the first color-changing assembly 30A may be reduced. In addition, the first color-changing assembly 30A disposed in the first region 00A1 and the frame region BA may only be configured to adjust the visible grayscale to ensure the integrated black effect and may not be configured to display visible colors in the screen-off state (have different function from the second color-changing assembly 30B in the display region AA). Therefore, even if one first electrode 3041 in the first color-changing assembly 30A correspondingly controls the charged particles in the plurality of microcapsule structures 303, it ensures that the integrated black effect of the display module 000 may not be affected.

Figure 28:
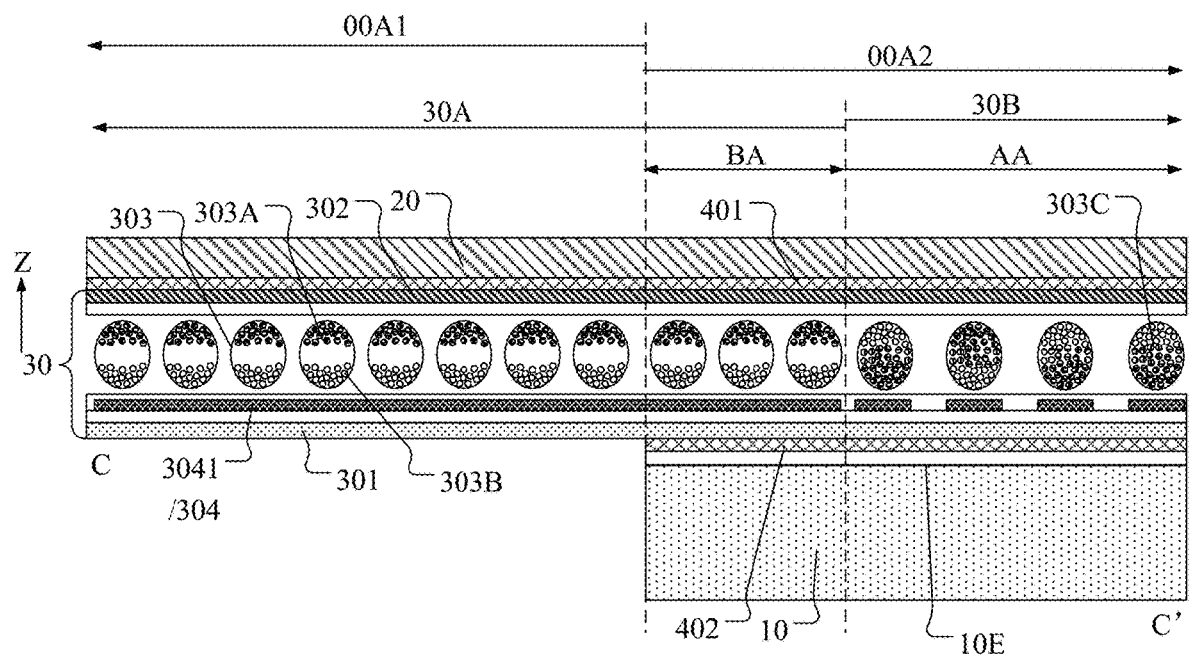
FIG. 28 illustrates another cross-sectional view along a C-C' direction in FIG. 18.

Optionally, referring to FIGS. 18 and 28, FIG. 28 illustrates another cross-sectional view along the C-C' direction in FIG. 18. In one embodiment, in the first color-changing assembly 30A, the first electrode 3041 of the first electrode layer 304 may be an entire-surface structure.

In one embodiment, it describes that the first color-changing assembly 30A disposed in the first region 00A1 and the frame region BA may be only configured to adjust the visible grayscale to ensure the integrated black effect and may not be configured to display visible colors in the screen-off state (have different function from the second color-changing assembly 30B in the display region AA). Therefore, the first electrode 3041 of the first electrode layer 304 in the first color-changing assembly 30A may be configured as an entire-surface structure. That is, the first electrode layer 304 in the first color-changing assembly 30A may not need to be patterned, which may be beneficial for simplifying the formation process and improving process efficiency.

It may be understood that for the first color-changing assembly 30A disposed in the first region 00A1 and the frame region BA, when the first electrode 3041 of the first electrode layer 304 is the entire-surface structure to control all microcapsule structures of the first color-changing assembly 30A, by controlling the voltage value on the first electrode 3041 to be different, the movement and mixing states of the black charged particles and the white charged particles in the microcapsule structure 303 may be different, which may implement different visual grayscales and ensure the integrated black effect of the module.

Figure 29:
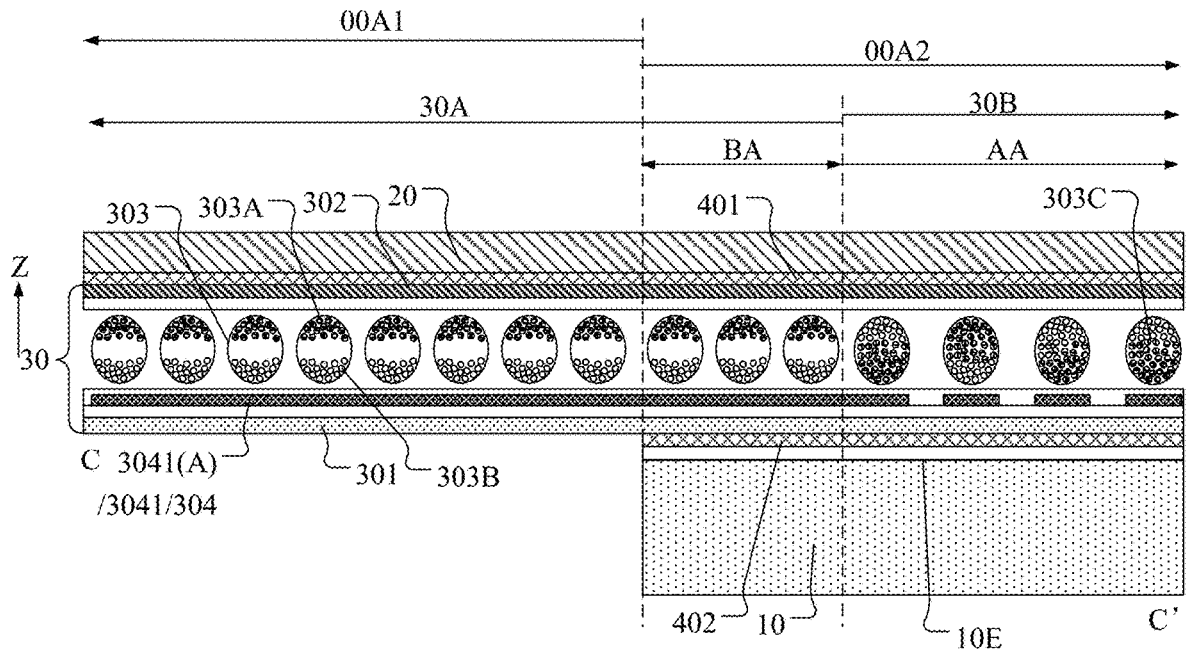
FIG. 29 illustrates another cross-sectional view along a C-C' direction in FIG. 18.

It should be noted that, as shown in FIG. 28, the first electrodes 3041 in the frame region BA and the display region AA of the display panel 10 in the color changing assembly 30 may be independent. Therefore, even if the first electrode 3041 of the first color-changing assembly 30A is the entire-surface structure, the first electrodes 3041 in the display region AA may be independent. However, in some special scenarios, as shown in FIG. 29, FIG. 29 illustrates another cross-sectional view along the C-C' direction in FIG. 18, for example, the first electrode 3041(A) with the entire-surface structure in the first color-changing assembly 30A may cross the frame region BA and the display region AA of the display panel 10. Even such crossing first electrode 3041(A) is regarded as the first electrode 3041 of entire surface structure of the first color-changing assembly 30A, there are still other first electrodes 3041 independent of the first electrode 3041 of such entire surface structure in the display region AA, which may ensure that for entire color-changing assembly 30, the first electrode layer 304 may include the plurality of first electrodes 3041.

Optionally, referring to FIGS. 18 and 27-29, in the second color-changing assembly 30B, the orthographic projection of one first electrode 3041 on the first substrate 301 may be overlapped with the orthographic projection of one microcapsule structure 303 on the first substrate 301. Since the second color-changing assembly 30B of the display region AA needs to achieve the integrated display effect, which is consistent with the color of surrounding environment, pixel-level control may be needed. One first electrode 3041 may correspondingly control charged particles in one microcapsule structure 303. Therefore, when the display panel 10 is in the screen-off state, the second color-changing assembly 30B may adjust the display to achieve the integrated display effect which is consistent with the color of surrounding environment, thereby improving user experience satisfaction.

Figure 30:
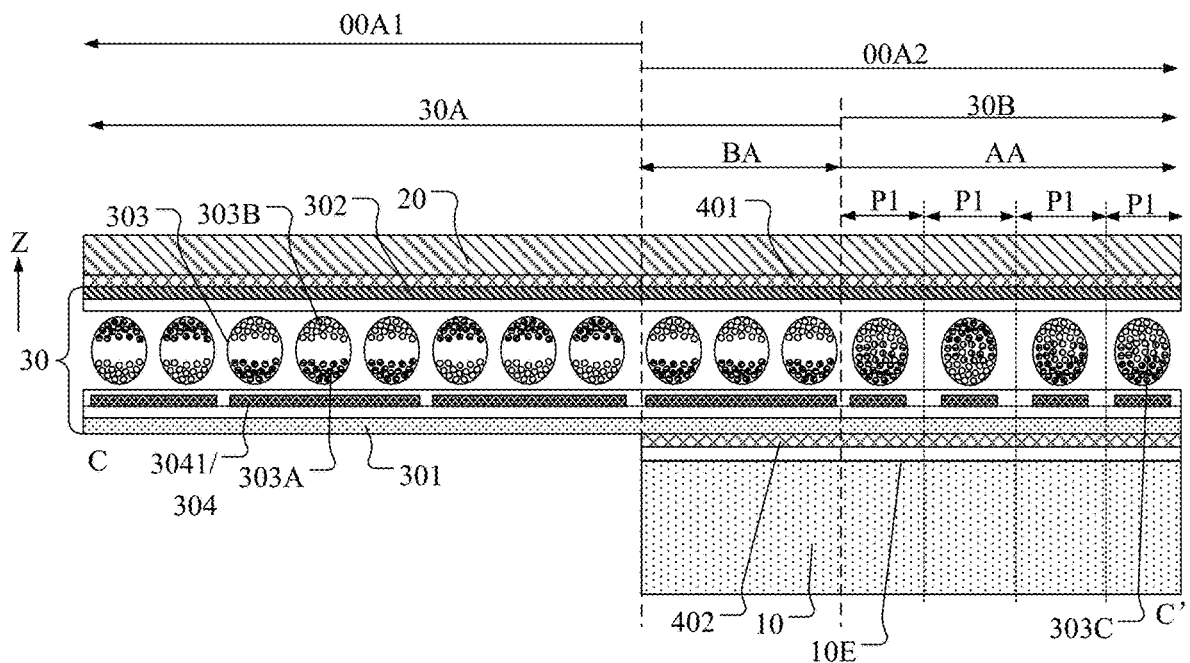
FIG. 30 illustrates another cross-sectional view along a C-C' direction in FIG. 18.

Furthermore, optionally, referring to FIGS. 18 and 30, FIG. 30 illustrates another cross-sectional view along the C-C' direction in FIG. 18. When the display region AA of the display panel 10 includes a plurality of sub-pixels P1, in the second color-changing assembly 30B, the orthographic projection of one first electrode 3041 on the first substrate 301 may be overlapped with the orthographic projection of at least one sub-pixel P1 on the first substrate 301.

In one embodiment, it describes that in order to implement the integrated display effect of the second color-changing assembly 30B in the display region AA, which is consistent with the color of surrounding environment, the second color-changing assembly 30B may need to be controlled at the pixel level. Therefore, in the second color-changing assembly 30B, when the orthographic projection of one first electrode 3041 on the first substrate 301 is configured to be overlapped with the orthographic projection of one microcapsule structure 303 on the first substrate 301 which implements that one first electrode 304 controls the movement of charged particles in one microcapsule structure 303, the orthographic projection of one first electrode 3041 on the first substrate 301 may correspond the orthographic projection of at least one sub-pixel P1 on the first substrate 301 in a one-to-one correspondence. For example, the orthographic projection of the first electrode 3041 of the second color-changing assembly 30B on the first substrate 301 may correspond to the orthographic projection of one sub-pixel P1 on the first substrate 301, or correspond to the orthographic projection of two sub-pixels P1 on the first substrate 301, which may implement that the second color-changing assembly 30B may change the visible colors of the display region AA (not as image display) when the display panel 10 is in the screen-off state, which may be beneficial for improving the precision of the integrated display effect that is not obtrusive with surrounding environment.

It may be understood that when the display region AA of the display panel 10 of one embodiment includes the plurality of sub-pixels P1, the sub-pixels P1 may be liquid crystal display pixels including pixel electrodes and liquid crystal molecules or may be display pixels including pixel circuits and organic light-emitting elements. Specific structure of the sub-pixels P1 may not be limited in various embodiments of the present disclosure. During implementation, the sub-pixels P1 may be configured according to the type of the display panel 10. In FIG. 30, only the range enclosed by dotted lines may represent the region where one sub-pixel P1 is located.

Figure 31:
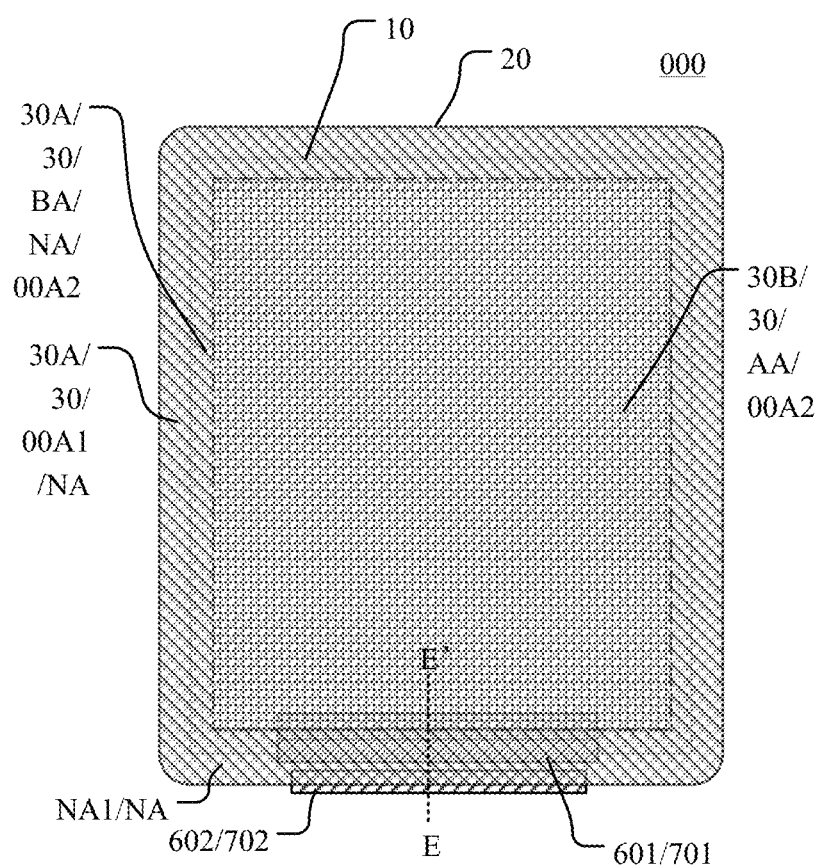
FIG. 31 illustrates another planar structural schematic of a display module according to various embodiments of the present disclosure.
Figure 32:
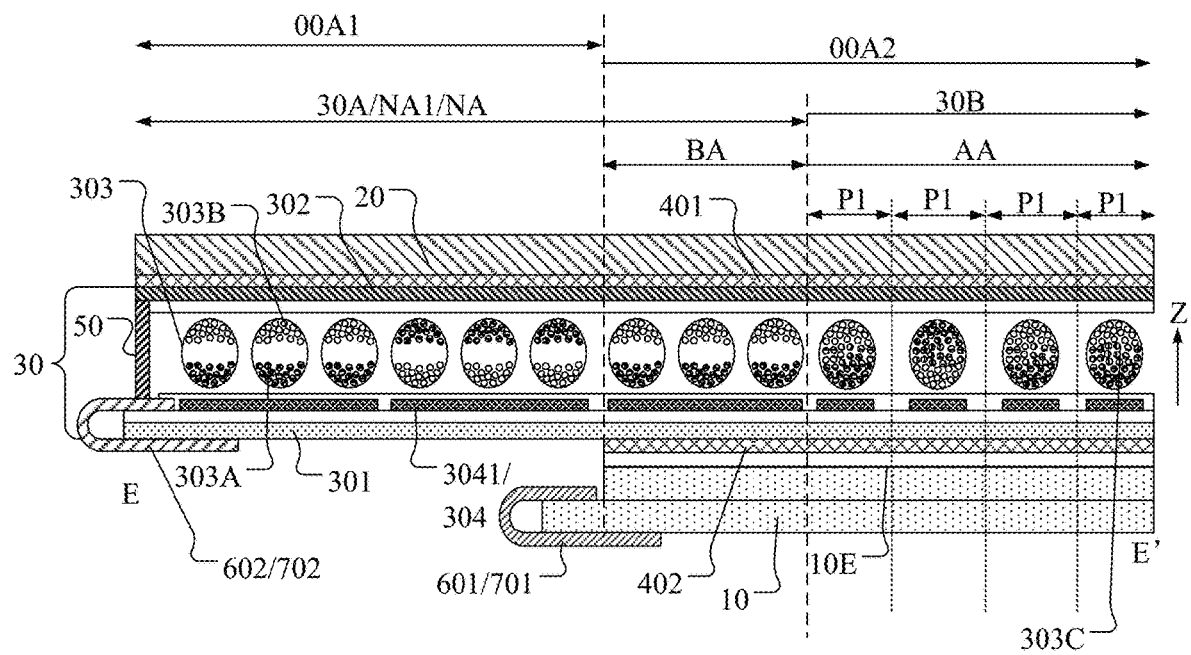
FIG. 32 illustrates a cross-sectional view along an E-E' direction in FIG. 31.

In some optional embodiments, referring to FIGS. 31 and 32, FIG. 31 illustrates another planar structural schematic of a display module according to various embodiments of the present disclosure; and FIG. 32 illustrates a cross-sectional view along an E-E' direction in FIG. 31. It may be understood that, in order to clearly illustrate the structure of one embodiment, transparency filling is performed in FIG. 31. In one embodiment, the display module 000 may include the first driving circuit 601 and the second driving circuit 602. The first driving circuit 601 may be electrically connected to the display panel 10, and the second driving circuit 602 may be electrically connected to the color-changing assembly 30.

In one embodiment, it describes that since the color-changing assembly 30 only needs to meet the integrated black effect of changing the visible grayscale when the screen is in the screen-off state, fine pixel-level control may be not needed. Therefore, the display panel 10 and the color-changing assembly 30 included in the display module 000 may be driven and controlled by different driving modules. The display module 000 may include the first driving circuit 601 and the second driving circuit 602. Optionally, the first driving circuit 601 may be integrated on the first flexible circuit board 701, and the second driving circuit 602 may be integrated on the second flexible circuit board 702. The first flexible circuit board 701 may be bound to be electrically connected to the display panel 10. For example, if the display panel 10 includes an array substrate, the first flexible circuit board may be bound to the binding region of the array substrate; and the structure of the display panel 10 may not be described in detail in various embodiments of the present disclosure. Furthermore, the first driving circuit 601 may be electrically connected to the display panel 10; and the first driving circuit 601 may drive and control the display panel 10 when displaying images. The second flexible circuit board 702 may be bound to be electrically connected to the color-changing assembly 30. For example, the second flexible circuit board may be bound to the first substrate 301 where the first electrode layer 304 is located, and specific binding structure of the second driving circuit 602 and the color-changing assembly 30 may not be described in detail in various embodiments of the present disclosure. Furthermore, the second driving circuit 602 may be electrically connected to the color-changing assembly 30. The second driving circuit 601 may adjust the control voltage on the first electrode 3041 to achieve the integrated black effect when the display panel 10 is in the screen-off state.

Optionally, referring to FIG. 32, the first flexible circuit board 701 integrated with the first driving circuit 601 may be bent to the backlight side of the display panel 10, and the second flexible circuit board 702 integrated with the second driving circuit 602 may be bent to the side of the first substrate 301 away from the second substrate 302, which may be beneficial for reducing the frame width of entire display module.

In some optional embodiments, referring to FIGS. 31 and 32, the display module 000 may include a non-display region NA; and the first region 00A1 and the frame region BA may be both at the non-display region NA.

The non-display region NA may include the first non-display region NA1; the first driving circuit 601 may be bound to the first non-display region NA1; and the second driving circuit 602 may be bound to the first non-display region NA1.

In one embodiment, it describes that the display module 000 may include the non-display region NA in addition to the display region AA; the non-display region NA may be configured to at least partially surround the display region AA; and the first region 00A1 of the cover 20 extended outside of the display panel 10 and the frame region BA of the display panel 10 may be in the non-display region NA. The non-display region NA configured to at least partially surround the display region AA may include the first non-display region NA1, which may be understood as the lower frame region of FIG. 31. In one embodiment, the first driving circuit 601 for driving and controlling the display panel 10 may be configured to be bound to the first non-display region NA1; and the second driving circuit 602 for driving the color-changing assembly 30 to change the visible grayscale may be also configured to be bound to the first non-display region NA1. Therefore, the arrangement of the second driving circuit 602 may be avoided from occupying space in the frame region at other positions, which may be beneficial for reducing the frame size of the display module 000 other than the first non-display region NA1.

Figure 33:
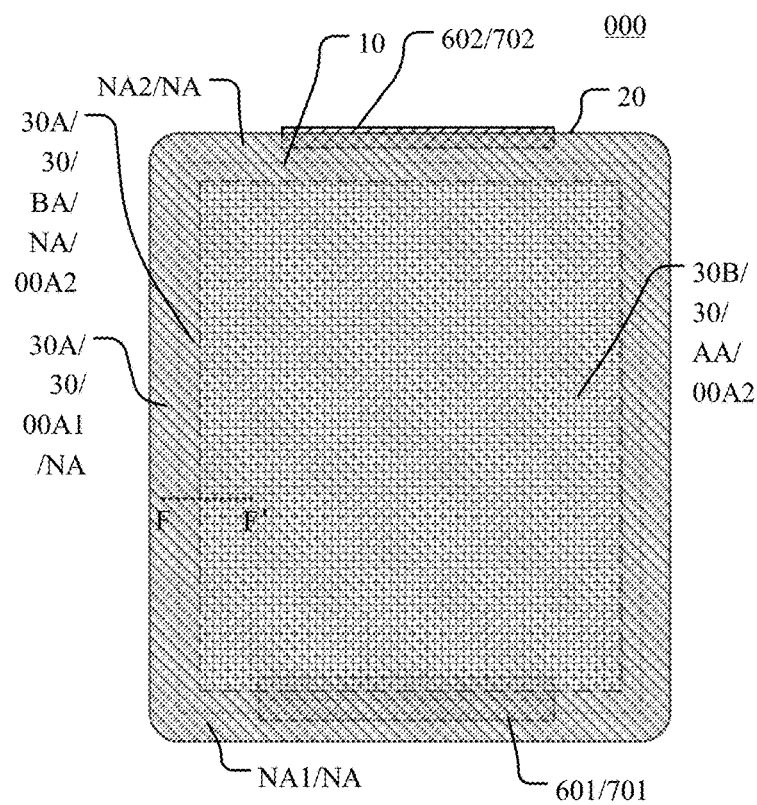
FIG. 33 illustrates another planar structural schematic of a display module according to various embodiments of the present disclosure.

In some optional embodiments, referring to FIG. 33, FIG. 33 illustrates another planar structural schematic of a display module according to various embodiments of the present disclosure. It may be understood that, in order to clearly illustrate the structure of one embodiment, transparency filling is performed in FIG. 33. In one embodiment, the display module 000 may include the non-display region NA; and the first region 00A1 and the frame region BA may be both at the non-display region NA.

The non-display region NA may include the first non-display region NA1 and the second non-display region NA2. The first driving circuit 601 may be bound to the first non-display region NA1, and the second driving circuit 602 may be bound to the second non-display region NA2.

In one embodiment, it describes that the display module 000 may include the non-display region NA in addition to the display region AA; the non-display region NA may be configured to at least partially surround the display region AA; and the first region 00A1 of the cover 20 extended outside of the display panel 10 and the frame region BA of the display panel 10 may be both at the non-display region NA. The non-display region NA at least partially surrounding the display region AA may include the first non-display region NA1, which may be understood as the lower frame region of FIG. 33. The non-display region NA may further include the second non-display region NA2. The second non-display region NA2 may be understood as the upper frame region or the left frame region or the right frame region in FIG. 33. In FIG. 33, the second non-display region NA2 may be the upper frame region as an example for illustration. In one embodiment, the first driving circuit 601 for driving and controlling the display panel 10 may be configured to be bound to the first non-display region NA1, and the second driving circuit 602 for driving the color-changing assembly 30 to change the visible grayscale may be configured to be bound to the second non-display region NA2, which may reduce the heat aggregation on the lower frame and be beneficial for extending the service life of the module.

It may be understood that, in one embodiment, the second driving circuit 602 for driving the color-changing assembly 30 to change the visible grayscale may be bound to the second non-display region NA2 of the upper frame region, which may provide sufficient space for the left and right frame regions of the display module 000 to install structures including gate drive circuits and light-emitting drive circuits for driving the display panel 10, thereby ensuring scanning driving effect of the display panel 10.

Figure 34:
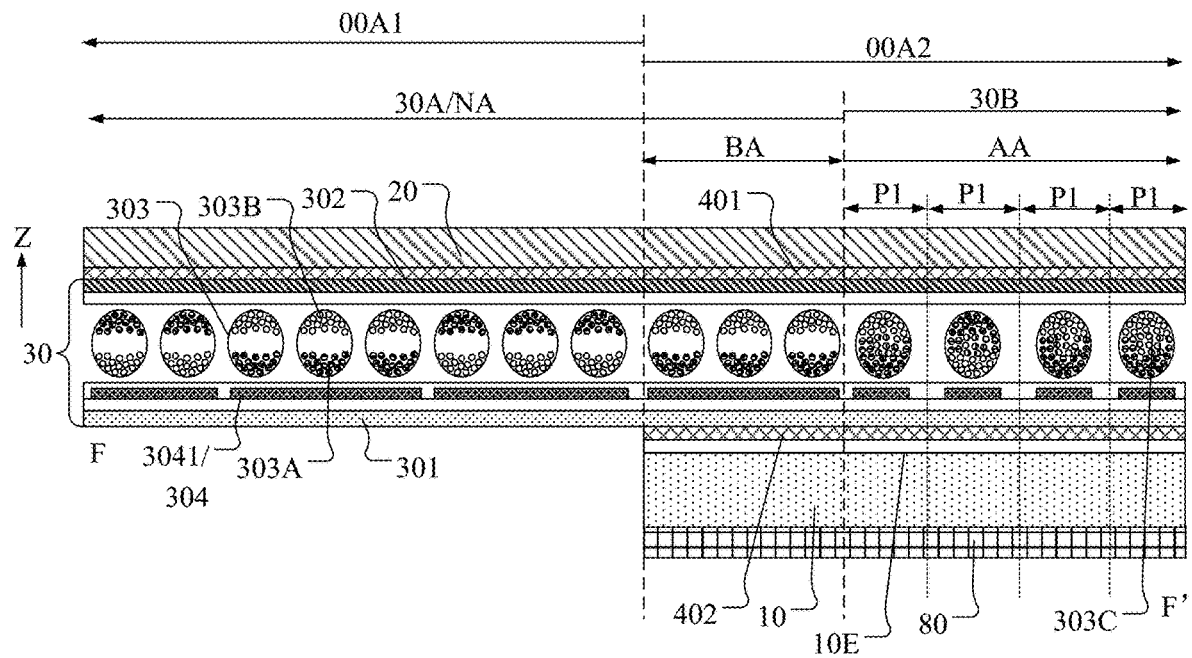
FIG. 34 illustrates a cross-sectional view along an F-F' direction in FIG. 33.

In some optional embodiments, referring to FIGS. 33 and 34, FIG. 34 illustrates a cross-sectional view along an F-F' direction in FIG. 33. In one embodiment, the display module 000 may further include a light-adjusting panel 80 which may be on the side of the display panel 10 away from the second color-changing assembly 30B.

In one embodiment, it describes that the structure of the display module 000 may further include the light-adjusting panel 80. The light-adjusting panel 80 may form an overlapped screen structure with the display panel 10. The light-adjusting panel 80 may be configured to adjust final light-emitting brightness or light-emitting angle of the display module 000. When the display module 000 includes the display panel 10, the second color-changing assembly 30B and the light-adjusting panel 80, in one embodiment, the light-adjusting panel 80 may be configured to be on the side of the display panel 10 away from the second color-changing assembly 30B. That is, the arrangement order of the display panel 10, the second color-changing assembly 30B and the light-adjusting panel 80 under the cover 20 may be the second color-changing assembly 30B, the display panel 10, and the light-adjusting panel 80. If a backlight module is further included, the backlight module may be on the side of the light-adjusting panel 80 away from the display panel 10. In such way, it may prevent disposed second color-changing assembly 30B from affecting the light-adjusting light path and light-adjusting effect of the light-adjusting panel 80, which may be beneficial for ensuring the display effect of the display module 000 of the overlapped screen.

It may be understood that the type and specific structure of the light-adjusting panel 80 may not be described in detail in one embodiment, which may refer to the structure of the overlapped screen in the existing technology for understanding during implementation.

Figure 35:
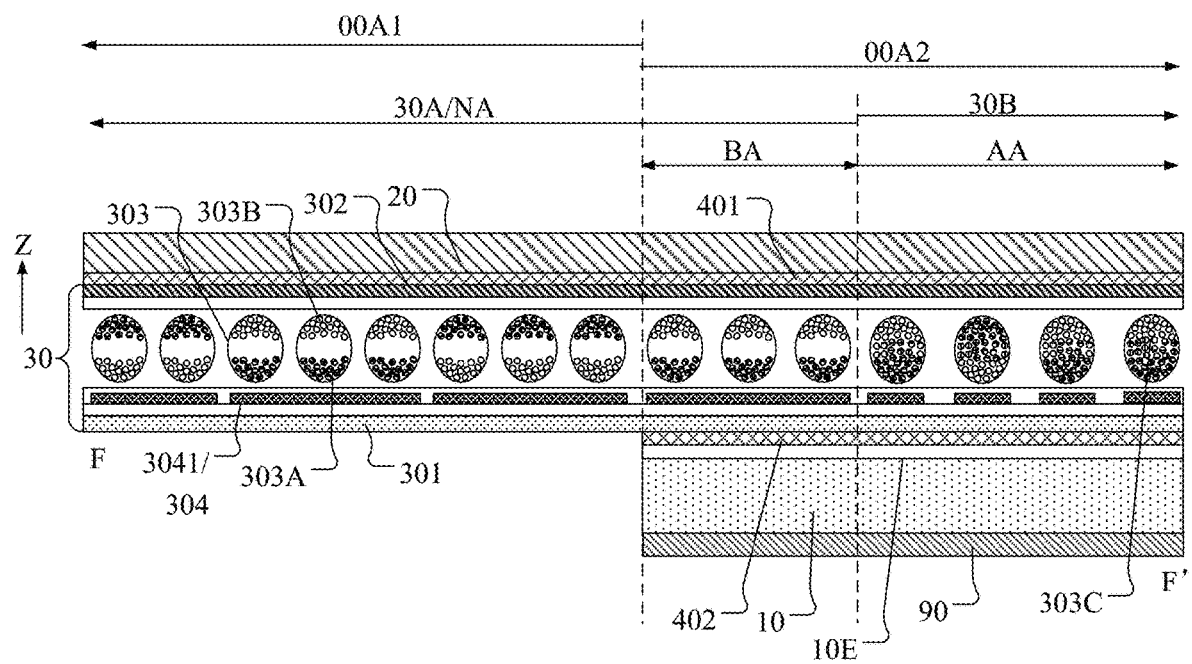
FIG. 35 illustrates another cross-sectional view along an F-F' direction in FIG. 33.
Figure 36:
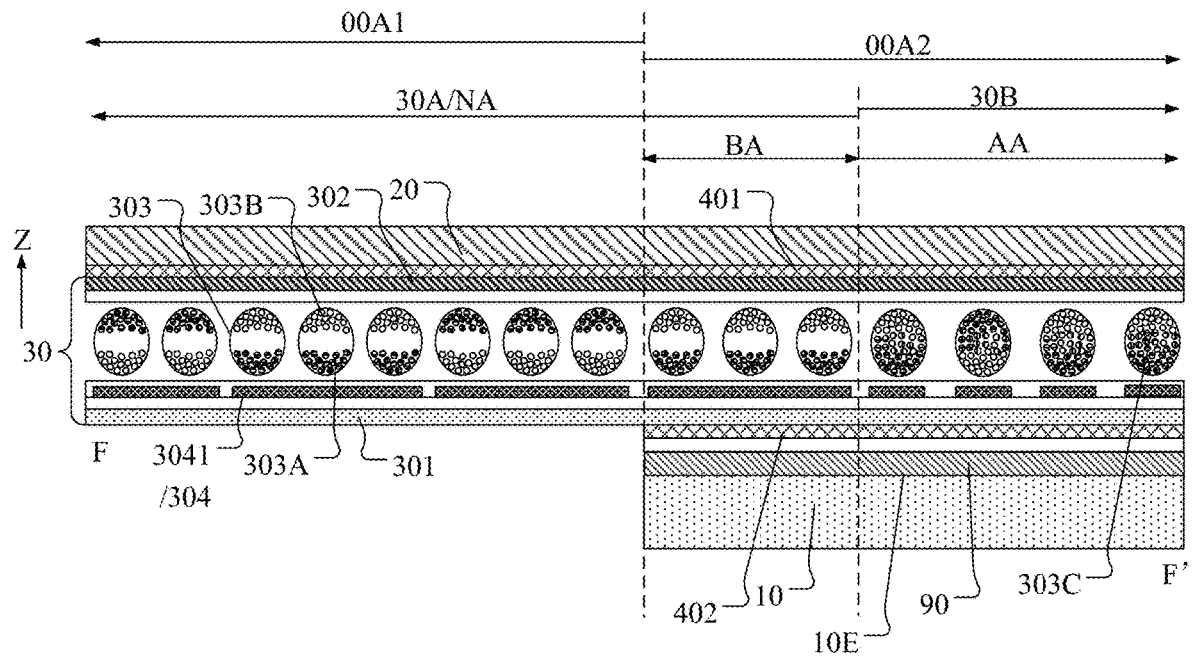
FIG. 36 illustrates another cross-sectional view along an F-F' direction in FIG. 33.

In some optional embodiments, referring to FIGS. 33 and 35-36, FIG. 35 illustrates another cross-sectional view along the F-F' direction in FIG. 33; and FIG. 36 illustrates another cross-sectional view along the F-F' direction in FIG. 33. In one embodiment, the display module 000 may further include a viewing-angle control panel 90. The viewing-angle control panel 90 may be on the side of the display panel 10 away from the second color-changing assembly 30B (as shown in FIG. 35); or the viewing-angle control panel 90 may be on the side of the display panel 10 facing the second color-changing assembly 30B (as shown in FIG. 36).

The distribution density of the microcapsule structures 303 in the second color-changing assembly 30B may be less than the distribution density of the microcapsule structures 303 in the first color-changing assembly 30A.

In one embodiment, it describes that the structure of the display module 000 may further include the viewing-angle control panel 90; the viewing-angle control panel 90 may form the overlapped screen structure with the display panel 10; and the viewing-angle control panel 90 may be configured to adjust the final light-emitting viewing-angle of the display module 000. For example, by disposing the viewing-angle control panel 90, the anti-peep function of the display module 000 may be implemented. When the display module 000 includes the display panel 10, the second color-changing assembly 30B and the viewing-angle control panel 90, the viewing-angle control panel 90 in one embodiment may be disposed on the side of the display panel 10 away from the second color-changing assembly 30B (As shown in FIG. 35, if a backlight module is further included, the backlight module may be on the side of the viewing-angle control panel 90 away from the display panel 10 to adjust the light-emitting angle range of the backlight); or the viewing-angle control panel 90 may also be disposed on the side of the display panel 10 facing the second color-changing assembly 30B (as shown in FIG. 36). The viewing-angle control panel 90 may change the viewing-angle of the light-emitting surface 10E of the display panel 10, thereby realizing the anti-peep display function of the display module 000. In one embodiment, the viewing-angle control panel 90 of one embodiment may be on the side of the second color-changing assembly 30B facing the display panel 10, which may prevent disposed second color-changing assembly 30B from affecting the viewing-angle control effect of the viewing-angle control panel 90. Moreover, the viewing-angle control panel 90 may use whether the scattering function is turned on or off to achieve anti-peep effect. Therefore, in one embodiment, in order to prevent the second color-changing assembly 30B stacked with the viewing-angle control panel 90 from affecting the anti-peep protection effect of the viewing-angle control panel 90, it also configures that the distribution density of the microcapsule structures 303 in the second color-changing assembly 30B stacked with the viewing-angle control panel 90 may be less than the distribution density of the microcapsule structures 303 in the first color-changing assembly 30A. Furthermore, within the scope of the viewing-angle control panel 90, by reducing the distribution density of the microcapsule structures 303 in the second color-changing assembly 30B, the interference of the microcapsule structure 303 on the scattering function of the viewing-angle control panel 90 may be avoided, thereby being further beneficial for ensuring the anti-peep effect of the viewing-angle control panel 90 in the display module 000.

It may be understood that the type and specific structure of the viewing-angle control panel 90 may not be described in detail in one embodiment and may refer to the structure of the anti-peep screen in the overlapped screen in the existing technology for understanding during implementation.

Figure 37:
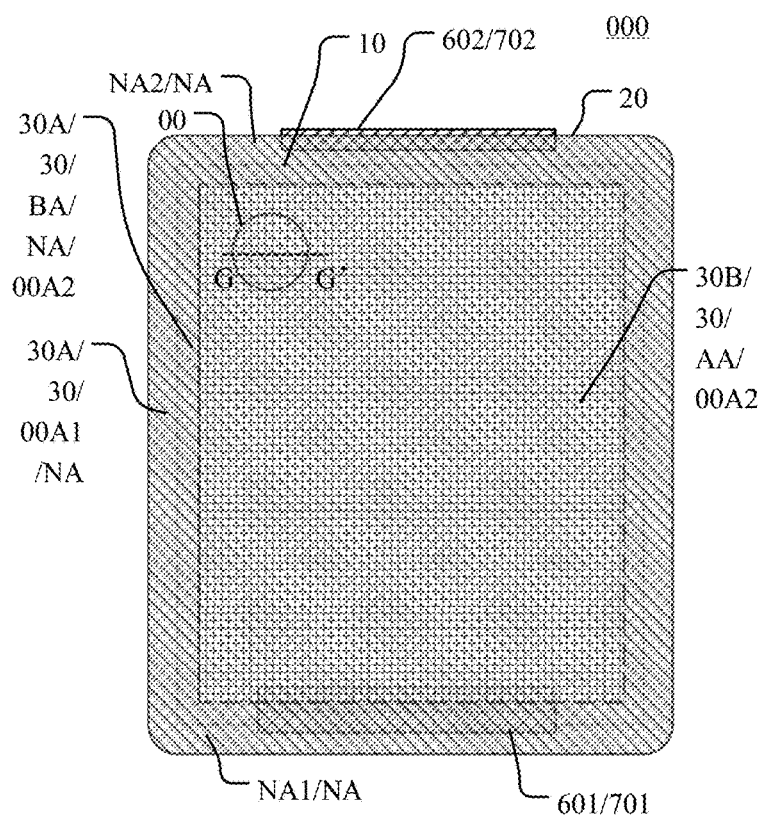
FIG. 37 illustrates another planar structural schematic of a display module according to various embodiments of the present disclosure.
Figure 38:
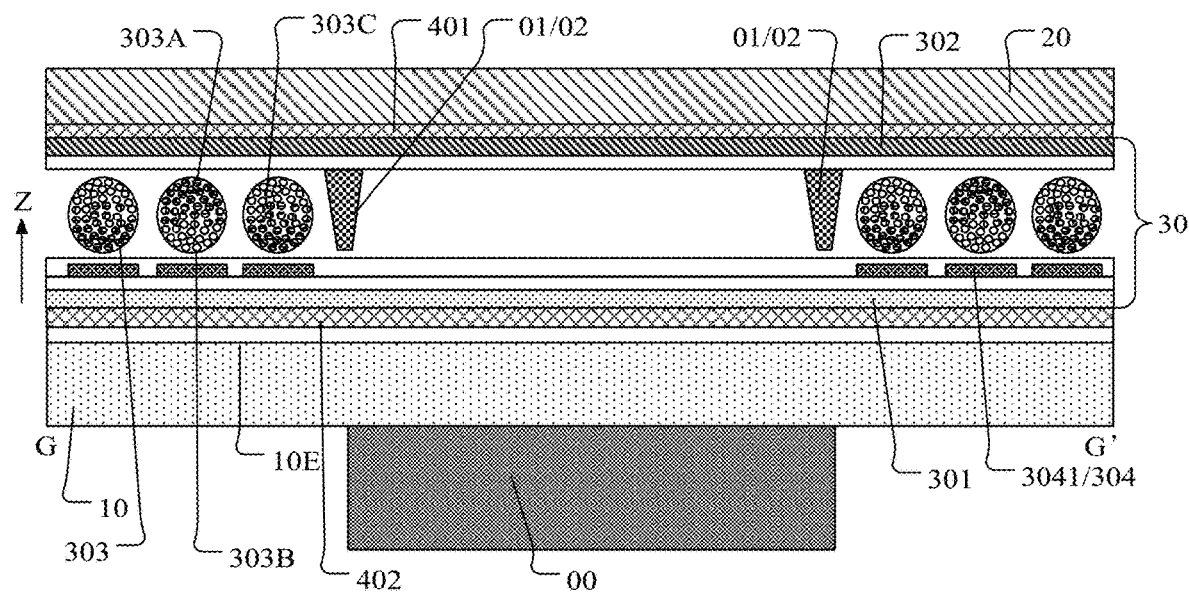
FIG. 38 illustrates a cross-sectional view along a G-G' direction in FIG. 37.

In some optional embodiments, referring to FIGS. 37 and 38, FIG. 37 illustrates another planar structural schematic of a display module according to various embodiments of the present disclosure; and FIG. 38 illustrates a cross-sectional view along a G-G' direction in FIG. 37. It may be understood that, in order to clearly illustrate the structure of one embodiment, transparency filling is performed in FIG. 37. In one embodiment, the display module 000 may further include a photosensitive element 00; and the photosensitive element 00 may be in the display region AA.

In the region where the photosensitive element 00 is located, the second color-changing assembly 30B may not include the microcapsule structure 303.

In one embodiment, it describes that the display module 000 may further include the photosensitive element 00. The photosensitive element 00 may be a photosensitive structure such as a camera or a fingerprint recognition component. In order to further reduce the frame of the module, a structure that the photosensitive element 00 is disposed in the display region AA may be used. If under-screen camera technology is used, the photosensitive element 00 may be disposed in a part of the display region AA of the display panel 10. When the photosensitive element 00 is operating, the display region AA of such part of the region may not need to be used for display. When the photosensitive element 00 is not operating, the display region AA in such part of the region and the display region AA in other positions may be used for normal display, thereby achieving full-screen display effect. It may be understood that the arrangement of the photosensitive elements may not be limited in various embodiments of the present disclosure. When the display module 000 includes the backlight module, a hole may be formed in a part of the backlight module for placing the photosensitive element 00. When the display module 000 does not include the backlight module, the photosensitive element 00 may be placed in the display region AA on the backlight side of the display panel 10, which may not be limited in various embodiments of the present disclosure. For example, the structure of the under-screen photosensitive element may be configured according to the model of the display panel 10. When the display region AA of the display module 000 includes the photosensitive element 00, in the second color-changing assembly 30B in the display region AA, the second color-changing assembly 30B disposed in the region where the photosensitive element 00 is located may not include the microcapsule structure 303, which may prevent the microcapsule structure 303 from affecting the photosensitive performance (such as the image-forming effect) of the photosensitive element 00, thereby being beneficial for improving the photosensitive recognition effect of the display module 000.

It should be noted that FIGS. 37-38 of one embodiment may only illustrate the position and shape of the photosensitive element 00 in the display region AA, which may include, but may not be limited to, such arrangement manner during implementation. Other arrangement positions and shapes may also be configured, which may not be described in detail in various embodiments of the present disclosure.

Optionally, as shown in FIG. 38, when the second color-changing assembly 30B does not have the microcapsule structure 303 in the region where the photosensitive element 00 is located, a support column 01 or a support column 02 with light-blocking function may be disposed to surround the periphery of such region. The support column 01 or the support column 02 with light-blocking function may be disposed on the side of the first substrate 301 or may be disposed on the side of the second substrate 302. The support column 01 or the support column 02 with light-blocking function may not only support the first substrate 301 and the second substrate 302 in the region where the microcapsule structure 303 is not disposed, but also play a light-blocking role as possible, which may avoid the influence of light leakage on the light recognition performance of the photosensitive element 00, thereby being beneficial for ensuring the light recognition effect of the photosensitive element 00.

It should be noted that, in one embodiment, the arrangement position of the photosensitive element 00 in the cross-sectional view of the display module 000 may be exemplarily illustrated in FIG. 38. During implementation, the arrangement position of the photosensitive element 00 may be configured according to the type of display panel 10. For example, when the display module 000 includes the backlight module on the backlight side of the display panel 10, a through hole may be opened in the backlight module, and the photosensitive element 00 may be fixedly installed in the through hole; and when the display panel 10 is another type, the arrangement position of the photosensitive element 00 may be configured according to another arrangement manner, which may not be described in detail in various embodiments of the present disclosure and may refer to the arrangement manner of the photosensitive element 00 under the screen in the existing technology.

Figure 39:
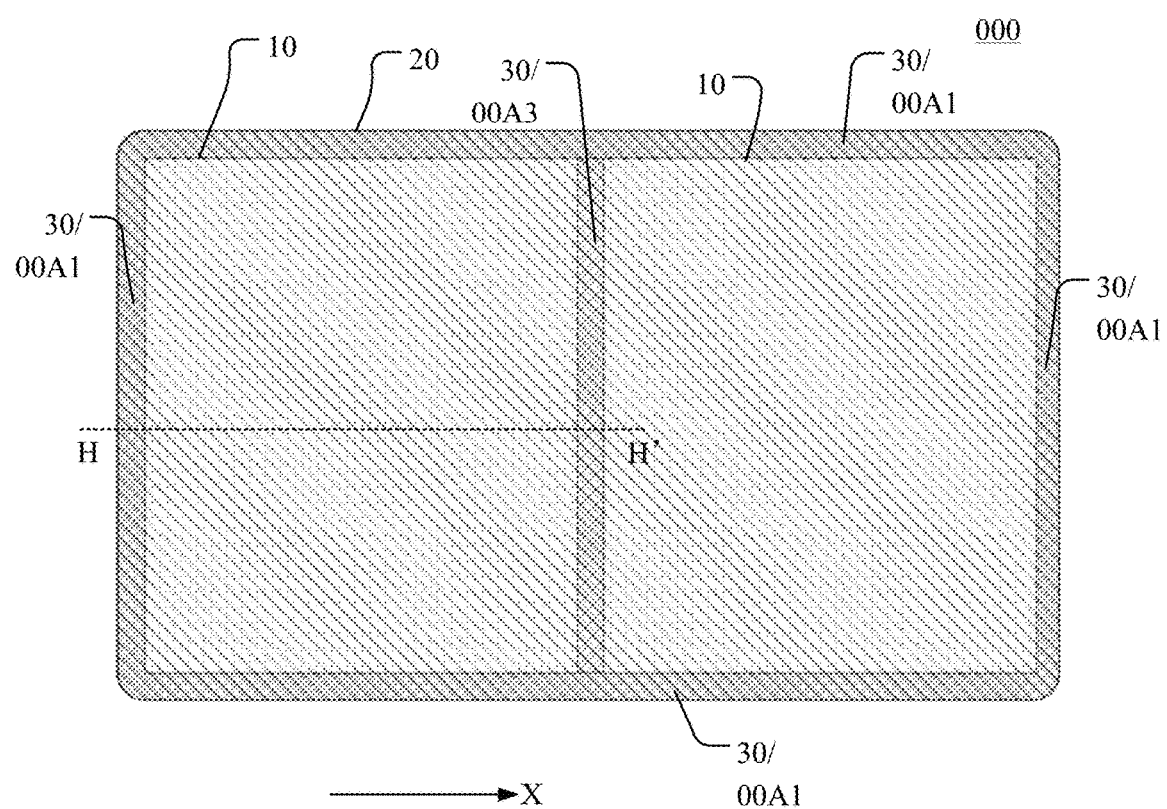
FIG. 39 illustrates another planar structural schematic of a display module according to various embodiments of the present disclosure.
Figure 40:
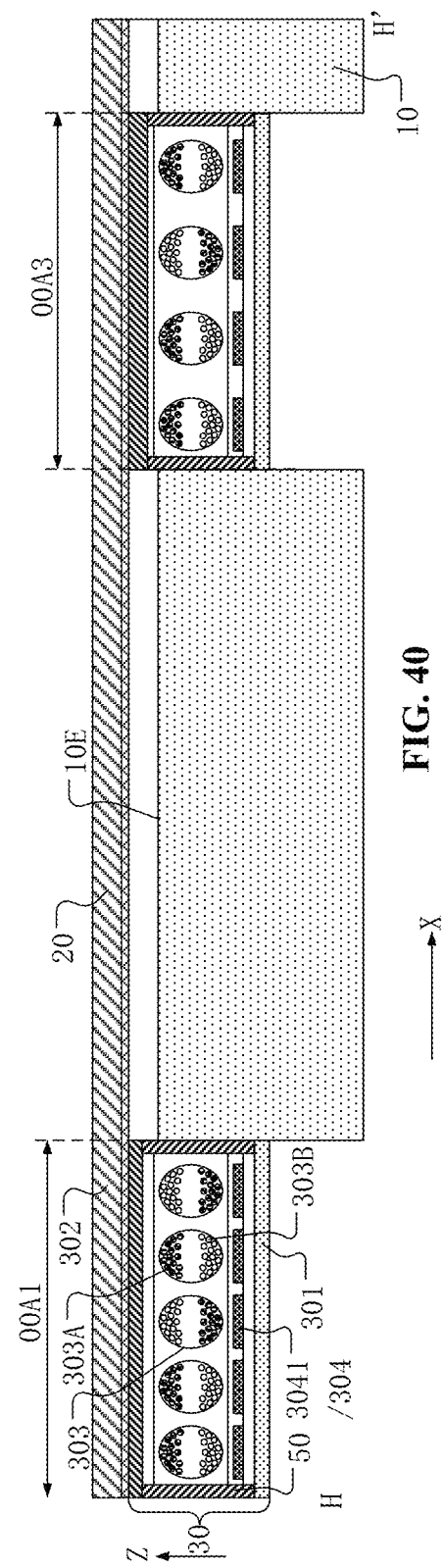
FIG. 40 illustrates a cross-sectional view along a H-H' direction in FIG. 39.

In some optional embodiments, referring to FIGS. 39-40, FIG. 39 illustrates another planar structural schematic of a display module according to various embodiments of the present disclosure; and FIG. 40 illustrates a cross-sectional view along a H-H' direction in FIG. 39. It may be understood that, in order to clearly illustrate the structure of one embodiment, transparency filling is performed in FIG. 39. In one embodiment, the display module 000 may include at least two display panels 10 which may be arranged along the direction X in parallel with the plane of the cover 20; and at least two display panels 10 may be within the range of same cover 20.

Along the direction X in parallel with the plane of the cover 20, the region between two adjacent display panels 10 may be the third region 00A3; and the color-changing assembly 30 may be also in the third region 00A3.

The distribution density of the microcapsule structures 303 in the third region 00A3 may be different from the distribution density of the microcapsule structures 303 in the first region 00A1.

In one embodiment, it describes that the display module 000 may be a display module structure with multiple joint screens. For example, current demand for the sizes of car screens or outdoor screens is increasing, such that joint screen design has become a popular design solution. The display module 000 of one embodiment may include at least two display panels 10. At least two display panels 10 may be arranged along the direction X in parallel with the plane of the cover 20. At least two display panels 10 may be located in the range of same cover 20. In FIG. 39, the display module 000 may include two display panels 10 as an example for illustration. During implementation, the quantity of display panels 10 arranged along the direction X in parallel with the plane of the cover 20 included in the display module 000 may be multiple, which may not be limited in various embodiments of the present disclosure. The plurality of display panels 10 arranged along the direction X in parallel with the plane of the cover 20 may be arranged in an array or in other arrangements, which may only need to satisfy that the display panels 10 included in same display module 000 may be covered and protected by same cover 20, that is, the plurality of display panels 10 may be attached to same cover 20. At this point, the display module 000 may include, in addition to the first region 00A1 at the outermost periphery of the cover 20 extended outside of the edge of the outer display panel 10, the third region 00A3 between two adjacent display panels 10 along the direction X in parallel with the plane of the cover 20. In one embodiment, the color-changing assembly 30 may be not only disposed in at least the first region 00A1, but also in the third region 00A3 (i.e., the region between two adjacent display panels 10). Therefore, by changing the voltage values on the first electrodes 3041 corresponding to different microcapsule structures 303 in the color-changing assembly 30 in the first region 00A1 and the third region 00A3, desirable integrated black effect may be achieved in the first region 00A1, the third region 00A3 and the region where the display panel 10 is located, which may be a simple, convenient and fast adjustment process.

Optional, the display module 000 may have an optical inspection step when being produced. During such detection step, the Lab values of different regions may be outputted, such that the voltage values on the first electrodes 3041 in the color-changing assemblies 30 disposed in different regions may be controlled and adjusted accordingly. Similar to the control manner of the liquid crystal display panel, different voltages may be provided to the pixel electrodes in the liquid crystal display panel, and the rotation angles of the liquid crystal molecules may be different, which may correspond to different transmittances and colors. During actual control execution, a table of voltages and light transmittances may be stored in a driving program (a driving program integrated on the first flexible circuit board bound to the display panel) and called to control the display of the liquid crystal display panel. Therefore, when the color-changing assembly 30 of one embodiment is actually executed, a table of corresponding voltage values and visible grayscale values on one first electrode 3041 may be stored in the driving program (integrated on the second flexible circuit board bound to the color-changing assembly 30) to be called. According to the Lab differences detected in different regions, the Lab value needed to be larger or smaller for the color-changing assembly 30 in the first region 00A1 or the color-changing assembly 30 in the third region 00A3 may be automatically calculated. Therefore, the value of ΔE in the integrated black calculation formula for different regions should be as small as possible to achieve desirable integrated black effect.

In one embodiment, it configures that when the third region 00A3 is also disposed with the color-changing assembly 30, the distribution density of the microcapsule structures 303 in the third region 00A3 may be different from the distribution density of the microcapsule structures 303 in the first region 00A1. For example, configuring the distribution density of the microcapsule structures 303 in two different regions to be different may be adjusted according to the optical Lab values detected in different regions. In one embodiment, for the display module 000 of the multi-screen design, when different display panels 10 are attached together using same cover 20, the distribution density of the microcapsule structures 303 in the first region 00A1 and the third region 00A3 may be differentially designed according to actual need, which may improve the integrated black effect of the joint screen region (the third region 00A3) in the multi-screen design and further be beneficial for improving the user experience.

It may be understood that the difference between the distribution density of the microcapsule structures 303 in the third region 00A3 and the distribution density of the microcapsule structures 303 in the first region 00A1 may not be specifically configured in various embodiments of the present disclosure, which may be adjusted according to actual detection results. In FIG. 40 of one embodiment, the distribution density of the microcapsule structures 303 in the third region 00A3 may be less than the distribution density of the microcapsule structures 303 in the first region 00A1, which may be taken as an example for illustration.

It should be noted that in order to reserve space to illustrate the structure of the color-changing assembly 30 in FIG. 40 of one embodiment, the lateral size ratio of the display panel 10, the first region 00A1 and the third region 00A3 may be only exemplary; and the quantity of microcapsule structures 303 in the first region 00A1 and the third region 00A3 may be only exemplary. During implementation, the widths of the first region 00A1 and the second region 00A3 may be relatively narrow, and the quantity of microcapsule structures 303 in the color-changing assembly 30 may be relatively large, which may not be limited to illustration in FIG. 40.

Optionally, as described in above-mentioned embodiments, when the display module 000 is the multi-screen design, the color-changing assembly 30 may also be disposed in the region where the display panel 10 is located. That is, the color-changing assembly with the microcapsule structure including color charged particles may be disposed between the light-emitting surface 10E of the display panel 10 and the cover 20. Furthermore, the integrated display effect of entire display module 000 may be implemented in the screen-off state, which may be integrated into the visual color of surrounding environment as possible. The integrated display effect may not be limited in various embodiments of the present disclosure and refer to the module structure of the non-joint-screen design in above-mentioned embodiments.

Figure 41:
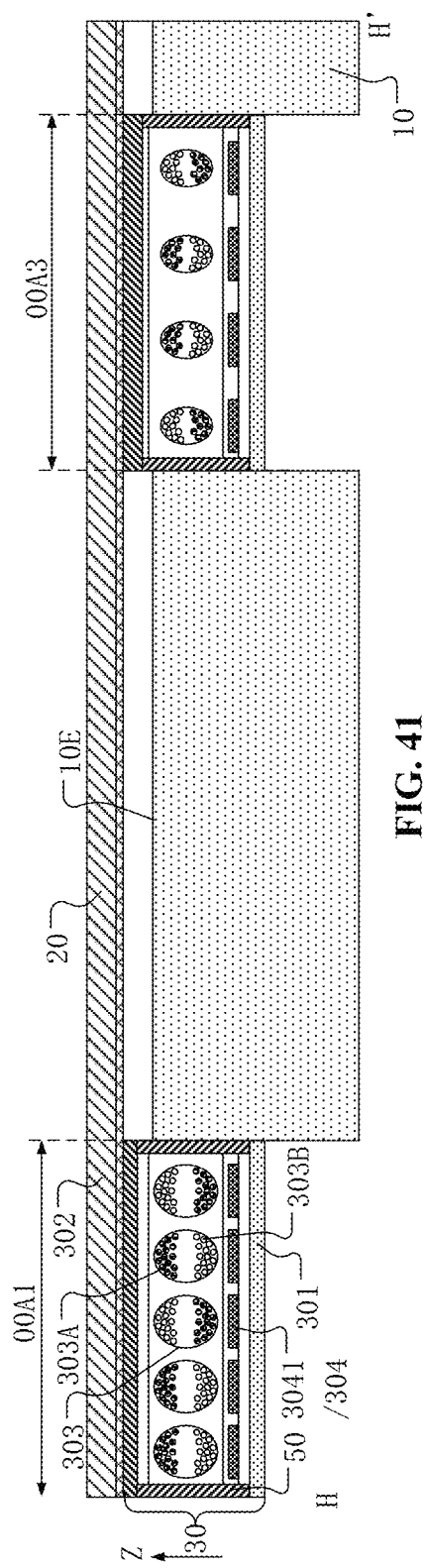
FIG. 41 illustrates another cross-sectional view along a H-H' direction in FIG. 39.

Optionally, referring to FIGS. 30 and 41, FIG. 41 illustrates another cross-sectional view along the H-H' direction in FIG. 39. In one embodiment, the volume of the microcapsule structure 303 in the third region 00A3 may be different from the volume of the microcapsule structure 303 in the first region 00A1.

The display module 000 of one embodiment may be the display module structure with multiple joint-screens. By configuring differentiated design of the first region 00A1 of the cover 20 extended outside of the display panel 10 and the third region 00A3 between two adjacent display panels 10, desirable integrated black effect of entire display module 000 may be implemented. The differentiated design may further include configuring the volume of the microcapsule structure 303 in the third region 00A3 to be different from the volume of the microcapsule structure 303 in the first region 00A1. For example, the volume of the microcapsule structure 303 in the third region 00A3 in FIG. 41 may be less than the volume of the microcapsule structure 303 in the first region 00A1; or the volume of the microcapsule structure 303 in the third region 00A3 may be greater than the volume of the microcapsule structure 303 in the first region 00A1 (not shown in the drawings). Therefore, through actual chromaticity detection, the color-changing assemblies 30 in different regions may be differentially designed to ensure desirable integrated black effect.

Figure 42:
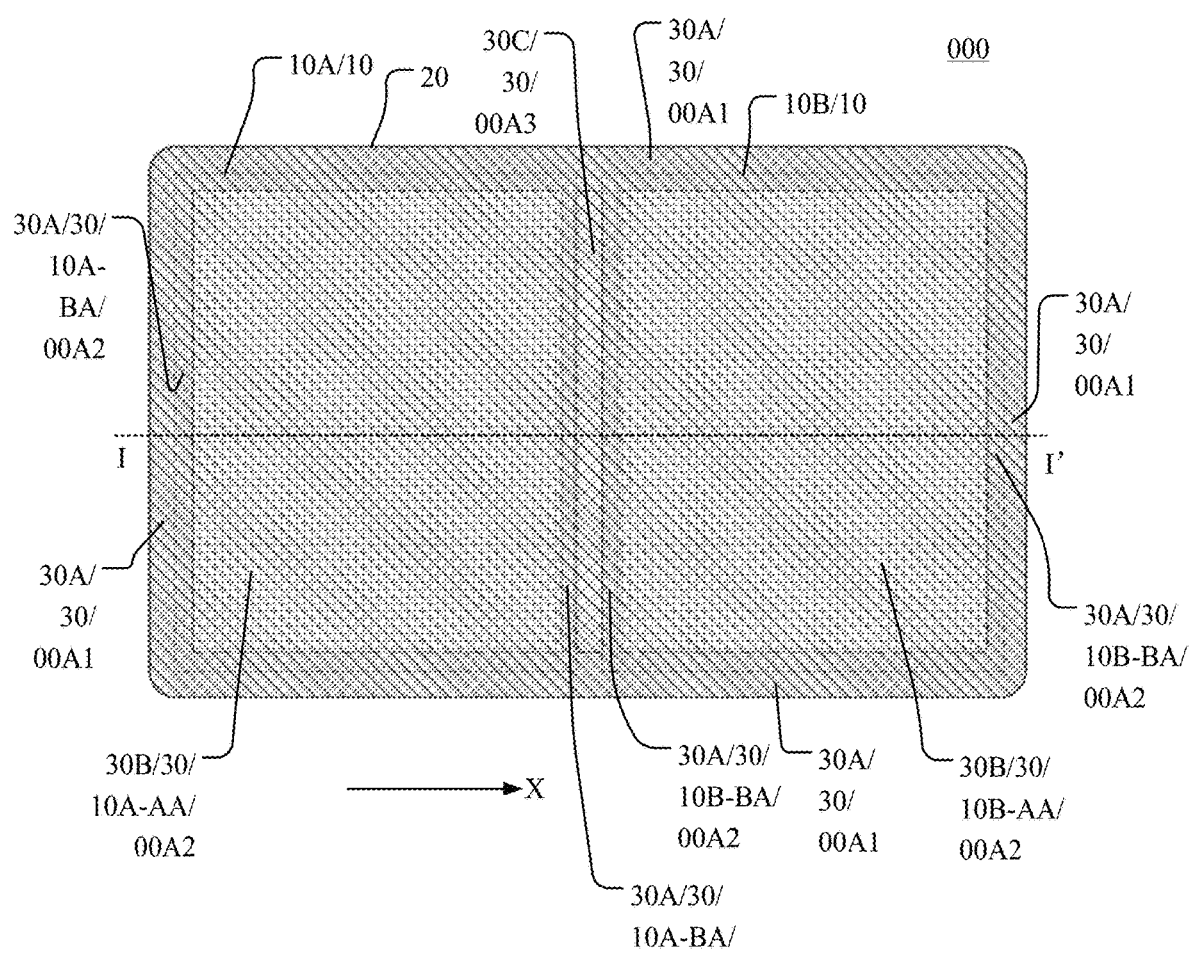
FIG. 42 illustrates another planar structural schematic of a display module according to various embodiments of the present disclosure.
Figure 43:
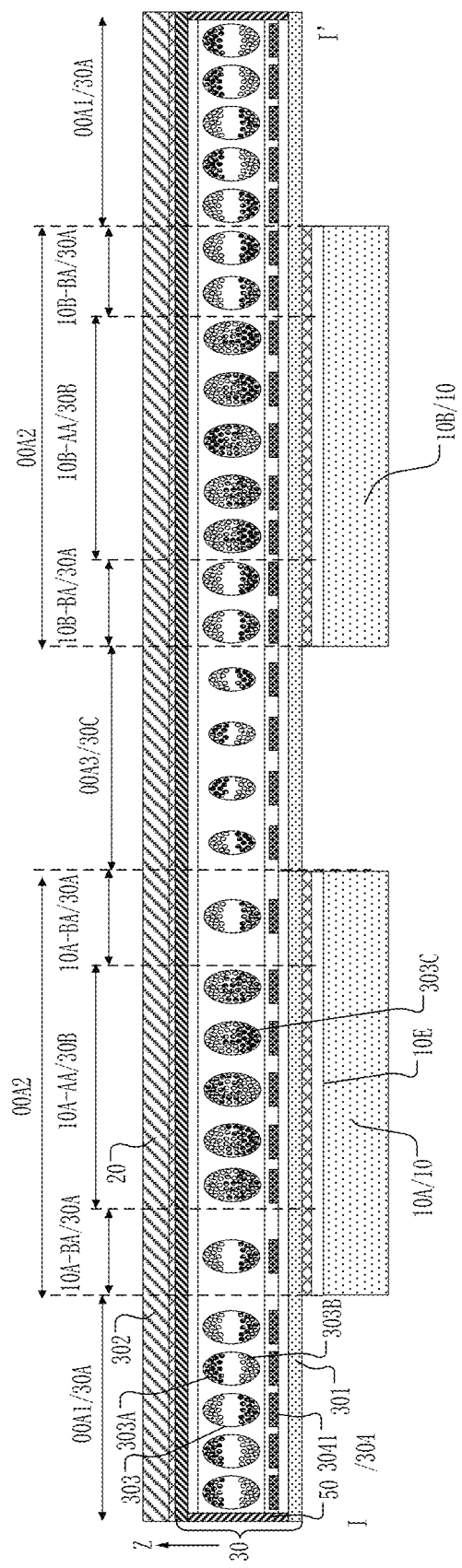
FIG. 43 illustrates a cross-sectional view along an I-I' direction in FIG. 42.

In some optional embodiments, referring to FIGS. 42 and 43, FIG. 42 illustrates another planar structural schematic of a display module according to various embodiments of the present disclosure; and FIG. 43 illustrates a cross-sectional view along an I-I' direction in FIG. 42. It may be understood that, in order to clearly illustrate the structure of one embodiment, transparency filling is performed in FIG. 42. In one embodiment, at least two display panels 10 may include the first display panel 10A and the second display panel 10B. The color-changing assembly 30 may be also between the first display panel 10A and the cover 20. The color-changing assembly 30 may be also between the second display panel 10B and the cover 20.

The first display panel 10A may include the first display region 10A-AA and the first frame region 10A-BA; and the second display panel 10B may include the second display region 10B-AA and the second frame region 10B-BA.

The distribution density of the microcapsule structures 303 in the first frame region 10A-BA may be different from the distribution density of the microcapsule structures 303 in the second frame region 10B-BA.

In one embodiment, it describes that the display module 000 may be the display module structure with multiple joint-screens; and the display module 000 may at least include the first display panel 10A and the second display panel 10B arranged along the direction X in parallel with the plane of the cover 20. In addition to disposing the first region 00A1 extended outside of the edge of the display panel 10 and on the periphery of the cover 10, and the third region 00A3 between the first display panel 10A and the second display panel 10B, the color-changing assembly 30 may be also disposed between the first display panel 10A and the cover 20 and between the second display panel 10B and the cover 20. That is, the side of the cover 20 facing the plurality of display panels 10 may be entirely covered with the color-changing assembly 30. In addition, the color-changing assembly 30 in different regions may be named with different names. For example, the color-changing assembly 30 in the first region 00A1, the first frame region 10A-BA of the first display panel 10A, and the second frame region 10B-BA of the second display panel 10B may be the first color-changing assembly 30A; the color-changing assembly 30 in the first display region 10A-AA of the first display panel 10A and the second display region 10B-AA of the second display panel 10B may be the second color-changing assembly 30B; and the color-changing assembly 30 in the third region 00A3 may be the third color-changing assembly 30C. In one embodiment, the arrangement structures, differentiated designs, the microcapsule structures containing color charged particles and the like of the first color-changing assembly 30A and the second color-changing assembly 30B may be understood with reference to the description of above-mentioned embodiment, which may not be described in the display module 000 with joint-screen structure in various embodiments of the present disclosure.

In one embodiment, it also configures that the distribution density of the microcapsule structures 303 in the first frame region 10A-BA of the first display panel 10A may be different from the distribution density of the microcapsule structures 303 in the second frame region 10B-BA of the second display panel 10B. That is, the color-changing assembly 30 may be also disposed in the frame regions of different display panels 10 covered by same cover 20 to achieve integrated black effect. The frame positions, the metal wiring densities or film thickness designs of different display panels may be different, which may affect reflected hue of the frame positions of the display panel itself when in the screen-off state. Therefore, in one embodiment, differentiated designs of the color-changing assemblies 30 may be performed for different frame regions corresponding to different display panels 10. For example, the differentiated design may be that the distribution density of the microcapsule structures 303 in the first frame region 10A-BA may be different from the distribution density of the microcapsule structures 303 in the second frame region 10B-BA. In FIG. 43, the distribution density of the microcapsule structures 303 in the first frame region 10A-BA may be less than the distribution density of the microcapsule structures 303 in the second frame region 10B-BA, which may be taken as an example for illustration. Therefore, the movement of the charged particles of the microcapsule structures 303 in the first frame region 10A-BA and the second frame region 10B-BA may be adjusted according to detected hue values of the different frame regions, which may make integrated black effect in different frame regions to be consistent with each other as possible.

Optionally, different voltage values may be applied to the first electrode 3041, that is, the voltage value supplied to the first electrode 3041 in the first frame region 10A-BA may be different from the voltage value supplied to the first electrode 3041 in the second frame region 10B-BA, which may improve integrated black effect in multiple joint-screen structure design.

It may be understood that when same display module 000 includes multiple joint-screen display panels 10 arranged in the manner in above-mentioned embodiment, differentiated design of the color-changing assemblies in the frame regions of different display panels 10 may also be embodied in the volume of the microcapsule structures, which may not be limited in various embodiments of the present disclosure. During implementation, differentiated design may be selected according to actual need, which may only need to implement desirable integrated black effect.

Figure 44:
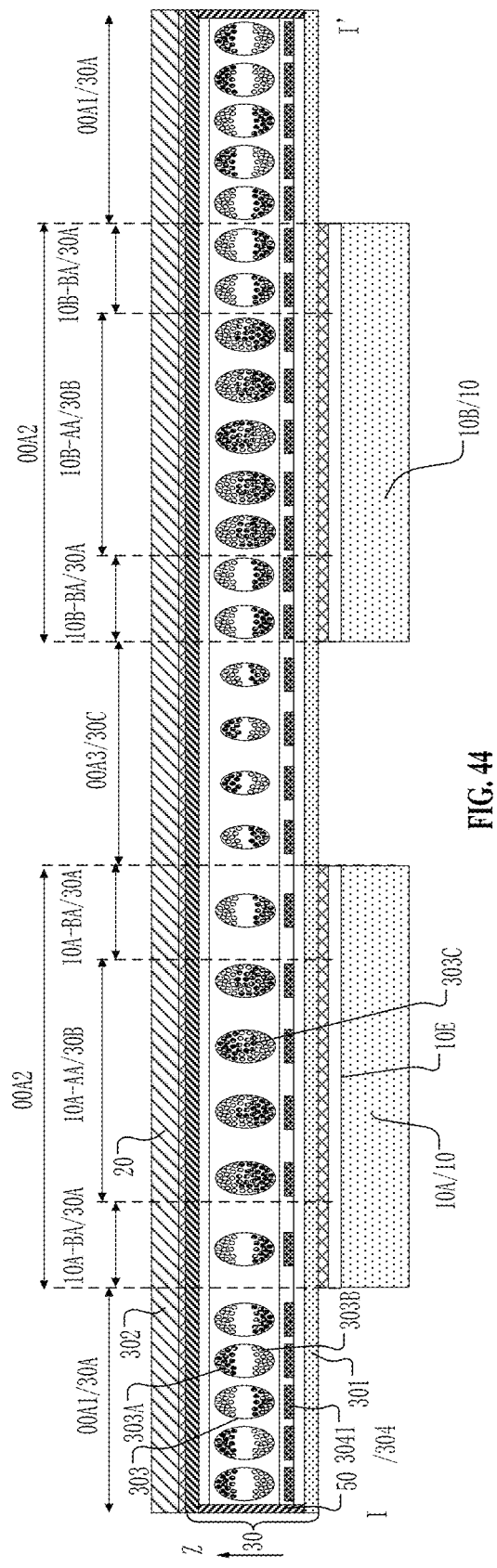
FIG. 44 illustrates another cross-sectional view along an I-I' direction in FIG. 42.

In some optional embodiments, referring to FIGS. 42 and 44, FIG. 44 illustrates another cross-sectional view along the I-I' direction in FIG. 42. In one embodiment, the distribution density of the microcapsule structures 303 in the first display region 10A-AA may be different from the distribution density of the microcapsule structures 303 in the second display region 10B-AA.

In one embodiment, it describes that the display module 000 may be the display module structure with multiple joint-screens; and the display module 000 may at least include the first display panel 10A and the second display panel 10B arranged along the direction X in parallel with the plane of the cover 20. In addition to disposing the first region 00A1 extended outside of the edge of the display panel 10 and on the periphery of the cover 10, and the third region 00A3 between the first display panel 10A and the second display panel 10B, the color-changing assembly 30 may be also disposed between the first display panel 10A and the cover 20 and between the second display panel 10B and the cover 20. That is, the side of the cover 20 facing the plurality of display panels 10 may be entirely covered with the color-changing assembly 30. The microcapsule structure 303 in the first display region 10A-AA of the first display panel 10A may further include color charged particles. The microcapsule structure 303 in the second display region 10B-AA of the second display panel 10B may further include color charged particles. Furthermore, through the movement control of color charged particles in the microcapsule structures, the integrated display effect that the color of the first display panel 10A and the second display panel 10B is substantially consistent with surrounding environment when in the screen-off state may be implemented. In one embodiment, the process and principle of implementing the integrated display by the joint-screen display module 000 may not be described in detail, which may refer to above-mentioned embodiment that the display region of the display panel is disposed with the color-changing assembly including color charged particles.

In one embodiment, the distribution density of the microcapsule structures 303 in the first display region 10A-AA may be different from the distribution density of the microcapsule structures 303 in the second display region 10B-AA. In FIG. 44, the distribution density of the microcapsule structures 303 in the first display region 10A-AA may be less than the distribution density of the microcapsule structures 303 in the second display region 10B-AA, which may be taken as an example for illustration. Therefore, by adjusting different distribution densities, different light transmission performance of the first display region 10A-AA of the first display panel 10A and the second display region 10B-AA of the second display panel 10B in the non-display screen-off state may be adjusted through the different volumes of the microcapsule structures, thereby achieving desirable integrated display effect that is substantially consistent with surrounding environment.

Figure 45:
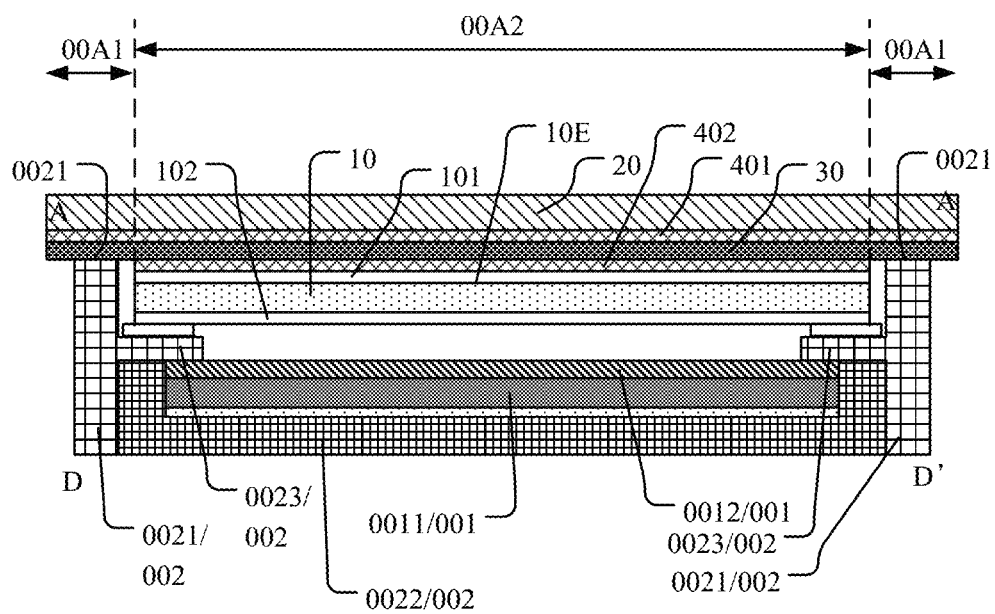
FIG. 45 illustrates a cross-sectional view along a D-D' direction in FIG. 18.
Figure 46:
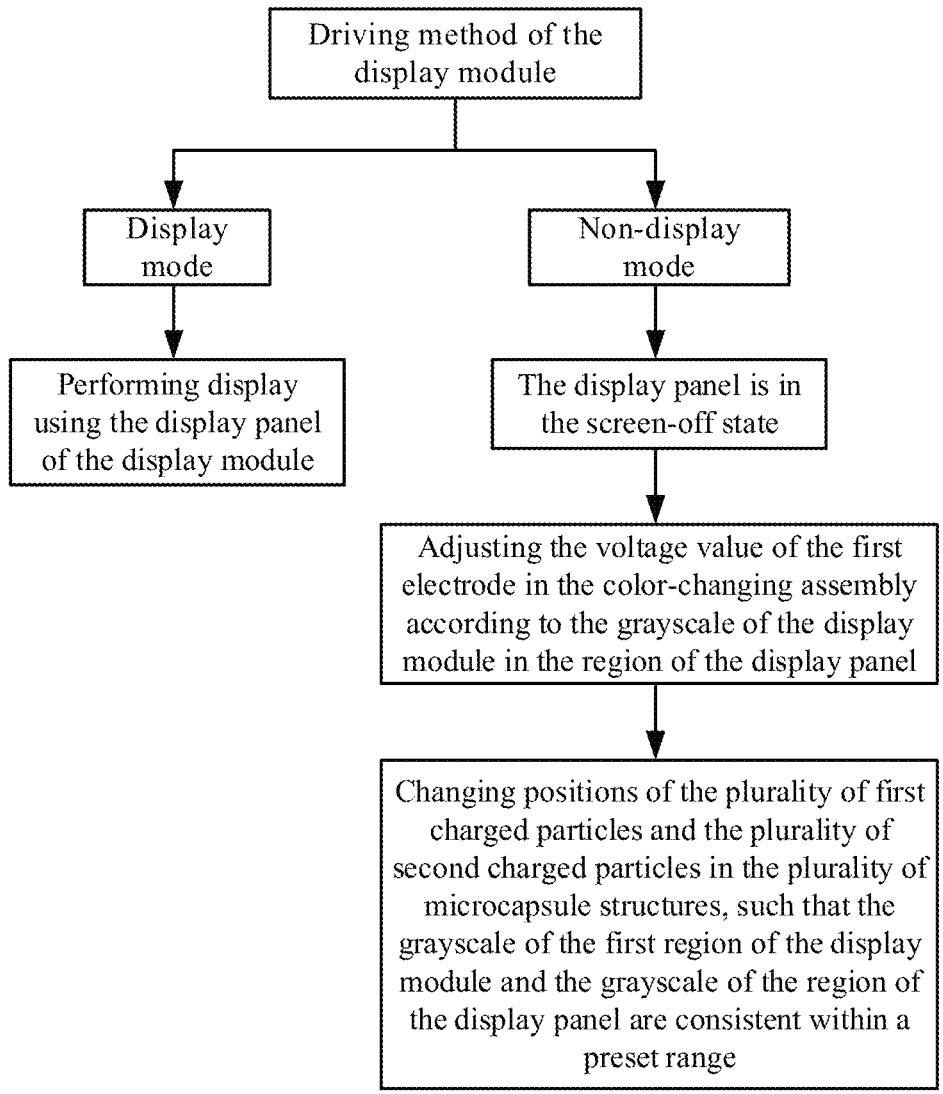
FIG. 46 illustrates a flowchart of a driving method according to various embodiments of the present disclosure.
Figure 47:
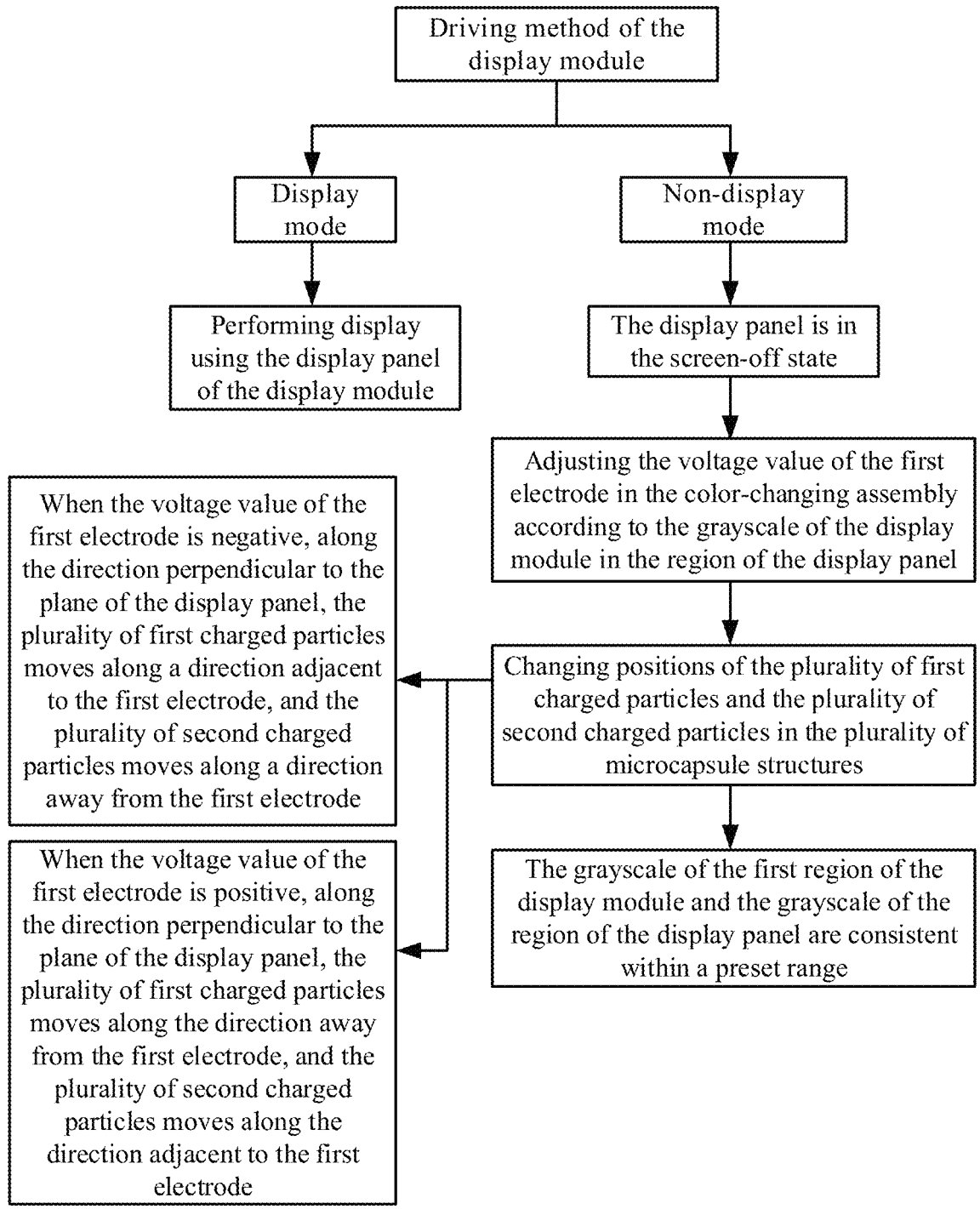
FIG. 47 illustrates another flowchart of a driving method according to various embodiments of the present disclosure.
Figure 48:
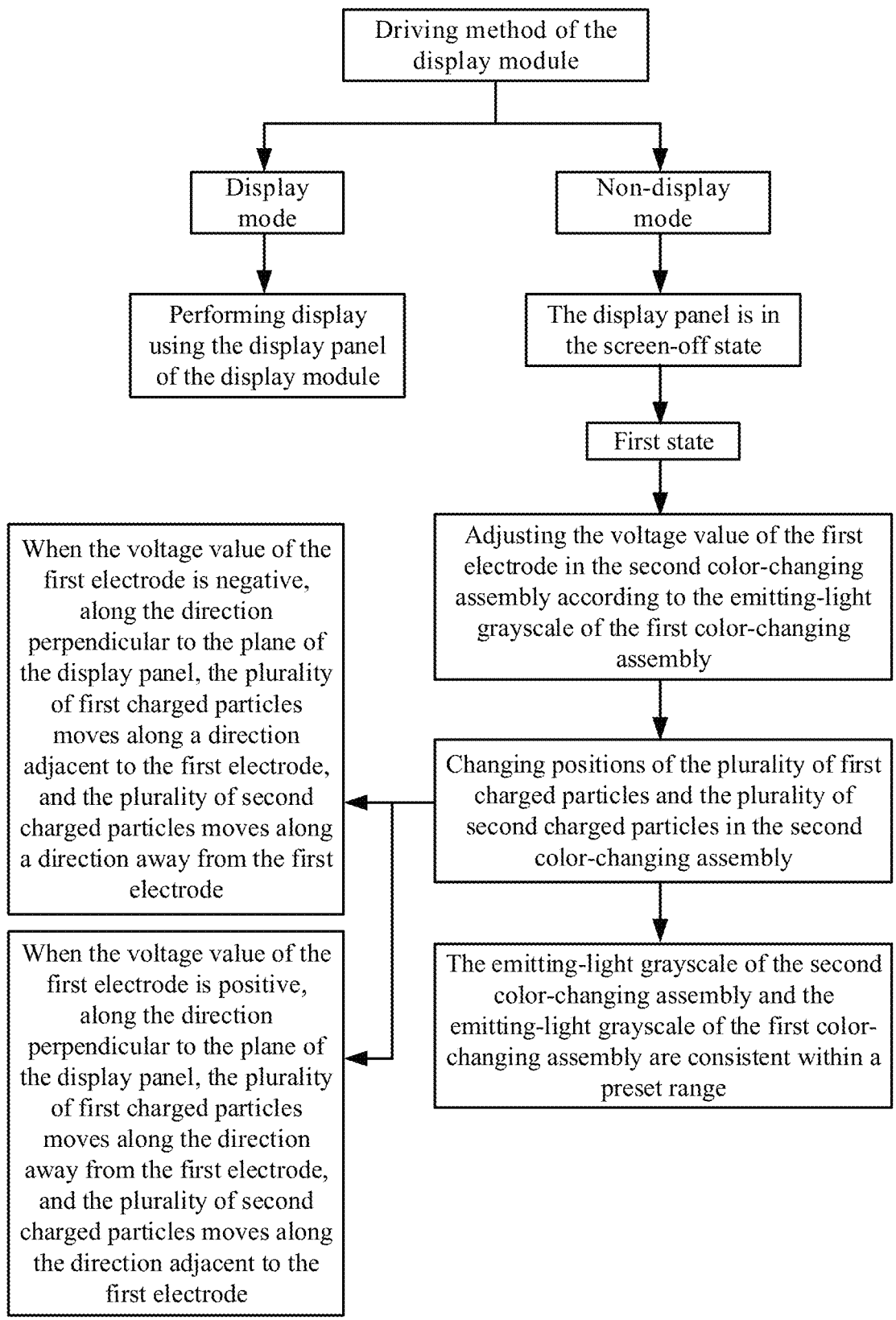
FIG. 48 illustrates another flowchart of a driving method according to various embodiments of the present disclosure.
Figure 49:
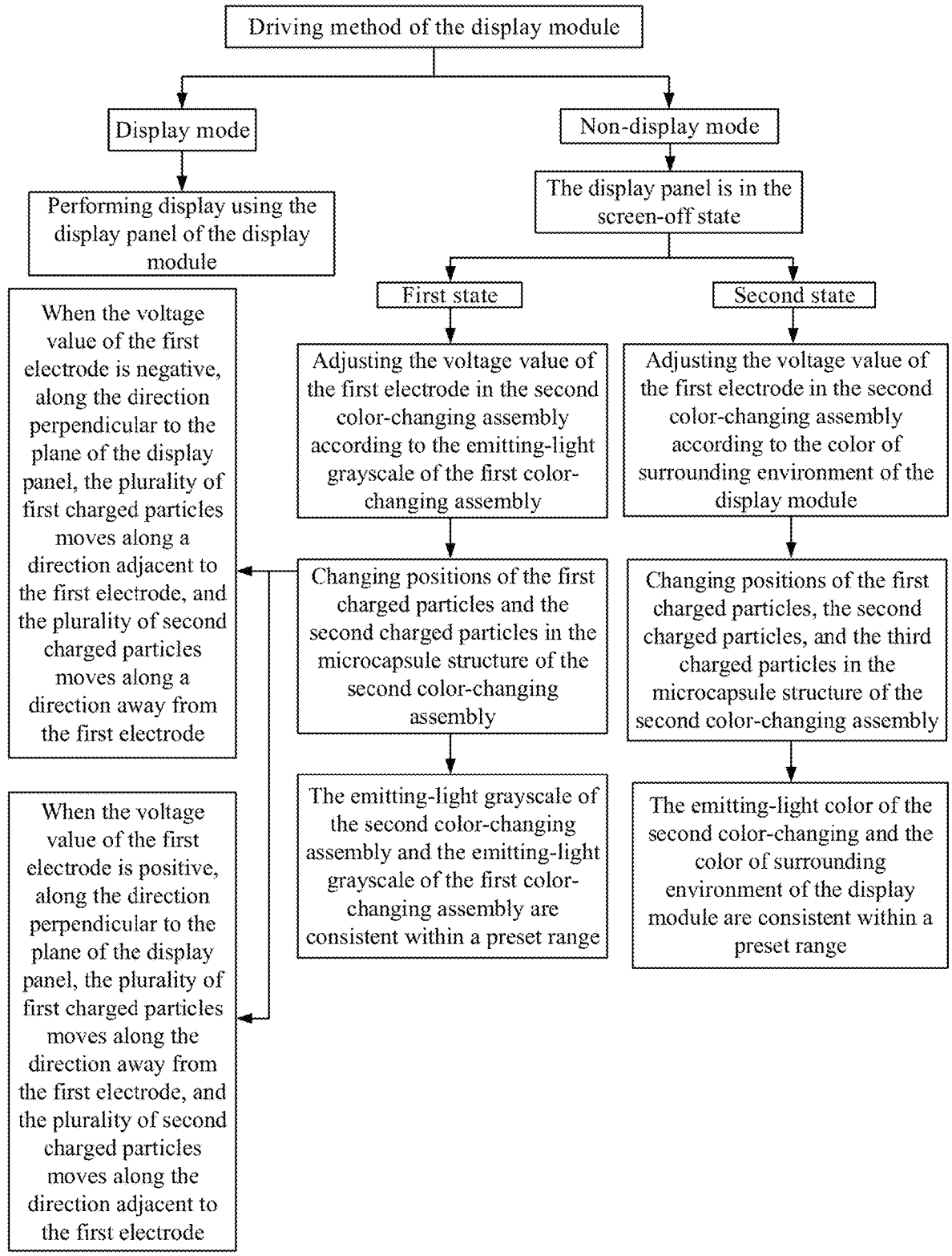
FIG. 49 illustrates another flowchart of a driving method according to various embodiments of the present disclosure.

In some optional embodiments, referring to FIGS. 18 and 45, FIG. 45 illustrates a cross-sectional view along a D-D' direction in FIG. 18. In one embodiment, the display panel 10 may be the liquid crystal display panel, and the display module 000 may further include a backlight module 001 and a frame structure 002. The backlight module 001 may be on the backlight side of the display panel 10.

The frame structure 002 may at least include a side plate 0021 and a back frame 0022. The side plate 0021 may be disposed to surround the edge of the back frame 0022. The side plate 0021 and the back frame 0022 may form a space for accommodating the display panel 10 and the backlight module 001.

The color-changing assembly 30 may be fixed to the cover 20 through the side plate 0021.

In one embodiment, it describes that the display module 000 may be a liquid crystal display module; that is, the display panel 10 included in the display module 000 may be a liquid crystal display panel. The display module 000 may further include the backlight module 001. The liquid crystal display panel may be formed by a color filter (CF) substrate, a thin film transistor (TFT) array substrate, and a liquid crystal layer (LC) disposed between the color filter substrate and the thin film transistor array substrate. Glass may be used as the substrate for the color filter substrate and thin film transistor array substrate. The LCD panel itself does not emit light. The working principle of the LCD panel may be that the rotation of liquid crystal molecules in the liquid crystal layer may be controlled by applying a driving voltage to the color filter substrate and the thin film transistor array substrate; the polarization state of the light of the backlight module 001 may be changed; the penetration and blocking of the light path may be implemented through the upper polarizer 101 and the lower polarizer 102 arranged outside of the liquid crystal display panel to control the amount of light transmission; and finally, the light from the backlight module 001 may be refracted to generate images.

The backlight modules 001 may be divided into two types: side-lit backlight modules and direct-lit backlight modules according to different incident positions of the light sources. For the direct-lit backlight module, a light-emitting source such as a light-emitting diode (LED) may be disposed on the backlight side of the liquid crystal display panel which may directly form a surface light source to be provided to the liquid crystal display panel. For the edge-lit backlight module, the backlight source such as an LED light bar may be disposed at the edge of the back panel behind the LCD panel; the light emitted by the LED light bar may enter a light guide plate 0011 from the light incident surface on the side of specially designed light guide plate (LGP) 0011; after being reflected and diffused by the light guide plate 0011, the light may emit from the light-emitting surface of the light guide plate 0011; and the light may pass through a plurality of optical films 0012 of the backlight module 001, which may form a surface light source to be provided to the liquid crystal display panel.

It may be understood that the type of the backlight module 001 may not be limited in various embodiments of the present disclosure, which may refer to the structure of the liquid crystal display module in the existing technology during implementation. The structures of the display panel 10 and the backlight module 001 may be exemplary in FIG. 45 of one embodiment, which may be configured according to the type of the liquid crystal display panel and the backlight module during implementation. For example, the display panel 10 may further include a black matrix, a pixel electrode, a common electrode and other structures, which may not be described in detail here in various embodiments of the present disclosure.

The display module 000 of one embodiment may further include a frame structure 002. The frame structure 002 may at least include side panels 0021 and a back frame 0022. The side panels 0021 may be configured to surround the edges of the back frame 0022. The side panels 0021 and the back frame 0022 may be integrally formed or connected to be fixed to form a space for accommodating the display panel 10 and the backlight module 001. The side plates 0021 may be at the edges of the back frame 0022 and configured to surround the edges of the back frame 0022. Therefore, the side plate 0021 may play the role of surrounding and protecting the backlight module 001 and the display panel 10 within the frame structure 002. In addition, the upper end 0021A of the side plate 0021 (that is, the end of the side plate 0021 facing the color-changing assembly 30) may also be in contact with the color-changing assembly 30 of the first region 00A1. While supporting the color-changing assembly 30 through the side plate 0021, the side plate 0021 may also be configured to achieve the fixing effect of the color-changing assembly 30 and the cover 20 in the first region 00A1, which may stabilize the color-changing assembly 30 and be beneficial for improving the stability and reliability of entire module.

It may be understood that, in one embodiment, the material of the frame structure 002 may not be limited. The frame structure 002 may be made of an aluminum alloy material or an iron frame material, or another hard material that may play a protective and supporting role, which may not be limited in various embodiments of the present disclosure.

Optionally, the frame structure 002 may further include a middle support plate 0023. The middle support plate 0023 may be disposed on the side of the side plate 0021 facing the space accommodating the display panel 10 and the backlight module 001. In addition, the middle support plate 0023 may be fixed to the side plate 0021. The middle support plate 0023 may play the role of supporting the display panel 10. That is, the display panel 10 on the light-emitting surface side of the backlight module 001 may be partially placed on the middle support plate 0023, which may pressure damage caused by the display panel 10 to the backlight module 001 after the backlight module 001 and the display panel 10 are assembled, thereby further improving overall stability of the display module 000.

It should be noted that the frame structure 002 may further include other structures that provide stable and reliable support, such as cushioning foam and other filling structures, which may not be limited in various embodiments of the present disclosure and may refer to the structure of the liquid crystal display module in the existing technology.

In some optional embodiments, referring to FIGS. 1-3 and 46, FIG. 46 illustrates a flowchart of a driving method according to various embodiments of the present disclosure. The driving method provided in one embodiment may be applied to drive the display module 000 provided in any of above-mentioned embodiments. The driving method provided by one embodiment is described in detail hereinafter. The display module 000 may include a display mode and a non-display mode.

In the display mode, the display panel 10 of the display module 000 may perform display.

In non-display mode, the display panel 10 may be in the screen-off state. According to the grayscale of the display module 000 in the region where the display panel 10 is located, the voltage value of the first electrode 3041 in the color-changing assembly 30 may be adjusted. The positions of the first charged particles 303A and the second charged particles 303B in the microcapsule structure 303 may change, such that the grayscale of the first region 00A1 of the display module 000 may be consistent with the grayscale of the region where the display panel 10 is located within a preset range.

The driving method provided by embodiments of the present disclosure may be applied to the display module 000 shown in FIGS. 1-3. The display module 000 may at least include the display mode and the non-display mode when being used. In the display mode, the display panel 10 of the display module 000 may display normally. When the display panel 10 is the liquid crystal display panel, the rotation of liquid crystal molecules in the liquid crystal layer may be controlled by applying a driving voltage to the color filter substrate and the thin film transistor array substrate; the polarization state of the light of the backlight module may be changed; the penetration and blocking of the light path may be implemented through the upper polarizer and the lower polarizer arranged outside of the liquid crystal display panel to control the amount of light transmission; and finally, the light from the backlight module may be refracted to generate images. Since the display module 000 is in the display mode at this point, there is no need to consider the integrated black after being in the screen-off state. In the non-display mode of the display module 000, when the display panel 10 is not working, the voltage value may be adjusted according to the grayscale of the display module 000 in the region where the display panel 10 is located. At this point, the grayscale of the display module 000 in the region where the display panel 10 is located may be not completely black, but rather grayish. Therefore, in order to achieve the integrated black effect in all regions of entire module when the display panel 10 is in the screen-off state, the voltage value of the first electrode 3041 in the color-changing assembly 30 may only need to be adjusted to change the positions of the first charged particles 303A and the second charged particles 303B of different colors and opposite charges in the microcapsule structure 303. In addition, according to the grayscale of the display module 000 in the region where the display panel 10 is located, the voltage values on the first electrode 3041 of the microcapsule structure s303 at different positions may be adjusted to be different. In such way, the grayscale of the first region 00A1 of the display module 000 may be consistent with the grayscale of the region where the display panel 10 is located within the preset range. The preset range may be understood as allowable error range because the errors of process parameters and the like may not be completely consistent. Referring to FIGS. 5-6, FIG. 5 illustrates a rendering schematic of the integrated black module implemented by adjusting AR (anti-reflection) or ink chromaticity of the cover in the existing technology; and FIG. 6 illustrates a rendering schematic of the integrated black module implemented by using the structure of the color-changing assembly according to various embodiments of the present disclosure. It may be seen from the comparison between FIGS. 5-6 that the design of embodiments of the present disclosure may desirably improve the integrated black effect of the display module 000.

In the driving method provided by embodiments of the present disclosure, the display module 000 may be at the non-display mode first; and the integrated black effect may be desirable by disposing the color-changing assembly 30 including the microcapsule structure 303 in the first region 00A1 and by adjusting the voltage value on the first electrode 3041 in the color-changing assembly 30. Compared with existing solution of disposing ink in the first region 00A1, even if the design structure of the display panel 10 is changed, there is no need to develop a new cover, and only the voltage value on the first electrode 3041 may need to be adjusted, such that the grayscale of the first region 00A1 may be adjusted by changing the distribution of charged particles of different colors. Therefore, teal-time adjustment may improve the integrated black effect; the adjustment may be convenient and fast; the operation may be simple; the adjustment cycle and difficulty of adjustment may be greatly reduced; such configuration may be matched with display panels 10 with different design to form the integrated black effect; and the display panels 10 may be formed in batch production manner.

In some optional embodiments, referring to FIGS. 1-4 and 47, FIG. 47 illustrates another flowchart of a driving method according to various embodiments of the present disclosure. The driving method provided in various embodiments of the present disclosure may be applied to drive the display module 000 provided in any of above-mentioned embodiments. The first charged particles 303A may be the black charged particles, and the second charged particles 303B may be the white charged particles. In one embodiment, the first charged particles 303A may be positively charged and the second charged particle s303B may be negatively charged, which may be taken as an example for illustration.

The driving method provided by embodiments of the present disclosure is describe in detail hereinafter. The display module 000 may include the display mode and the non-display mode.

In the display mode, the display panel 10 of the display module 000 may perform display.

In the non-display mode, the display panel 10 may be in the screen-off state; according to the grayscale of the display module 000 in the region where the display panel 10 is located, the voltage value of the first electrode 3041 in the color-changing assembly 30 may be adjusted.

The positions of the first charged particles 303A and the second charged particles 303B in the microcapsule structure 303 may change.

When the voltage value of the first electrode 3041 is negative, along the direction Z perpendicular to the plane of the display panel 10, the black first charged particles 303A which are positively charged may move toward the direction adjacent to the first electrode 3041; and the white second charged particles 303B which are negatively charged may move toward the direction away from the first electrode 3041.

When the voltage value of the first electrode 3041 is positive, the black first charged particles 303A which are positively charged may move toward the direction away from the first electrode 3041 along the direction Z perpendicular to the plane of the display panel 10; and the white second charged particles 303B which are negatively charged may move toward the direction adjacent to the first electrode 3041.

In such way, the grayscale of the first region 00A1 of the display module 000 may be consistent with the grayscale of the region where the display panel 10 is located within a preset range.

In the driving method of embodiments of the present disclosure, the first charged particles 303A may be the black positively charged particles, and the second charged particles 303B may be the white negatively charged particles, which may be taken as an example for illustration. By changing the voltage value on the first electrode 3041, the positions of the first charged particles 303A and the second charged particles 303B in the microcapsule structures 303 may change as follows. When the voltage on the first electrode 3041 corresponding to the microcapsule structure 303 at a certain position is negative, the first charged particles 303A in the microcapsule structure 303 may aggregate toward the side adjacent to the first electrode 3041 due to the attraction of opposite charges, that is, the black first charged particles 303A may aggregate toward the side adjacent to the first substrate 301; and the second charged particles 303B in the microcapsule structure 303 may aggregate toward the side away from the first electrode 3041 due to the repulsion of same charges, that is, the white second charged particles 303B may aggregate toward the side adjacent to the second substrate 302. Since the second substrate 302 is closer to the cover 20 than the first substrate 301 in exemplary drawings, the visible color at such position may be white (J3 region in FIG. 4). When the voltage on the first electrode 3041 corresponding to the microcapsule structure 303 at another position is positive, the second charged particles 303B in the microcapsule structure 303 may aggregate toward the direction adjacent to the first electrode 3041 due to the attraction of opposite charges, that is, the white second charged particles 303B may aggregate toward the side adjacent to the first substrate 301; and the first charged particles 303A in the microcapsule structure 303 may aggregate toward the side away from the first electrode 3041 due to the repulsion of same charges, that is, the black first charged particles 303A may aggregate toward the side adjacent to the second substrate 302. Since the second substrate 302 is closer to the cover 20 than the first substrate 301 in exemplary drawings, the visible color at this position may be black (J2 region in FIG. 4). When no voltage is applied to the first electrode 3041 corresponding to the microcapsule structure 303 at a certain position, the first charged particles 303A and the second charged particles 303B in the microcapsule structure 303 may be in a mixed state. If one of the first charged particles 303A and the second charged particles 303B is black and another one of the first charged particles 303A and the second charged particles 303B is white, the visible color of corresponding position of the microcapsule structure 303 may be gray (J4 region in FIG. 4) when the first charged particles 303A and the second charged particles 303B are mixed. It may be seen that, in one embodiment, the positive and negative values of the voltage on the first electrode 3041 at different positions may be controlled to cause charged particles of different colors to move in the microcapsule structures 303. Furthermore, the visible grayscale on the side of the cover 20 in the first region 00A1 may be at least changed, such that the grayscale of the first region 00A1 of the display module 000 may be substantially consistent with the grayscale of the region where the display panel 10 is located, thereby implementing desirable integrated black effect.

In some optional embodiments, referring to FIGS. 13-17 and 48, FIG. 48 illustrates another flowchart of a driving method according to various embodiments of the present disclosure. The driving method provided in one embodiment may be applied to drive the display module 000 provided in any of above-mentioned embodiments.

The color-changing assembly 30 may include the first color-changing assembly 30A and the second color-changing assembly 30B. The first color-changing assembly 30A may be in the first region 00A1 and the frame region BA of the display panel 10; and the second color-changing assembly 30B may be in the display region AA of the display panel 10.

In the first color-changing assembly 30A, the first charged particles 303A in the microcapsule structure 303 may be the black charged particles, and the second charged particles 303B may be the white charged particles.

In the second color-changing assembly 30B, the first charged particles 303A in the microcapsule structure 30 may be the black charged particles, and the second charged particles 303B may be the white charged particles. In one embodiment, the first charged particles 303A may be positively charged, and the second charged particles 303B may be negatively charged, which may be taken as an example for illustration.

The non-display mode of the display module 000 includes the first state.

In the first state, the voltage value of the first electrode 3041 in the second color-changing assembly 30B may be adjusted according to the emitting-light grayscale of the first color-changing assembly 30A; and the positions of the first charged particles 303A and the second charged particles 303B in the microcapsule structures 303 in the second color-changing assembly 30B may change. In such way, the emitting-light grayscale of the second color-changing assembly 30B may be consistent with the emitting-light grayscale of the first color-changing assembly 30A within a preset range.

The driving method provided by embodiments of the present disclosure may be used in the display module 000 shown in FIGS. 13-17. The structure of the color-changing assembly 30 may not only be disposed in the range where of the first region 00A1 of the cover 20 extended outside of the display panel 10 but may also be further disposed in the region where the display panel 10 and the cover 20 are overlapped with each other. For example, the orthographic projection of the display panel 10 on the cover 20 may be in the second region 00A2. The second region 00A2 may also be understood as the region other than the first region 00A1. The color-changing assembly 30 may be not only disposed in the first region 00A1, but also disposed in the second region 00A2. In addition, in the second region 00A2, the color-changing assembly 30 may be disposed between the cover 20 and the display panel 10. That is, the color-changing assembly 30 may be on the side of the light-emitting surface 10E of the display panel 10 facing the cover 20. The color-changing assembly 30 may include the first color-changing assembly 30A and the second color-changing assembly 30B. The first color-changing assembly 30A may be in the frame region BA of the first region 00A1 and the second region 00A2; and the second color-changing assembly 30B may be in the display region AA of the second region 00A2.

In one embodiment, the color-changing assembly 30 may be also disposed in the second region 00A2 of the cover 20 where the display panel 10 is located. In the first state of the non-display mode of the display module 000, the hue of the region of the display panel 10 in the screen-off state may be adjusted through the color-changing assembly 30. For example, the voltage value on the first electrode 3041 in the color-changing assembly 30 within the second region 00A2 may be adjusted. Furthermore, the integrated black visual effect of the first region 00A1 and the second region 00A2 may be further improved by adjusting the hue of the second region 00A2. For example, in the first state of the non-display mode, according to detected light grayscale of the first color-changing assembly 30A, the voltage value of the first electrode 3041 in the second color-changing assembly 30B may be adjusted. Furthermore, the positions of the first charged particles 303A and the second charged particles 303B in the microcapsule structures 303 in the second color-changing assembly 30B may change. In such way, the emitting-light grayscale of the second color-changing assembly 30B may be consistent with the emitting-light grayscale of the first color-changing assembly 30A within the preset range, thereby improving the integrated black visual effect of the first region 00A1 and the second region 00A2.

In some optional embodiments, referring to FIGS. 18-21 and 49, FIG. 49 illustrates another flowchart of a driving method according to various embodiments of the present disclosure. The driving method provided in one embodiment may be applied to drive the display module 000 provided in any of above-mentioned embodiments.

The color-changing assembly 30 may include the first color-changing assembly 30A and the second color-changing assembly 30B. The first color-changing assembly 30A may be in the first region 00A1 and the frame region BA of the display panel 10; and the second color-changing assembly 30B may be in the display region AA of the display panel 10.

In the first color-changing assembly 30A, the first charged particles 303A in the microcapsule structure 303 may be the black charged particles, and the second charged particles 303B may be the white charged particles.

In the second color-changing assembly 30B, the first charged particles 303A in the microcapsule structure 30 may be the black charged particles, and the second charged particles 303B may be the white charged particles. The microcapsule structure 303 may further include a plurality of third charged particles 303C. The third charged particles 303C may be color charged particles. In one embodiment, the first charged particles 303A may be positively charged, the second charged particles 303B may be negatively charged, and the third charged particles 303C may be negatively charged, which may be taken as an example for illustration. In the second color-changing assembly 30B of one embodiment, the following may be taken as an example for illustration: in one microcapsule structure 303, the first charged particles 303A may be the black positively charged particles, the second charged particles 303B may be the white negatively charged particles, the red particles 303C1 of the third charged particles 303C may be negatively charged, and the amount of negative charges carried by the red particles 303C1 may be lower than the amount of negative charges carried by the second white charged particles 303B; in another microcapsule structure 303, the first charged particles 303A may be the black positively charged particles, the second charged particles 303B may be the white negatively charged particles, the green particles 303C2 of the third charged particles 303C may be negatively charged, and the amount of negative charges carried by the green particles 303C2 may be lower than the amount of negative charges carried by the white second charged particles 303B; and in another microcapsule structure 303, the first charged particles 303A may be the black positively charged particles, the second charged particles 303B may be the white negatively charged particles, the blue particles 303C3 of the third charged particles 303C may be negatively charged, and the amount of negative charges carried by the blue particles 303C3 may be lower than the amount of negative charges carried by of the white second charged particles 303B.

The non-display mode of the display module 000 may further include the second state.

In the second state, the voltage value of the first electrode 3041 in the second color-changing assembly 30B may be adjusted according to the color of the surrounding environment of the display module 000. In such way, the positions of the first charged particles 303A, the second charged particles 303B, and the third charged particles 303C in the microcapsule structures 303 in the second color-changing assembly 30B may change. The emitting-light color of the second color-changing assembly 30B may be consistent with the color of the surrounding environment of the display module 000 within a preset range.

The driving method provided by embodiments of the present disclosure may be used in the display module 000 shown in FIG. 18-21. The structure of the color-changing assembly 30 may not only be disposed in the range of the first region 00A1 of the cover 20 extended outside of the display panel 10 but may also be further disposed in the region where the display panel 10 and the cover 20 are overlapped with each other. For example, the orthographic projection of the display panel 10 on the cover 20 may be in the second region 00A2. The second region 00A2 may also be understood as a region other than the first region 00A1. The color-changing assembly 30 may be not only disposed in the first region 00A1, but also in the second region 00A2. In addition, in the second region 00A2, the color-changing assembly 30 may be disposed between the cover 20 and the display panel 10, that is, the color-changing assembly 30 may be on the side of the light-emitting surface 10E of the display panel 10 facing the cover 20. The color-changing assembly 30 may include the first color-changing assembly 30A and the second color-changing assembly 30B. The first color-changing assembly 30A may be in the frame region BA of the first region 00A1 and the second region 00A2; and the second color-changing assembly 30B may be in the display region AA of the second region 00A2.

In the driving method of embodiments of the present disclosure, in the second state of the non-display mode of the display module 000, the voltage value of the first electrode 3041 in the second color-changing assembly 30B may be adjusted according to the color of the surrounding environment of the display module 000, such that the positions of the first charged particles 303A, the second charged particles 303B, and the third charged particles 303C in the microcapsule structures 303 in the second color-changing assembly 30B may change. For example, when a negative voltage is applied to the first electrode 3041 at the position J9 in FIG. 21, the black first charged particles 303A which are positively charged may move toward the direction adjacent to the first electrode 3041 due to the attraction of opposite charges; and the negatively charged red particles 303C1 and the white second charged particles 303B may move toward the direction away from the first electrode 3041 due to the repulsion of same charges, that is, may move toward the direction adjacent to the second substrate 302 (that is, adjacent to the cover 20). The amount of negative charges carried by the red particles 303C1 may be lower than the amount of negative charges carried by the white second charged particles 303B. Therefore, the red particles 303C1 may move faster after being repelled and reach the second substrate 302 first, thereby making the visible color of the side of the microcapsule structure 303 adjacent to the cover 20 to be red. When a negative voltage is applied to the first electrode 3041 at the J10 position in FIG. 21, the black first charged particles 303A which are positively charged may move toward the first electrode 3041 due to the attraction of opposite charges, and the negatively charged green particles 303C2 and the white second charged particles 303B may move toward the direction away from the first electrode 3041 due to the repulsion of same charges, that is, may move toward the direction adjacent to the second substrate 302 (that is, adjacent to the cover 20). The amount of negative charges carried by the green particles 303C2 may be lower than the amount of negative charges carried by the white second charged particles 303B. Therefore, the green particles 303C2 may move faster after being repelled and reach the second substrate 302 first, thereby making the visible color of the side of the microcapsule structure 303 adjacent to the cover 20 to be green. When a negative voltage is applied to the first electrode 3041 at the J11 position in FIG. 21, the black first charged particles 303A which are positively charged may move toward the first electrode 3041 due to the attraction of opposite charges, and the negatively charged blue particles 303C3 and the white second charged particles 303B may move toward the direction away from the first electrode 3041 due to the repulsion of same charges, that is, may move toward the direction adjacent to the second substrate 302 (that is, adjacent to the cover 20). The amount of negative charges carried by the blue particles 303C3 may be lower than the amount of negative charges carried by the white second charged particles 303B. Therefore, the blue particles 303C3 may move faster after being repelled and reach the second substrate 302 first, thereby making the visible color of the side of the microcapsule structure 303 adjacent to the cover 20 to be blue.

In the display module 000 that the driving method of various embodiments of present disclosure is applied, the microcapsule structures 303 of the second color-changing assembly 30B of the display region AA may be configured to include both the black charged particles and the white charged particles, which may achieve the integrated black effect; and the microcapsule structures 303 of the second color-changing assembly 30B in the display region AA may also be configured to include the color charged particles. Color changes at different positions of the microcapsule structures 303 may be implemented by adjusting the voltage applied on the first electrode 3041. Furthermore, the display module 000 may be matched with the color of surrounding environment to be integrated with each other when the screen is in the screen-off state, thereby providing users with desirable visual experience of integrated display.

Figure 50:
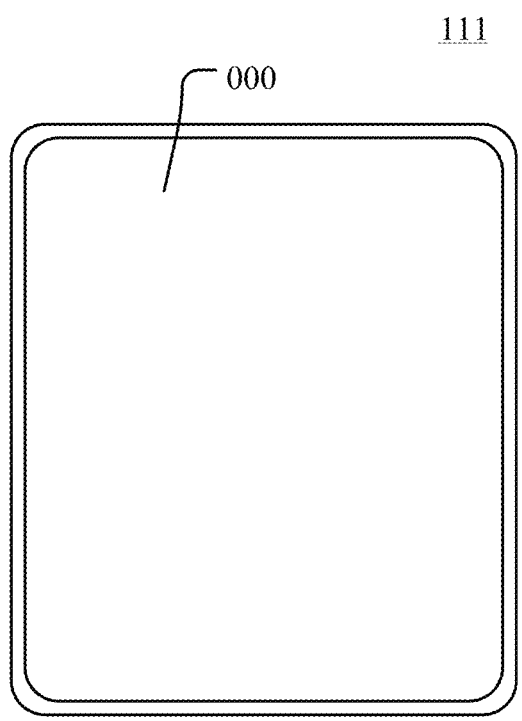
FIG. 50 illustrates a planar structural schematic of a display apparatus according to various embodiments of the present disclosure.

In some optional embodiments, referring to FIG. 50, FIG. 50 illustrates a planar structural schematic of a display apparatus according to various embodiments of the present disclosure. A display apparatus 111 provided in various embodiments of the present disclosure may include the display module 000 provided in above-mentioned embodiment of the present disclosure. A mobile phone may be taken as an example to illustrate the display apparatus 111 in one embodiment of FIG. 15. It may be understood that the display apparatus 111 provided by embodiments of the present disclosure may be a computer, a television, a vehicle-mounted display apparatus, or other display apparatus 111 with a display function, which may not be limited according to various embodiments of the present disclosure. The display apparatus 111 provided by embodiments of the present disclosure may have the beneficial effects of the display module 000 provided by embodiments of the present disclosure, which may refer to specific descriptions of the display module 000 in above-mentioned embodiments and may not be described in detail in various embodiments of the present disclosure.

It may be seen from above-mentioned embodiments that the display module and its driving method, and the display apparatus provided by the present disclosure may at least achieve following beneficial effects.

The display module provided by the present disclosure may at least include the display panel and the cover on the light-emitting surface side of the display panel. The cover may be larger than the display panel, such that the cover may extend outside of the first region of the display panel to fully protect entire display panel below the cover. The display module may further include the color-changing assemblies. Along the direction perpendicular to the plane of the display panel, the color-changing assembly may be on the side of the cover facing the display panel. The color-changing assembly may be at least disposed in the first region of the cover outside of the display panel. The color-changing assembly may include the plurality of microcapsule structures between the first substrate and the second substrate. Each microcapsule structure may at least include two types of charged particles of different colors and opposite charges. The first electrode layer may be on the side of the first substrate facing the microcapsule structure. The first electrode layer may be patterned to form the plurality of first electrodes. The orthographic projection of one first electrode on the first substrate may only be overlapped with the orthographic projection of one microcapsule structure on the first substrate and also be overlapped with the orthographic projection of two or more microcapsule structures on the first substrate. Through disposing the color-changing assembly in the present disclosure, the voltage value on the first electrode 3041 may be changed, such that the charged particles of different colors may be arranged in order in the microcapsule structures 303 along the direction Z perpendicular to the plane of the display panel 10 to display needed grayscale. Therefore, the grayscale of the display module 000 in the region where the color-changing assembly 30 is disposed may be substantially consistent with the grayscale of other regions, which may have material manufacturing advantages of low power consumption, low cost, flexibility and high stability. When the display module 000 is formed in embodiments of the present disclosure, the display module 000 including the display panel 10 and the cover 20 may be formed using the existing process. Subsequently, the color-changing assembly 30 may be directly assembled in the region where ink spraying or screen printing is originally needed, that is, the first region 00A1 of the cover 20 outside of the display panel 10, which may have simple structure and convenient assembly, and save process steps of ink spraying, thereby being beneficial for improving the process efficiency. In the present disclosure, the integrated black effect may be desirable by disposing the color-changing assembly 30 including the microcapsule structures 303 in the first region 00A1. Compared with the existing solution of disposing ink in the first region 00A1, even if the design structure of the display panel is changed in the present disclosure, there is no need to develop a new cover, and only the voltage value on the first electrode may need to be adjusted, such that the grayscale of the first region may be adjusted by changing the distribution of charged particles of different colors. Therefore, teal-time adjustment may improve the integrated black effect; the adjustment may be convenient and fast; the operation may be simple; the adjustment cycle and difficulty of adjustment may be greatly reduced; such configuration may be matched with display panels with different design to form the integrated black effect; and the display panels may be formed in batch production manner.

Although some embodiments of the present disclosure have been described in detail through various embodiments, those skilled in the art should understand that above-mentioned embodiments may be for illustration only and may not be intended to limit the scope of the present disclosure. Those skilled in the art should understood that modifications may be made to above-mentioned embodiments without departing from the scope and spirit of the present disclosure. The scope of the present disclosure may be defined by the appended claims.

What is claimed is:

1. A display module, comprising:
  a display panel;
  a cover on a light-emitting side of the display panel, wherein a region of the cover extended outside of the display panel is a first region; and
  a color-changing assembly on a side of the cover facing the display panel, wherein:
    the color-changing assembly is at least in the first region;
    along a direction perpendicular to a plane of the display panel, the color-changing assembly includes a first substrate and a second substrate which are disposed oppositely with each other;
    a plurality of microcapsule structures are between the first substrate and the second substrate;
    the plurality of microcapsule structures includes a plurality of first charged particles and a plurality of second charged particles;
    a color of a first charged particle is different from a color of a second charged particle, and a charge of the first charged particle is opposite to a charge of the second charged particle; and
    a first electrode layer is on a side of the first substrate facing the plurality of microcapsule structures; the first electrode layer includes a plurality of first electrodes; and an orthographic projection of one first electrode on the first substrate is overlapped with an orthographic projection of at least one microcapsule structure on the first substrate.

2. The display module according to claim 1, wherein:
the plurality of first charged particles are black charged particles, and the plurality of second charged particles are white charged particles.

3. The display module according to claim 1, wherein:
the cover further includes a second region, and an orthographic projection of the display panel on the cover is in the second region;
the color-changing assembly is also in the second region; and
in the second region, the color-changing assembly is between the cover and the display panel.

4. The display module according to claim 3, wherein:
the display panel in the second region includes a display region and a frame region;
the color-changing assembly includes a first color-changing assembly and a second color-changing assembly; the first color-changing assembly is in the first region and the frame region; and the second color-changing assembly is in the display region;
in a microcapsule structure of the first color-changing assembly, first charged particles are black charged particles, and second charged particles are white charged particles; and
a microcapsule structure of the second color-changing assembly includes a plurality of third charged particles which are color charged particles.

5. The display module according to claim 4, wherein:
the color charged particles include at least one of red particles, green particles and blue particles; or
in the second color-changing assembly, the plurality of third charged particles in the microcapsule structure includes at least one of red particles, green particles and blue particles; or in the second color-changing assembly, the plurality of third charged particles in the microcapsule structure has a same color, and third charged particles in two adjacent microcapsule structures have different colors.

6. The display module according to claim 4, wherein:
a quantity of microcapsule structures included in a unit area of the first color-changing assembly is greater than a quantity of microcapsule structures included in a unit area of the second color-changing assembly; or
a volume of the microcapsule structure in the first color-changing assembly is greater than a volume of the microcapsule structure in the second color-changing assembly.

7. The display module according to claim 4, wherein:
along the direction perpendicular to the plane of the display panel, a thickness of the first color-changing assembly is greater than a thickness of the second color-changing assembly.

8. The display module according to claim 4, wherein:
in the first color-changing assembly, the orthographic projection of the one first electrode on the first substrate is overlapped with an orthographic projection of a plurality of microcapsule structures on the first substrate; and in the first color-changing assembly, the first electrode of the first electrode layer is an entire-surface structure; or
in the second color-changing assembly, the orthographic projection of the one first electrode on the first substrate is overlapped with an orthographic projection of one microcapsule structure on the first substrate; the display region of the display panel includes a plurality of sub-pixels; and in the second color-changing assembly, the orthographic projection of the one first electrode on the first substrate is overlapped with an orthographic projection of at least one sub-pixel on the first substrate.

9. The display module according to claim 4, further including:
a first driving circuit and a second driving circuit, wherein the first driving circuit is electrically connected to the display panel, and the second driving circuit is electrically connected to the color-changing assembly; and
a non-display region, wherein the first region and the frame region are both in the non-display region, the non-display region includes a first non-display region and a second non-display region, the first driving circuit is bound to the first non-display region, and the second driving circuit is bound to the second non-display region; or a non-display region, wherein the first region and the frame region are both in the non-display region, the non-display region includes a first non-display region, and the first driving circuit and the second driving circuit are both bound to the first non-display region.

10. The display module according to claim 4, further including:
a light-adjusting panel on a side of the display panel away from the second color-changing assembly; or
a viewing-angle control panel on a side of the display panel away from the second color-changing assembly or on a side of the display panel facing the second color-changing assembly, wherein a distribution density of microcapsule structures in the second color-changing assembly is less than a distribution density of microcapsule structures in the first color-changing assembly; or a photosensitive element in the display region, wherein in the region of the photosensitive element, the second color-changing assembly does not include microcapsule structures.

11. The display module according to claim 1, further including:
at least two display panels, wherein:
the at least two display panels are arranged toward a direction in parallel with a plane of the cover and within a range of a same cover;
along the direction in parallel with the plane of the cover, a region between two adjacent display panels is a third region, and the color-changing assembly is also in the third region; and
a distribution density of microcapsule structures in the third region is different from a distribution density of microcapsule structures in the first region.

12. The display module according to claim 11, wherein:
a volume of a microcapsule structure in the third region is different from a volume of a microcapsule structure in the first region; or
the at least two display panels include a first display panel and a second display panel; the color-changing assembly is also between the first display panel and the cover and between the second display panel and the cover; the first display panel includes a first display region and a first frame region; the second display panel includes a second display region and a second frame region; a distribution density of microcapsule structures in the first frame region is different from a distribution density of microcapsule structures in the second frame region; and a distribution density of microcapsule structures in the first display region is different from a distribution density of microcapsule structures in the second display region.

13. The display module according to claim 1, wherein:
a first optical adhesive layer is on the side of the cover facing the display panel; and the color-changing assembly is fixed to the cover through the first optical adhesive layer.

14. The display module according to claim 1, wherein:
the display panel includes any one of a liquid crystal display panel, an organic light-emitting diode display panel, a micro-light-emitting diode display panel, and a sub-millimeter light-emitting diode display panel; or
the display panel is a liquid crystal display panel; the display module further includes a backlight module and a frame structure; the backlight module is on a backlight side of the display panel; the frame structure at least includes side panels and a back frame; the side panels are configured to surround an edge of the back frame; the side panels and the back frame form a space for accommodating the display panel and the backlight module; and the color-changing assembly is fixed to the cover through the side plates.

15. The display module according to claim 1, wherein:
the first substrate of the color-changing assembly is on a side of the second substrate away from the display panel; and at least a part of the cover is reused as the first substrate.

16. A driving method of a display module, wherein the display module includes a display panel; a cover on a light-emitting side of the display panel, wherein a region of the cover extended outside of the display panel is a first region; and a color-changing assembly on a side of the cover facing the display panel, wherein the color-changing assembly is at least in the first region; along a direction perpendicular to a plane of the display panel, the color-changing assembly includes a first substrate and a second substrate which are disposed oppositely with each other; a plurality of microcapsule structures are between the first substrate and the second substrate; the plurality of microcapsule structures includes a plurality of first charged particles and a plurality of second charged particles; a color of a first charged particle is different from a color of a second charged particle, and a charge of the first charged particle is opposite to a charge of the second charged particle; and a first electrode layer is on a side of the first substrate facing the plurality of microcapsule structures; the first electrode layer includes a plurality of first electrodes; an orthographic projection of one first electrode on the first substrate is overlapped with an orthographic projection of at least one microcapsule structure on the first substrate; and the display module includes a display mode and a non-display mode, the method comprising:
in the display mode, performing display using the display panel of the display module; and
in the non-display mode, setting the display panel to be in a screen-off state, adjusting a voltage value of a first electrode in the color-changing assembly according to a grayscale of the display module in a region of the display panel; and changing positions of the plurality of first charged particles and the plurality of second charged particles in the plurality of microcapsule structures, such that a grayscale of the first region of the display module and a grayscale of the region of the display panel are consistent within a preset range.

17. The method according to claim 16, wherein:
the plurality of first charged particles are black charged particles; and the plurality of second charged particles are white charged particles;
when the voltage value of the first electrode is negative, along the direction perpendicular to the plane of the display panel, the plurality of first charged particles moves along a direction adjacent to the first electrode, and the plurality of second charged particles moves along a direction away from the first electrode; and
when the voltage value of the first electrode is positive, along the direction perpendicular to the plane of the display panel, the plurality of first charged particles moves along the direction away from the first electrode, and the plurality of second charged particles moves along the direction adjacent to the first electrode.

18. The method according to claim 16, wherein:
the color-changing assembly includes a first color-changing assembly and a second color-changing assembly; the first color-changing assembly is in the first region and a frame region; and the second color-changing assembly is in a display region;
in a microcapsule structure of the first color-changing assembly, first charged particles are black charged particles, and second charged particles are white charged particles;
in a microcapsule structure of the second color-changing assembly, first charged particles are black charged particles, and second charged particles are white charged particles;
the non-display mode includes a first state; and
in the first state, the voltage value of the first electrode in the second color-changing assembly is adjusted according to an emitting-light grayscale of the first color-changing assembly, such that positions of the first charged particles and the second charged particles in the microcapsule structure of the second color-changing assembly change, and an emitting-light grayscale of the second color-changing assembly and the emitting-light grayscale of the first color-changing assembly are consistent within a preset range.

19. The method according to claim 18, wherein:
the microcapsule structure of the second color-changing assembly includes a plurality of third charged particles which are color charged particles;
the non-display mode further includes a second state; and
in the second state, the voltage value of the first electrode in the second color-changing assembly is adjusted according to a color of surrounding environment of the display module, such that positions of the first charged particles, the second charged particles, and the third charged particles in the microcapsule structure of the second color-changing assembly change, and an emitting-light color of the second color-changing and the color of the surrounding environment of the display module are consistent within a preset range.

20. A display apparatus, comprising:
a display module, comprising:
a display panel;
a cover on a light-emitting side of the display panel, wherein a region of the cover extended outside of the display panel is a first region; and
a color-changing assembly on a side of the cover facing the display panel, wherein:
the color-changing assembly is at least in the first region;
along a direction perpendicular to a plane of the display panel, the color-changing assembly includes a first substrate and a second substrate which are disposed oppositely with each other;
a plurality of microcapsule structures are between the first substrate and the second substrate;
the plurality of microcapsule structures includes a plurality of first charged particles and a plurality of second charged particles;
a color of a first charged particle is different from a color of a second charged particle, and a charge of the first charged particle is opposite to a charge of the second charged particle; and
a first electrode layer is on a side of the first substrate facing the plurality of microcapsule structures; the first electrode layer includes a plurality of first electrodes; and an orthographic projection of one first electrode on the first substrate is overlapped with an orthographic projection of at least one microcapsule structure on the first substrate.

* * * * *